(12) United States Patent
Kong et al.

(10) Patent No.: US 10,853,015 B2
(45) Date of Patent: Dec. 1, 2020

(54) ELECTRONIC DEVICE AND CONTROL METHOD THEREFOR

(71) Applicant: Samsung Electronics Co., Ltd., Suwon-si (KR)

(72) Inventors: Jin-Ah Kong, Seoul (KR); Yong-Yeon Lee, Suwon-si (KR); Yeo-Jun Yoon, Seoul (KR); Yun-Kyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/068,583

(22) PCT Filed: Dec. 12, 2016

(86) PCT No.: PCT/KR2016/014534
§ 371 (c)(1),
(2) Date: Jul. 6, 2018

(87) PCT Pub. No.: WO2017/119625
PCT Pub. Date: Jul. 13, 2017

(65) Prior Publication Data
US 2019/0018636 A1    Jan. 17, 2019

(30) Foreign Application Priority Data

Jan. 6, 2016    (KR) .................. 10-2016-0001672

(51) Int. Cl.
*G06F 3/02*    (2006.01)
*G06F 3/14*    (2006.01)
(Continued)

(52) U.S. Cl.
CPC .......... *G06F 3/1423* (2013.01); *G06F 1/1624* (2013.01); *G06F 1/1647* (2013.01);
(Continued)

(58) Field of Classification Search
CPC .... G06F 3/1423; G06F 1/1647; G06F 1/1624; G06F 3/04886; H04M 1/725; G06Q 50/30
See application file for complete search history.

(56) References Cited

U.S. PATENT DOCUMENTS

| | | | |
|---|---|---|---|
| 2009/0051666 A1 | 2/2009 | Choi et al. | |
| 2010/0056222 A1 | 3/2010 | Choi et al. | |

(Continued)

FOREIGN PATENT DOCUMENTS

| | | |
|---|---|---|
| CN | 101359252 A | 2/2009 |
| CN | 102385477 A | 3/2012 |

(Continued)

OTHER PUBLICATIONS

European Patent Office; Extended European Search Report; dated Nov. 23, 2018; pp. 1-8; European Application No. 16884008.0-1221.

(Continued)

*Primary Examiner* — Mark W Regn
(74) *Attorney, Agent, or Firm* — Jefferson IP Law, LLP

(57) ABSTRACT

An electronic device is disclosed. An electronic device according to one embodiment can comprise: a first display for displaying first content; a second display sliding on the first display and displaying second content; and a processor configured to display at least one piece of content related to the first content and the second content on the first display and the second display according to the overlapping of the first display and the second display according to the sliding.

12 Claims, 42 Drawing Sheets

(51) Int. Cl.
*G06Q 50/30* (2012.01)
*H04M 1/725* (2006.01)
*G06F 1/16* (2006.01)
*G06F 3/0488* (2013.01)

(52) U.S. Cl.
CPC ......... *G06F 3/04886* (2013.01); *G06Q 50/30* (2013.01); *H04M 1/725* (2013.01)

(56) References Cited

U.S. PATENT DOCUMENTS

| | | | |
|---|---|---|---|
| 2010/0110010 A1* | 5/2010 | Choi | H04M 1/0235 345/169 |
| 2010/0302179 A1 | 12/2010 | Ahn et al. | |
| 2012/0060089 A1* | 3/2012 | Heo | G06F 1/1647 715/702 |
| 2013/0155590 A1* | 6/2013 | Tani | H04M 1/0237 361/679.01 |
| 2014/0192081 A1 | 7/2014 | Jin et al. | |
| 2015/0355729 A1 | 12/2015 | Park et al. | |

FOREIGN PATENT DOCUMENTS

| | | |
|---|---|---|
| CN | 103914280 A | 7/2014 |
| CN | 104360797 A | 2/2015 |
| JP | 2011-250165 A | 12/2011 |
| KR | 10-2009-0129193 A | 12/2009 |
| KR | 10-2010-0027544 A | 3/2010 |
| KR | 10-2010-0128781 A | 12/2010 |
| KR | 10-2012-0023458 A | 3/2012 |
| KR | 10-2015-0141295 A | 12/2015 |

OTHER PUBLICATIONS

Chinese Office Action dated Sep. 23, 2020, issued in Chinese Patent Application No. 201680077879.7.

* cited by examiner

ELECTRONIC DEVICE AND CONTROL METHOD THEREFOR

TECHNICAL FIELD

The present disclosure relates to an electronic device and a method of controlling the same, and more particularly, to a method of displaying content on the basis of sliding of a transparent display.

BACKGROUND ART

Techniques of displaying an image including a person, an object, or a place, playing a sound source, and using a social network service (SNS) through an electronic device (e.g., a smartphone, a tablet personal computer (PC), or a wearable device) have recently been developed.

Further, a user may view, on a display of an electronic device, content such as a person, an object, a place, or the like, and an execution screen of an application such as a gallery application or camera application for displaying an image including a person, an object, or a place, a sound source play application for playing a sound source, and an SNS application for accessing an SNS.

Particularly, the user may view an execution screen of an application as related to a person, an object, a place, a sound source, or an SNS on a single opaque display included in the electronic device.

DETAILED DESCRIPTION OF THE INVENTION

Technical Problem

As described above, if a user users a conventional electronic device, the user should inconveniently select an image including a person, an object, or a place to be uploaded to an SNS, activate an SNS application, and search for an image including a person, an object, or a place to be uploaded on a screen of the SNS application after the SNS application is activated, through a user interface (UI) displayed on a single limited display which is an opaque display.

Moreover, when the user uses the conventional electronic device, the user should inconveniently execute a sound source play application to play an intended sound source, and navigate a plurality of menus on a screen of the executed sound source play application to search for the intended sound source, through a UI displayed on the single limited display which is an opaque display.

The present disclosure is devised in order to address the above or other problems, and provides an electronic device for enabling a user to access an intended menu more easily by controlling a transparent display which slides on an opaque display.

Technical Solution

According to various embodiments of the disclosure, an electronic device may include a first display displaying first content; a second display sliding on the first display, and displaying second content; and a processor configured to display at least one piece of content related to at least one of the first content and the second content on at least one of the first display and the second display, according to overlap between the first display and the second display, incurred by the sliding.

According to various embodiments of the disclosure, a method of controlling an electronic device may include displaying first content; displaying second content; and displaying at least one piece of content related to at least one of the first content and the second content on at least one of the first display and the second display, according to overlap between the first display and the second display, incurred by the sliding.

Advantageous Effects

According to various embodiments of the disclosure, a user can easily execute an application related to content displayed on a transparent display, immediately view an execution screen, and easily execute a plurality of functions related to the content (e.g., upload to a social network service (SNS)) by controlling sliding of the transparent display on an opaque display.

Further, according to various embodiments of the disclosure, it is advantageous that the user can easily execute a function related to intended content between first content and second content, and execute a plurality of functions simultaneously as well as a single function, while viewing the first content and the second content on a plurality of displays.

MODE FOR CARRYING OUT THE INVENTION

Figure 1:
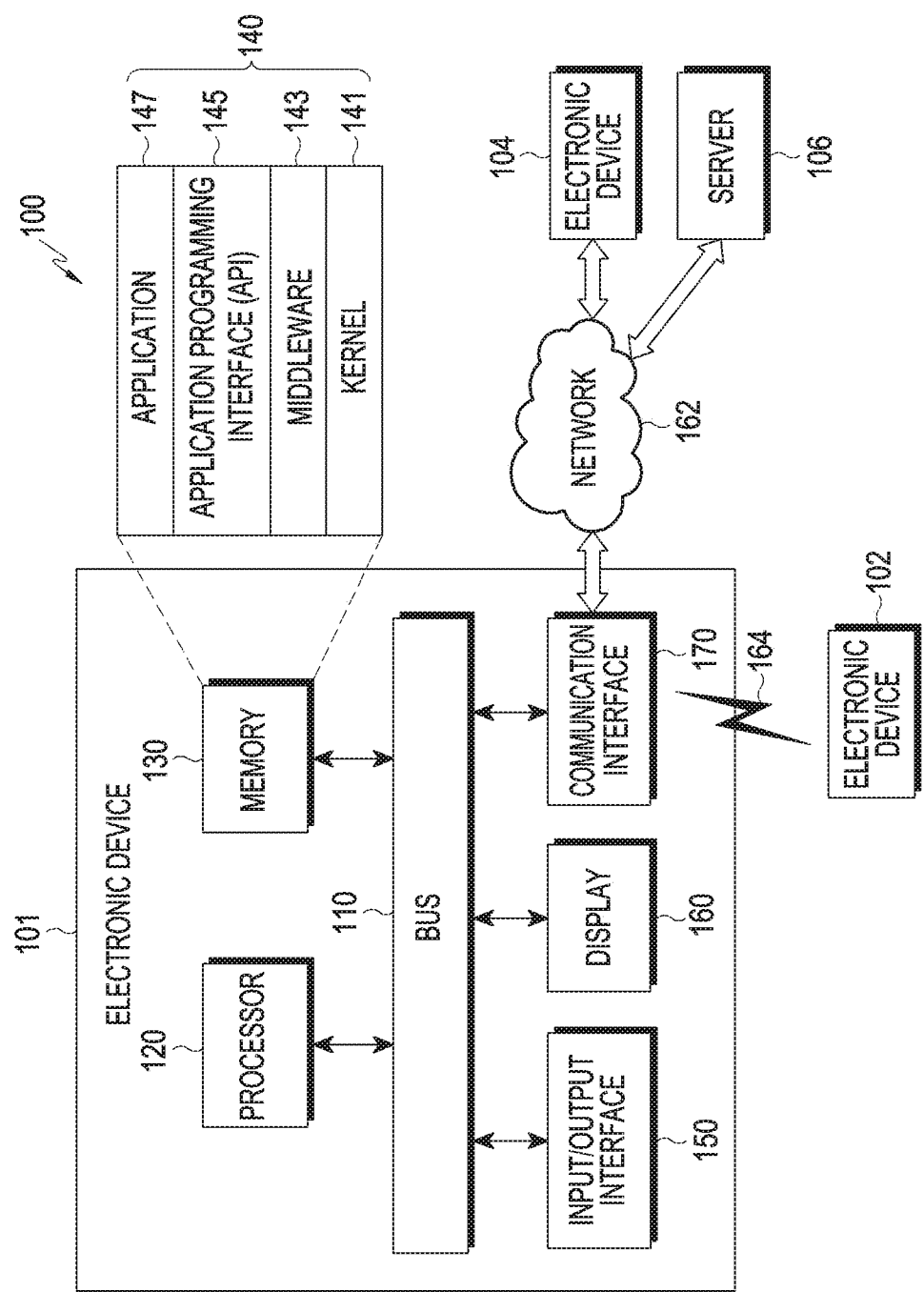
FIG. 1 is a block diagram of an electronic device and a network according to various embodiments of the invention.

Various embodiments of the disclosure are described with reference to the accompanying drawings. However, the scope of the disclosure is not intended to be limited to the particular embodiments, and it is to be understood that the disclosure covers various modifications, equivalents, and/or alternatives falling within the scope and spirit of the embodiments of the disclosure. In relation to a description of the drawings, similar reference numerals denote similar components.

In the disclosure, the term "have", "may have", "include", or "may include" signifies the presence of a corresponding feature (e.g., number, function, operation, or component such as part), not excluding the presence of one or more other features.

In the disclosure, the term "A or B", "at least one of A or/and B", or "one or more of A or/and B" may cover all possible combinations of enumerated items. For example, "A or B", "at least one of A and B", or "at least one of A or B" may represent all of the cases of (1) inclusion of at least one A, (2) inclusion of at least one B, and (3) inclusion of at least one A and at least one B.

The term as used in the disclosure, "1st", "2nd", "first" or "second' may be used for the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the disclosure.

When it is said that a component (e.g., a first component) is "operatively or communicatively coupled with/to" or "connected to" another component (e.g., a second component), it should be understood that the one component is connected to the other component directly or through any other component (e.g., a third component). On the other hand, when it is said that a component (e.g., a first component) is "directly connected to" or "directly coupled to" another component (e.g., a second component), it may be understood that there is no other component (e.g., a third component) between the components.

The term "configured to" as used herein may be replaced with, for example, the term "suitable for", "having the capacity to", "designed to", "adapted to", "made to", or "capable of" under circumstances. The term "configured to"

may not necessarily mean "specifically designed (or configured) to" in hardware. Instead, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations.

The terms as used in the disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the disclosure may not be interpreted as excluding embodiments of the disclosure.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical equipment, a camera, or a wearable device. According to various embodiments, the wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or a tattoo), and an implantable type (e.g., an implantable circuit).

According to some embodiments, an electronic device may be a home appliance. The home appliance may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, and an Internet of things device (e.g., a lighting bulb, various sensors, an electricity or gas meter, a sprinkler, a fire alarm, a thermostat, a street lamp, a toaster, sports goods, a hot water tank, a heater, a boiler, or the like).

According to some embodiments, an electronic device may include at least one of furniture, part of a building/structure, an electronic board, an electronic signature receiving device, a projector, and various measuring devices (e.g., a water, electricity, gas or electro-magnetic wave measuring device). According to various embodiments, an electronic device may be one or a combination of two or more of the foregoing devices. According to some embodiments, an electronic device may be a flexible electronic device. In addition, an electronic device according to an embodiment of the disclosure is not limited to the foregoing devices, and covers a new electronic device produced along with technology development.

With reference to the attached drawings, an electronic device according to various embodiments will be described below. In the disclosure, the term user may refer to a person or device (e.g., artificial intelligence electronic device) that uses an electronic device.

FIG. 1 is a block diagram illustrating an electronic device in a network environment according to various embodiments of the invention.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication module 170. In some embodiments, at least one of the components may be omitted in the electronic device 101 or a component may be added to the electronic device 101.

The bus 110 may interconnect, for example, the foregoing components 110 to 170, and include a circuit which allows communication (e.g., transmission of control messages and/or data) between the foregoing components.

The processor 120 may include one or more of a CPU, an application processor (AP), or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS).

The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface that controls functions which, for example, the application programs 147 provide at the kernel 141 or the middleware 143. For example, the API 145 may include at least one interface or function (e.g., a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, or a symbol) to the user. The display 160 may include a touch screen and receive, for example, a touch input, a gesture input, a proximity input, or a hovering input through an electronic pen or a user's body part.

The communication module 170 may establish communication, for example, between the electronic device 101 and an external device (e.g., a first external electronic device 102, a second external electronic device 104, or a server 106). For example, the communication module 170 may be connected to a network 162 by wireless communication or wired communication and communicate with the external device (e.g., the second external electronic device 104 or the server 106) over the network 162.

The wireless communication may be conducted using, for example, at least one of long-term evolution (LTE), LTE Advance (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of wireless fidelity (WiFi), Bluetooth, near field communication (NFC), or global navigation satellite system (GNSS). GNSS may include at least one of, for example, global positioning system (GPS), global navigation satellite system (Glonass), Beidou navigation satellite system (hereinafter, referred to as "Beidou"), or Galileo, the European global satellite-based navigation system, according to a region using the GNSS or a used bandwidth. In the disclosure, the terms "GPS" and "GNSS" are interchangeably used with each other. The wired communication may be conducted in conformance to at least one of, for example, universal serial bus (USB), high definition multimedia interface (HDMI), recommended standard 232 (RS-232), or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
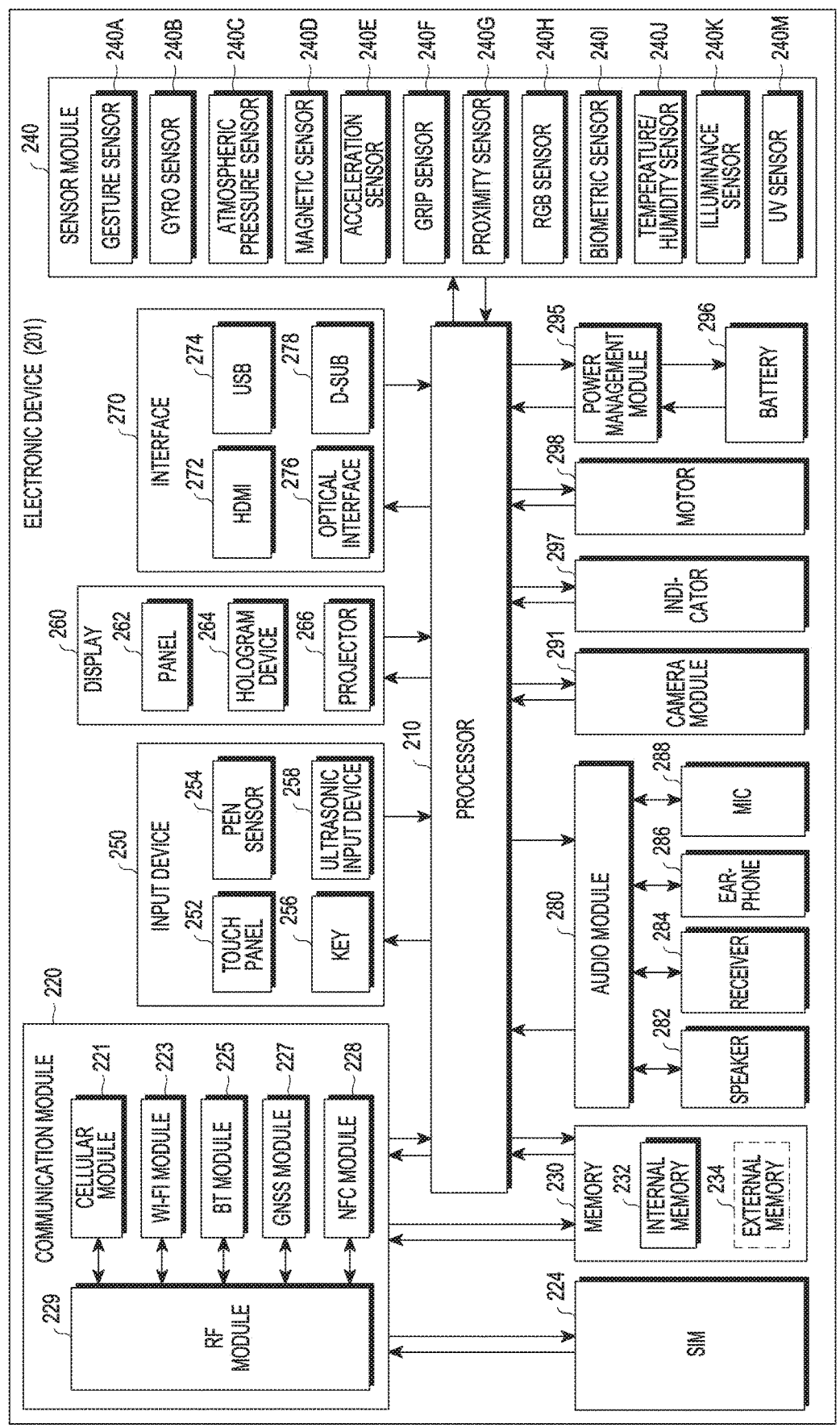
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software components which are connected to the processor 210 by executing an OS or an application program, and may perform processing or computation of various types of data. The processor 210 may be implemented, for example, as a system on chip (SoC). According to an embodiment, the processor 210 may further include a graphic processing unit (GPU) and/or an image signal processor. The processor 210 may include at least a part (e.g., a cellular module 221) of the components illustrated in FIG. 2. The processor 210 may load a command or data received from at least one of other components (e.g., a non-volatile memory), process the loaded command or data, and store various types of data in the non-volatile memory.

The communication module 220 may have the same configuration as or a similar configuration to the communication module 170 illustrated in FIG. 1. The communication module 220 may include at least one of, for example, the cellular module 221, a WiFi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (e.g., a SIM card) 224. According to an embodiment, the cellular module 221 may perform at least a part of the functionalities of the processor 210. According to an embodiment, the cellular module 221 may include a communication processor (CP).

Each of the WiFi module 223, the BT module 225, the GNSS module 227, and the NFC module 228 may include, for example, a processor that may process data received or transmitted by the module. According to an embodiment, at least a part (e.g., two or more) of the cellular module 221, the WiFi module 223, the Bluetooth module 225, the GNSS module 227, or the NFC module 228 may be included in a single integrated chip (IC) or IC package.

The RF module 229 may transmit and receive, for example, communication signals (e.g., RF signals). The RF module 229 may include at least one of, for example, a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive RF signals via a separate RF module.

The SIM 224 may include, for example, a card including the SIM and/or an embedded SIM. The SIM 224 may include a unique identifier (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may be at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory, or NOR flash memory), a hard drive, or a solid state driver (SSD).

The external memory 234 may further include a flash drive such as a compact flash (CF) drive, a secure digital (SD), a micro secure digital (Micro-SD), a mini secure digital (Mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illuminance sensor 240K, or an ultra violet (UV) sensor 240M. Additionally or alternatively, the sensor module 240 may include, for example, an E-nose sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, a capacitive, resistive, infrared, or ultrasonic scheme. The touch panel 252 may further include a control circuit. The touch panel 252 may further include a tactile layer, to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (e.g., a microphone 288), and identify data corresponding to the sensed ultrasonic signals.

The display 260 (e.g., the display 160) may include a panel 262, a hologram device 264, or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication module 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (e.g., a front sensor or a rear sensor), a lens, an image signal processor (ISP), or a flash (e.g., an LED or a xenon lamp).

The power management module 295 may manage power of, for example, the electronic device 201. According to an embodiment, the power management module 295 may include a power management integrated circuit (PMIC), a charger integrated circuit, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (e.g., the processor 210), for example, boot status, message status, or charge status. The motor 298 may convert an electrical signal into a mechanical vibration, and generate vibrations or a haptic effect. While not shown, the electronic device 201 may include a processing device for supporting mobile TV (e.g., a GPU). The processing device for supporting mobile TV may process media data compliant with, for example, digital multimedia broadcasting (DMB), digital video broadcasting (DVB), or mediaFlo™.

Each of the above-described components of the electronic device may include one or more parts. and the name of the component may vary with the type of the electronic device. According to various embodiments, the electronic device may be configured to include at least one of the aforedescribed components. Some component may be omitted from or added to the electronic device. According to various embodiments, one entity may be configured by combining a part of the components of the electronic device, to thereby perform the same functions of the components prior to the combining.

Figure 3:
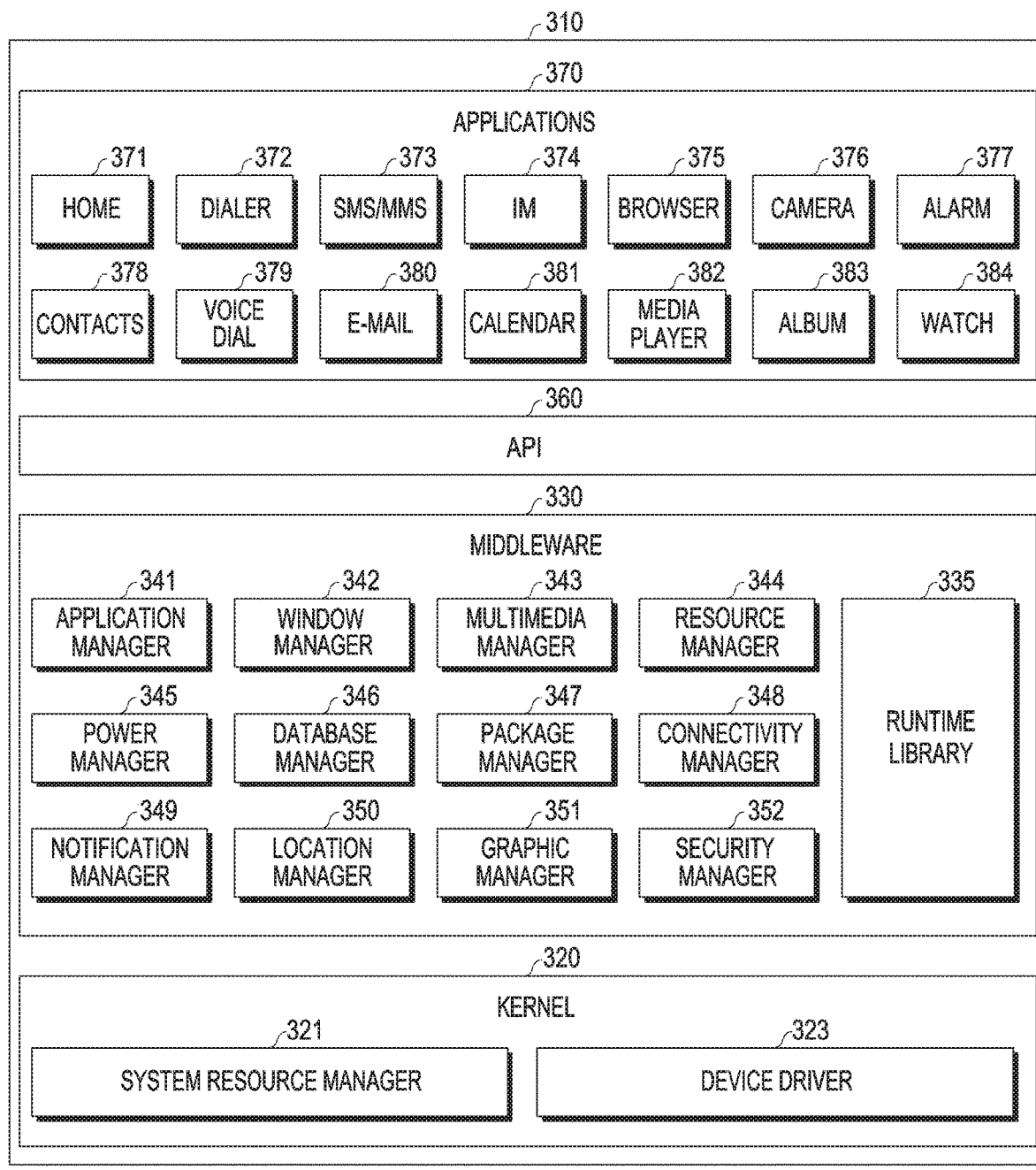
FIG. 3 is a block diagram of a programming module according to various embodiments.

FIG. 3 is a block diagram of a programming module according to various embodiments. According to an embodiment, a programming module 310 (e.g., the program 140) may include an OS that controls resources related to an electronic device (e.g., the electronic device 101) and/or various applications executed on the OS (e.g., the application programs 147). For example, the OS may be Android, iOS, Windows, Symbian, Tizen, Bada, or the like.

The programming module 310 may include a kernel 320, middleware 330, an application programming interface (API) 360, and/or applications 370. At least a part of the programming module 310 may be preloaded on the electronic device or downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or deallocate system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files, and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS), and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth, or the like. The notification manager 349 may indicate or advertise an event such as message arrival, a schedule, a proximity alarm, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. According to an embodiment, if the electronic device (e.g., the electronic device 101) has a telephony function, the middleware 330 may further include a telephony manager to manage a voice or video call function of the electronic device.

The middleware 330 may include a middleware module that combines various functions of the above-described components. The middleware 330 may provide a customized module for each OS type in order to provide differentiated functions. In addition, the middleware 330 may dynamically delete a part of the existing components or add a new component.

The API 360 (e.g., the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (e.g., the application programs 147) may include, for example, one or more applications capable of providing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (e.g., measurement of an exercise amount or a glucose level), or providing of environment information (e.g., information about atmospheric pressure, humidity, or temperature).

According to an embodiment, the applications 370 may include an application (for the convenience of description, referred to as "information exchange application") supporting information exchange between the electronic device (e.g., the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (e.g., an SMS/MMS application, an email application, a health care application, or an environment information application) to the external electronic device (e.g., the electronic device 102 or 104). Also, the notification relay application may, for example, receive notification information from the external electronic device and transmit the received notification information to a user.

The device management application may, for example, manage (e.g., install, delete, or update) at least a part of functions of the external electronic device (e.g., the electronic device 102 or 104) communicating with the electronic device (e.g., turn-on/turn-off of the external electronic device (or a part of its components) or control of the brightness (or resolution) of the display), an application executed in the external electronic device, or a service (e.g., a call service or a message service) provided by the external electronic device.

According to an embodiment, the applications 370 may include an application (e.g., a health care application of a mobile medical equipment) designated according to a property of the external electronic device (e.g., the electronic device 102 or 104). According to an embodiment, the applications 370 may include an application received from an external electronic device (e.g., the server 106 or the electronic device 102 or 104). According to an embodiment, the applications 370 may include a preloaded application or a third party application downloadable from a server. The names of components of the programming module 310 according to the illustrated embodiment may vary according to the type of an OS.

According to various embodiments, at least a part of the programming module 310 may be implemented in software, firmware, hardware, or a combination of at least two of them. At least a part of the programming module 310 may be implemented (e.g., executed) by the processor (e.g., the processor 210). At least a part of the programming module 310 may include, for example, a module, a program, a routine, a set of instructions, or a process to execute one or more functions.

Figure 4:
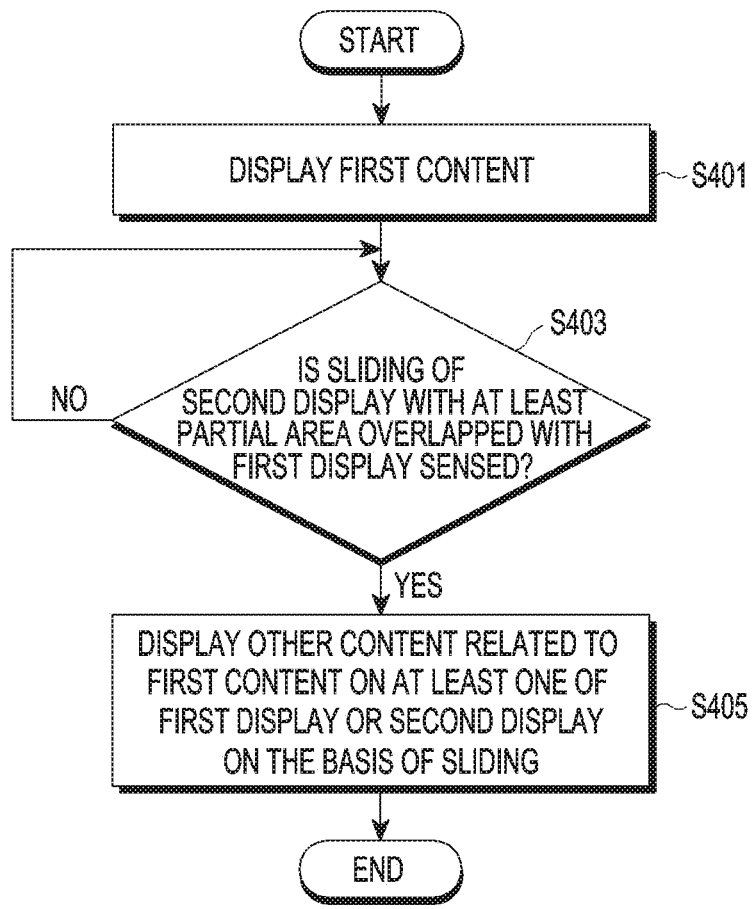
FIG. 4 is a flowchart illustrating a method of controlling an electronic device according to various embodiments of the disclosure.

FIG. 4 is a flowchart illustrating a method of controlling an electronic device according to various embodiments of the invention.

As illustrated in FIG. 4, according to various embodiments, a processor (e.g., the processor 120) of the electronic device (e.g., the electronic device 101) may display first content on a first display (e.g., the display 160) in operation S401.

According to various embodiments, the first display 160 may be an opaque display. According to various embodiments, a second display may be a transparent display. For example, the transparent display may display a specific screen under the control of the processor 120. For example, the transparent display may display second content at a predetermined transparency (e.g., 50%) under the control of the processor 120, and a user may view the first content on the first display disposed on the rear surface of the transparent display, while viewing the second content at the predetermined transparency on the transparent display.

According to various embodiments, the first content may include at least one of person information, object information, place information, or sound source information.

According to various embodiments, the first content may be an idle screen and/or at least one of person information, object information, place information, or sound source information included in the idle screen. For example, the processor 120 may display an idle screen including at least one of person information, object information, place information, or sound source information on the first display 160 and/or the second display.

According to various embodiments, the first content may be an application execution screen and/or at least one of person information, object information, place information, or sound source information included in the application execution screen. For example, the processor 120 may display, on the first display 160 and/or the second display, at least one of person information, object information, place information, or sound source information and/or an application execution screen including at least one of person information, object information, place information, or sound source information.

According to various embodiments, the first content may be a gallery application execution screen and/or at least one of person information, object information, place information, or sound source information included in the gallery application execution screen. For example, the processor 120 may display, on the first display 160 and/or the second display, at least one of person information, object information, place information, or sound source information and/or a gallery application execution screen including at least one of person information, object information, place information, or sound source information.

According to various embodiments, the first content may be a contacts application execution screen and/or at least one of person information, object information, place information, or sound source information included in the contacts application execution screen. For example, the processor 120 may display, on the first display 160 and/or the second display, at least one of person information, object information, place information, or sound source information and/or a contacts application execution screen including at least one of person information, object information, place information, or sound source information.

According to various embodiments, the first content may be a sound source play application execution screen and/or at least one of person information, object information, place information, or sound source information included in the sound source play application execution screen. For example, the processor 120 may display, on the first display 160 and/or the second display, at least one of person information, object information, place information, or sound source information and/or a sound source play application execution screen including at least one of person information, object information, place information, or sound source information.

According to various embodiments, the first content may be a social network service (SNS) application execution screen and/or at least one of person information, object information, place information, or sound source information included in the SNS application execution screen. For example, the processor 120 may display, on the first display 160 and/or the second display, at least one of person information, object information, place information, or sound source information and/or an SNS application execution screen including at least one of person information, object information, place information, or sound source information.

According to various embodiments, the first content may be a video play application execution screen and/or at least one of person information, object information, place information, or sound source information included in the video play application execution screen. For example, the processor 120 may display, on the first display 160 and/or the second display, at least one of person information, object information, place information, or sound source information and/or an idle screen including at least one of person information, object information, place information, or sound source information.

According to various embodiments, the first content may be a camera application execution screen and/or at least one of person information, object information, place information, or sound source information included in the camera application execution screen. For example, the processor 120 may display, on the first display 160 and/or the second display, at least one of person information, object information, place information, or sound source information and/or a camera application execution screen including at least one of person information, object information, place information, or sound source information.

According to various embodiments, the electronic device 101 may include a second display which is slidable so as to overlap with the first display 160 over at least a partial area. For example, the first display 160 and the second display may be included in a housing of the electronic device 101. For example, the size of the second display may be equal to or different from the size of the first display 160. For example, the second display may be slidable on the first display 160, and may not overlap or overlap wholly with the first display 160 according to the sliding. For example, in the state where the second display overlaps with the entire area of the first display 160, the second display may slide to the left and right and/or upward and downward on a plane parallel to a virtual plane including the first display 160.

According to various embodiments, the processor 120 may sense that the second display has slid to overlap with the first display 160 over at least a partial area. For example, in the state where the second display overlaps wholly with the first display 160, the processor 120 may sense that the second display has slid in a direction which reduces the overlapped area between the first display 160 and the second display. For example, in the state where the second display does not overlap with the first display 160, the processor 120 may sense that the second display has slid in a direction which increases the overlapped area between the first display 160 and the second display. For example, in the state where the second display overlaps with the first display 160 over at least a partial area, the processor 120 may sense that the second display has slid in a direction which reduces the overlapped area between the first display 160 and the second display. For example, in the state where the second display overlaps with the first display 160 over at least a partial area, the processor 120 may sense that the second display has slid in a direction which increases the overlapped area between the first display 160 and the second display.

For example, sliding of the second display in the direction which increases the overlapped area between the first display 160 and the second display may be defined as first-direction sliding, and sliding of the second display in the direction which decreases the overlapped area between the first display 160 and the second display may be defined as second-direction sliding.

According to various embodiments, the processor 120 may sense first-direction sliding on the first display 160, which incurs the second display to overlap with the first display 160 over at least a partial area (e.g., ¼ of the area of the first display 160). For example, the processor 120 may sense second-direction sliding on the first display 160 and/or second-direction sliding on the first display 160, which incurs the second display to overlap with the first display 160 over at least a partial area (e.g., ¼ of the area of the first display 160).

According to various embodiments, as the second display slides to overlap with the first display 160 over at least a partial area, the processor 120 may sense the overlap between the first display 160 and the second display.

According to various embodiments, the at least partial area may be included in the second display.

According to various embodiments, the processor 120 may display second content on the second display in operation S403.

According to various embodiments, the second content may include at least one of person information, object information, place information, or sound source information. For example, the processor 120 may execute an application, and display at least one of person information, object information, place information, or sound source information in an execution screen of the executed application on the first display 160 and/or the second display.

According to various embodiments, the second content may be an idle screen. For example, the processor 120 may display the idle screen on the first display 160 and/or the second display.

According to various embodiments, the second content may be an application execution screen. For example, the processor 120 may execute an application, and display an execution screen of the executed application on the first display 160 and/or the second display.

According to various embodiments, the processor 120 may display at least one piece of content related to at least one of the first content and the second content on at least one of the first display 160 and the second display according to overlap between the first display 160 and the second display, incurred by sliding of the second display on the first display 160.

According to various embodiments, the processor 120 may display at least one piece of content related to the first content on at least one of the first display 160 and the second display according to overlap between the first display 160 and the second display. For example, the processor 120 may display at least one piece of recommended content related to the first content on at least one of the first display 160 and the second display, on the basis of at least one sliding.

According to various embodiments, the processor 120 may acquire at least one piece of content related to the first content according to first-direction sliding of the second display on the first display 160, which incurs overlap between the second display and the first display 160 over at least a partial area (e.g., ¼ of the area of the first display 160).

For example, the processor 120 may acquire at least one piece of content related to the first content from a memory (e.g., the memory 140) of the electronic device 101. For example, the at least one piece of content related to the first content may be content acquired from an application (e.g., an application 147). For example, the at least one piece of content related to the first content may be content acquired from an API (e.g., the API 145). For example, the at least one piece of content related to the first content may be content acquired from an electronic device (e.g., the electronic device 104) outside the electronic device 101 by the short-range communication 164. For example, the at least one piece of content related to the first content may be content acquired from an electronic device (e.g., the electronic device 104) outside the electronic device 101 through a network (e.g., the network 162). For example, the at least one piece of content related to the first content may be content acquired from a server (e.g., the server 106) outside the electronic device 101 through the network 162. For example, the at least one piece of content related to the first content may be content acquired from a camera module (e.g., the camera module 291) of the electronic device 101.

According to various embodiments, the at least one piece of content related to the first content may include content selected on the basis of at least one of person information, object information, place information, and sound source information included in the first content.

According to various embodiments, the at least one piece of content related to the first content may be an execution screen of an application related to an application included in the first content.

According to various embodiments, the processor 120 may execute an application corresponding to at least one of person information, object information, place information, or sound source information included in the first content, on the basis of content selected on the basis of the at least one of the person information, the object information, and the place information included in the first content.

According to various embodiments, the processor 120 may execute a function of an application corresponding to at least one of person information, object information, place information, and sound source information included in the first content, on the basis of content selected based on the at least one of the person information, the object information, the place information, and the sound source information included in the first content.

According to various embodiments, the processor 120 may execute an application corresponding to at least one of person information, object information, and place information included in the first content, on the basis of content selected based on the at least one of the person information, the object information, and the place information included in the first content, and display a screen of the executed application on the first display and/or the second display.

According to various embodiments, after acquiring at least one piece of content related to the first content, the processor 120 may display guide information to display the at least one piece of content in at least a partial area of the second display (e.g., ¼ of the area of the first display 160) overlapped with the first display 160, in a display area of the second display. For example, the guide information for displaying the at least one piece of content may include a guide tab for guiding to sliding in a specific direction (e.g., a first or second direction) and/or a function tab representing a function to be executed according to the sliding in the specific direction. For example, the guide tab may include an arrow directed in the first or second direction. For example, the function tab may include at least one of text, a number, and an icon representing the function to be executed according to the sliding.

Figure 5A:
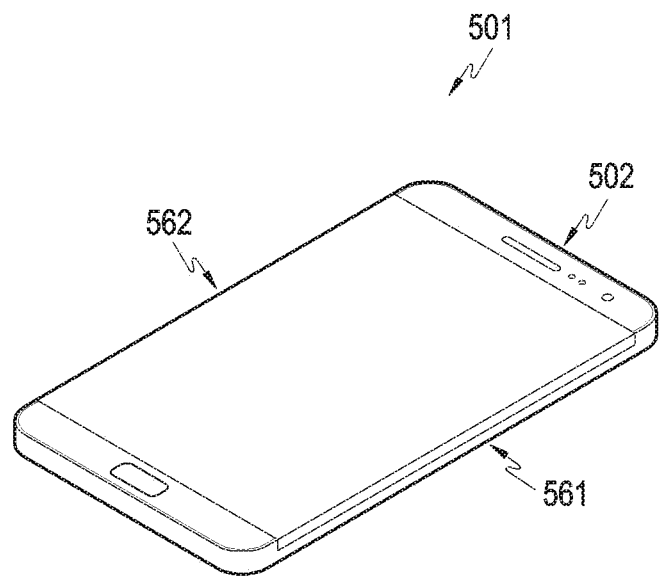
FIGS. 5(a) and 5(b) are views illustrating an exemplary electronic device including first and second displays according to various embodiments of the invention.
Figure 5B:
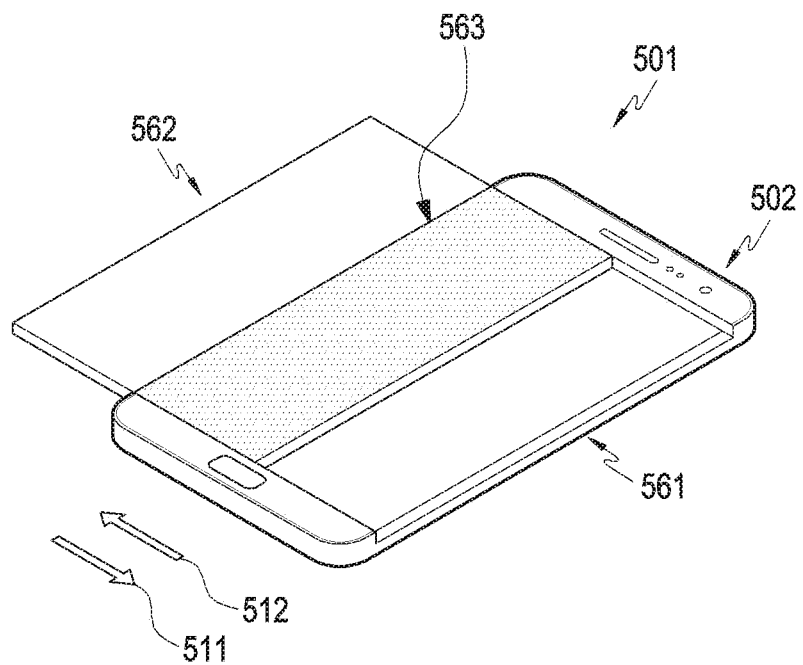

FIGS. 5(*a*) and 5(*b*) are views illustrating an electronic device including first and second displays according to various embodiments of the invention.

As illustrated in FIGS. 5(*a*) and 5(*b*), an electronic device 501 may be, for example, a smart phone.

As illustrated in FIG. 5(*a*), according to various embodiments, the electronic device 501 may include a housing 502, a first display 561 disposed on one surface of the housing 502, and a second display 562 which is disposed on one surface of the first display 561 and configured to slide to overlap with the first display 561 over at least a partial area.

As illustrated in FIG. 5(*b*), according to various embodiments, in the state where the second display 562 is fixed to the housing 502 and overlaps wholly with the first display 561, the second display 562 may slide in a second direction 512, decreasing the overlapped area between the second display 562 and the first display 561. According to various embodiments, in the state where the second display 562 is fixed to the housing 502 and does not overlap with or overlaps with the first display 561 over at least a partial area, the second display 562 may slide in a first direction 511, increasing the overlapped area between the second display 562 and the first display 561.

Figure 6A:
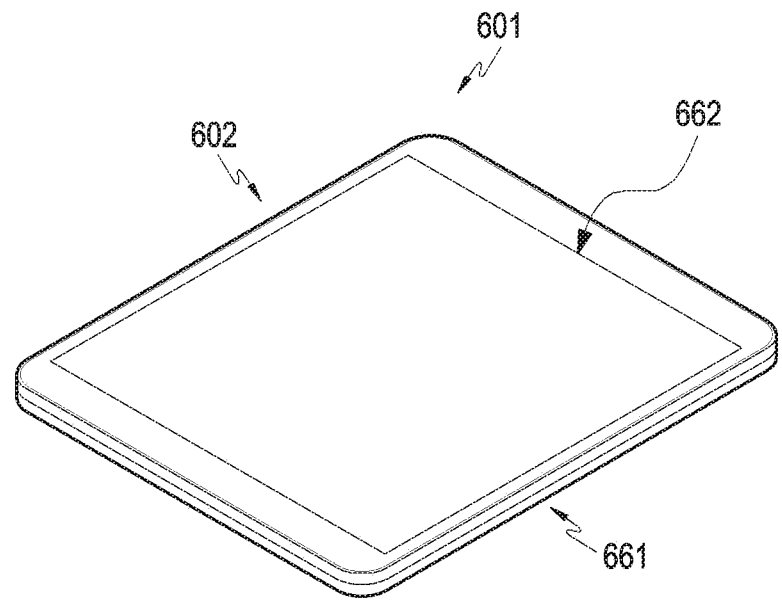
FIGS. 6(a) and 6(b) are views illustrating an exemplary electronic device including first and second displays according to various embodiments of the invention.
Figure 6B:
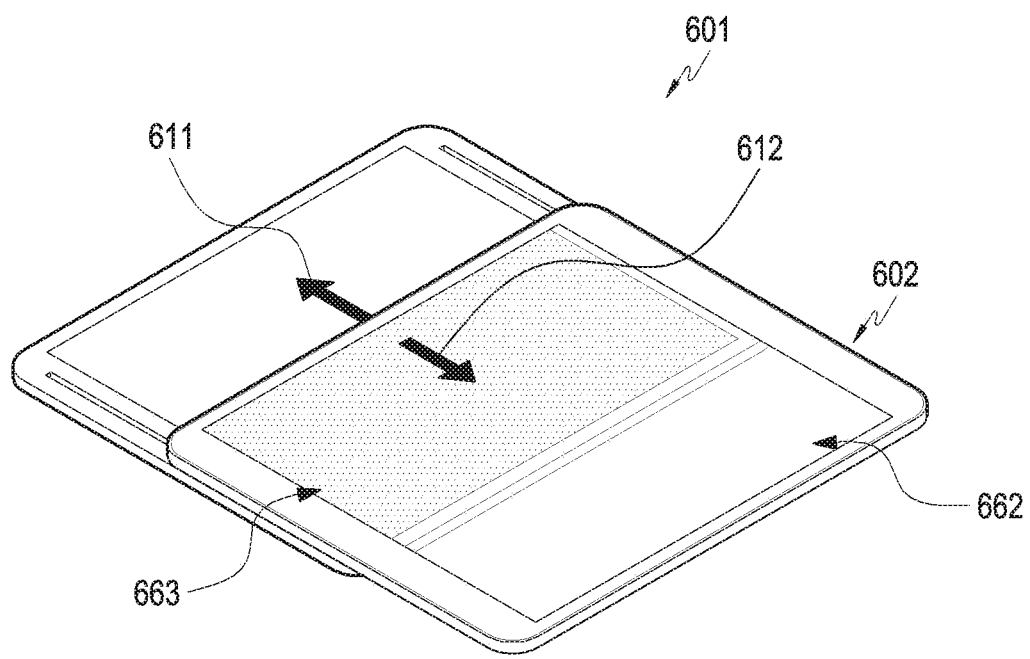

FIGS. 6(*a*) and 6(*b*) are views illustrating an electronic device including first and second displays according to various embodiments of the invention.

As illustrated in FIGS. 6(*a*) and 6(*b*), an electronic device 601 may be, for example, a tablet PC.

As illustrated in FIG. 6(*a*), according to various embodiments, the electronic device 601 may include a housing 602, a first display 661 disposed on one surface of the housing 602, and a second display 662 which is disposed on one surface of the first display 661 and configured to slide to overlap with the first display 661 over at least a partial area.

As illustrated in FIG. 6(*b*), according to various embodiments, in the state where the second display 662 is fixed to the housing 602 and overlaps wholly with the first display 661, the second display 662 may slide in a second direction 612, decreasing the overlapped area between the second display 662 and the first display 661. According to various embodiments, in the state where the second display 662 is fixed to the housing 602 and does not overlap with or overlaps with the first display 661 over at least a partial area, the second display 662 may slide in a first direction 611, increasing the overlapped area between the second display 662 and the first display 661.

Figure 7A:
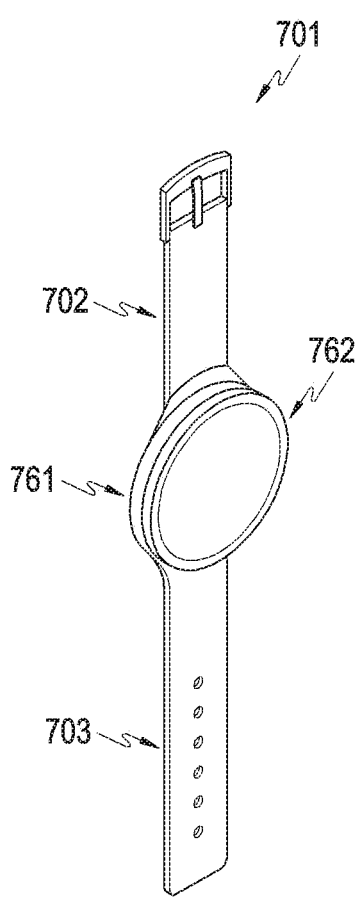
FIGS. 7(a) and 7(b) are views illustrating an exemplary electronic device including first and second displays according to various embodiments of the invention.
Figure 7B:
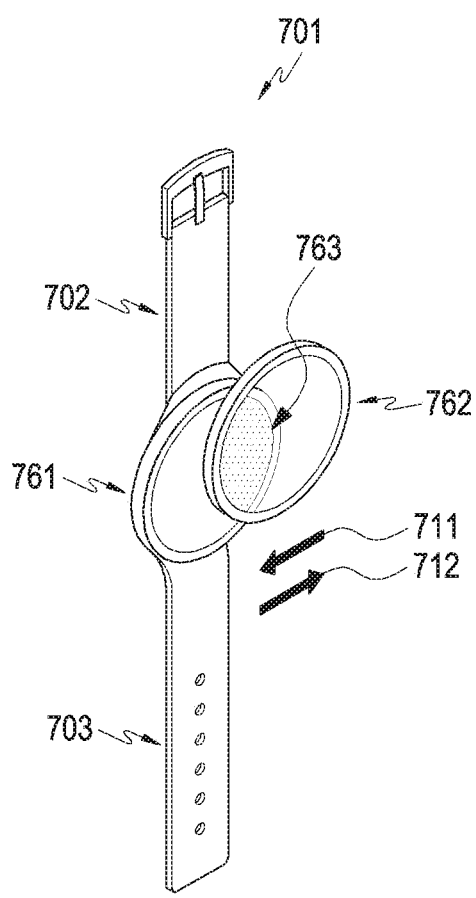

FIGS. 7(*a*) and 7(*b*) are views illustrating an electronic device including first and second displays according to various embodiments of the invention.

As illustrated in FIGS. 7(*a*) and 7(*b*), an electronic device 701 may be, for example, a wearable device (e.g., a wearable watch).

As illustrated in FIG. 7(*a*), according to various embodiments, the electronic device 701 may include straps 702 and 703, a first display 761 disposed between the straps 702 and 703, and a second display 762 which is disposed on one surface of the first display 761 and configured to slide to overlap with the first display 761 over at least a partial area.

As illustrated in FIG. 7(*b*), according to various embodiments, in the state where the second display 762 overlaps wholly with the first display 761, the second display 762 may slide in a second direction 712, decreasing the overlapped area between the second display 762 and the first display 761. According to various embodiments, in the state where the second display 762 does not overlap with or overlaps with the first display 761 over at least a partial area, the second display 762 may slide in a first direction 711, increasing the overlapped area between the second display 762 and the first display 761.

Figure 8A:
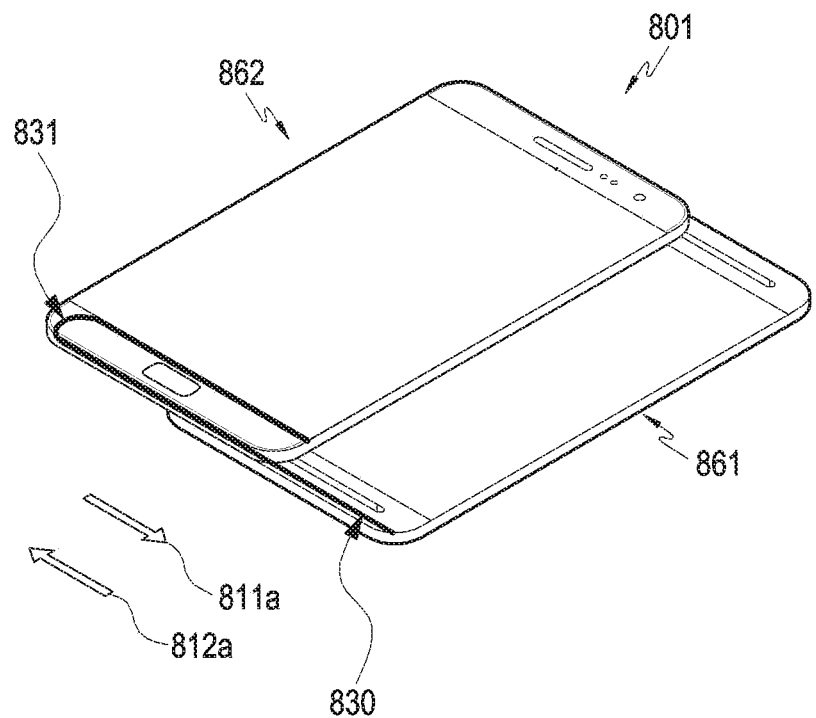
FIGS. 8(a) and 8(b) are views illustrating an exemplary sliding sensor in an electronic device according to various embodiments of the invention.

FIGS. 8(*a*) and 8(*b*) are views illustrating an exemplary sliding sensor in an electronic device according to various embodiments of the invention.

As illustrated in FIG. 8(*a*), according to various embodiments, an electronic device 801 may include a first display 861 and a second display 862. According to various embodiments, the second display 762 may slide in a second direction 812*a*, increasing the overlapped area between the second display 862 and the first display 861. According to various embodiments, the second display 862 may slide in a first direction 811a, decreasing the overlapped area between the second display 862 and the first display 861.

According to various embodiments, a processor (e.g., the processor 120) of the electronic device 801 may sense sliding of the second display 862 in the second direction 812a which increases the overlapped area between the second display 862 and the first display 861, and/or sliding of the second display 862 in the first direction 811a. According to various embodiments, the processor 120 may sense, through a sliding sensor 830, sliding of the second display 862 in the second direction 812a which increases the overlapped area between the second display 862 and the first display 861, and/or sliding of the second display 862 in the first direction 811a.

For example, the sliding sensor 830 may be embedded in the first display 861 and the second display 862.

Figure 8B:
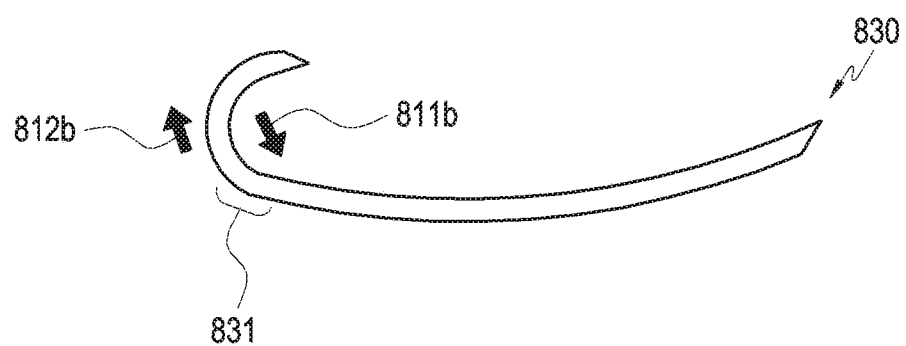

As illustrated in FIG. 8(b), the sliding sensor 830 may be, for example, a strip-type sensor. For example, the sliding sensor 830 may take the form of a strip, and may be bent or unfolded according to sliding in the first direction 811a and/or the second direction 812a.

According to various embodiments, the processor 120 may detect movement of a bent portion 831 of the sliding sensor 830, and detect a sliding direction of the second display 862 on the basis of the detected movement of the bent portion 831. According to various embodiments, the processor 120 may detect movement of the bent portion 831, and determine whether the sliding direction of the second display 862 is the first direction 811a or the second direction 812a on the basis of the detected movement of the bent portion 831. According to various embodiments, if detecting that the bent portion 831 has moved in a third direction 811b, the processor 120 may determine the sliding direction of the second display 862 to be the first direction 811a. According to various embodiments, if detecting that the bent portion 831 has moved in a fourth direction 812b, the processor 120 may determine the sliding direction of the second display 862 to be the second direction 811b.

According to various embodiments, the processor 120 may detect a position to which the bent portion 831 has moved in the sliding sensor 830 according to movement of the bent portion 831 of the sliding sensor 830. According to various embodiments, if the processor 120 detects the position to which the bent portion 831 has moved in the sliding sensor 830, the processor 120 may detect the size of the overlapped area between the second display 862 and the first display 861 on the basis of the detected position of the bent portion 831 in the sliding sensor 830.

Figure 9:
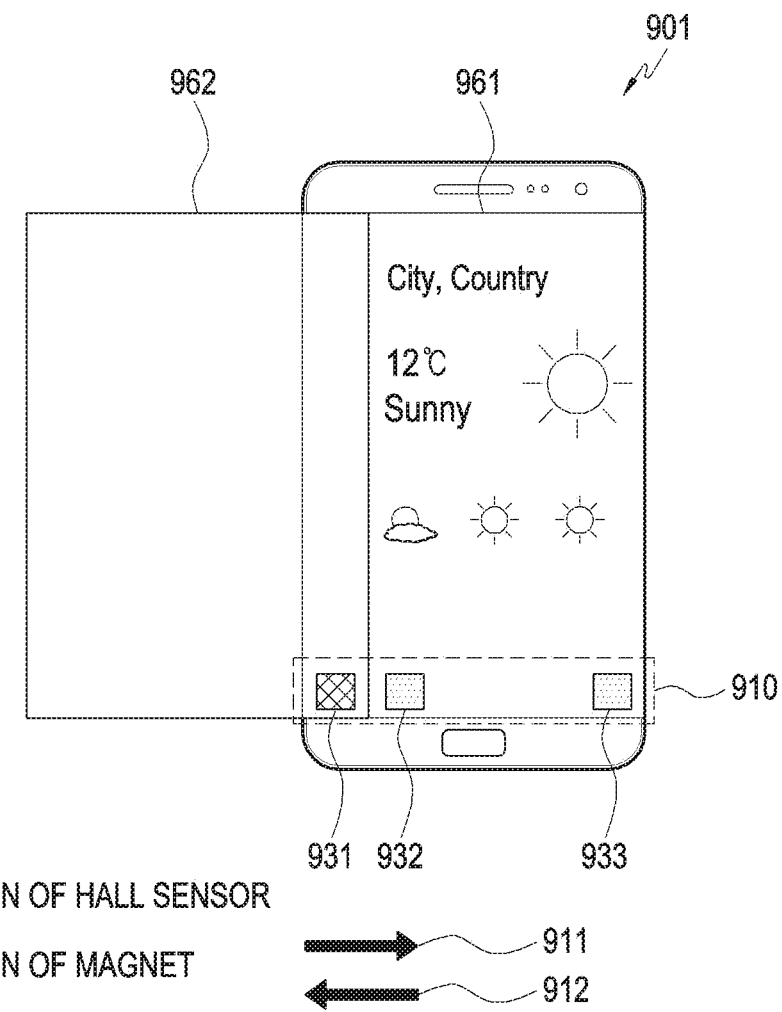
FIG. 9 is a view illustrating an exemplary sliding sensor in an electronic device according to various embodiments of the invention.

FIG. 9 illustrates an exemplary sliding sensor in an electronic device according to various embodiments of the invention.

According to various embodiments, an electronic device 901 may include a first display 961 and a second display 962. According to various embodiments, the second display 962 may slide in a second direction 912, decreasing the overlapped area between the second display 962 and the first display 961. According to various embodiments, the second display 962 may slide in a first direction 911, increasing the overlapped area between the second display 962 and the first display 961.

According to various embodiments, a processor (e.g., the processor 120) of the electronic device 901 may sense sliding of the second display 962 in the second direction 912 and/or sliding of the second display 962 in the first direction 911. According to various embodiments, the processor 120 may sense sliding of the second display 962 in the second direction 912 and/or sliding of the second display 962 in the first direction 911 through a sliding sensor 930.

For example, the sliding sensor 930 may include a hall sensor 931, a first magnet 932, and/or a second magnet 933. For example, the hall sensor 931 may sense a position variation between the hall sensor 931 and the first magnet 932 and/or the second magnet 933 according to sliding in the first direction 911 and/or sliding in the second direction 912.

According to various embodiments, the processor 120 may determine whether a sliding direction of the second display 962 is the first direction 911 or the second direction 912 on the basis of the position variation between the hall sensor 931 and the first magnet 932 and/or the second magnet 933, sensed by the hall sensor 931.

According to various embodiments, the processor 120 may detect the size of the overlapped area between the second display 962 and the first display 961 on the basis of the position variation between the hall sensor 931 and the first magnet 932 and/or the second magnet 933, sensed by the hall sensor 931.

Figure 10:
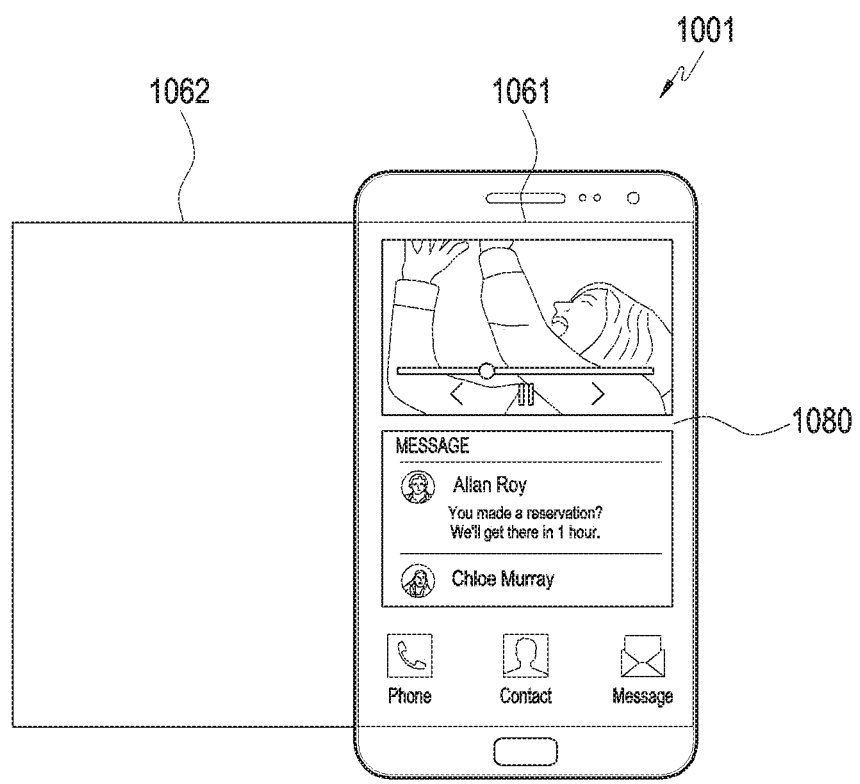
FIG. 10 is a view illustrating an electronic device according to various embodiments of the invention.

FIG. 10 is a view illustrating an electronic device according to various embodiments of the invention.

As illustrated in FIG. 10, according to various embodiments, an electronic device 1001 may include a first display 1061 and a second display 1062.

According to various embodiments, a processor (e.g., the processor 120) may display first content on the first display 1061 and/or the second display 1062.

According to various embodiments, the processor 120 may display an idle screen on the first display 1061.

According to various embodiments, the processor 120 may execute an application (e.g., a sound source play application), and display an execution screen 1080 of the executed application (an execution screen of the sound source play application) on the first display 1061 and/or the second display 1062.

Figure 11A:
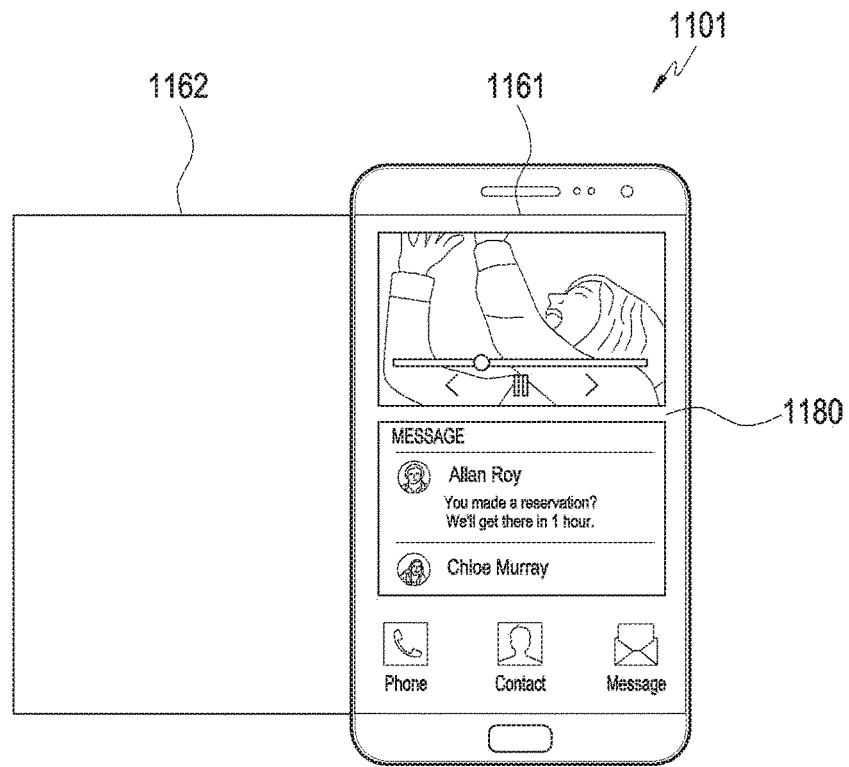
FIGS. 11(a) and 11(b) are views illustrating an electronic device according to various embodiments of the invention.
Figure 11B:
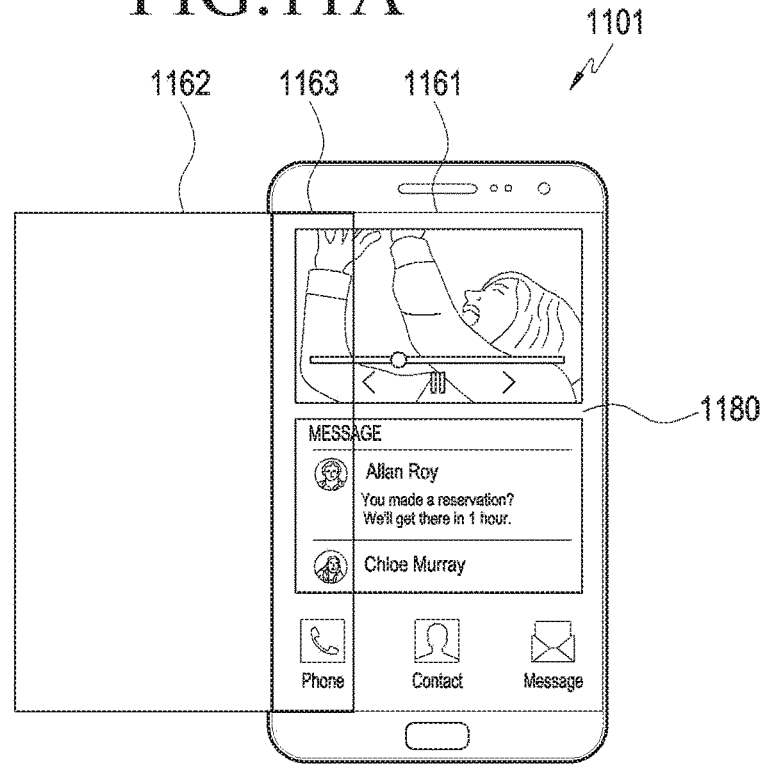

FIGS. 11(a) and 11(b) are views illustrating an electronic device according to various embodiments of the invention.

As illustrated in FIG. 11(a), according to various embodiments, the electronic device 1101 may include a first display 1161, and a second display 1162 which slides to overlap with the first display 1161 over at least a partial area. According to various embodiments, a processor (e.g., the processor 120) may display a sound source play application screen 1180 including sound source information (e.g., first content) on the first display 1161 and/or the second display 1162. According to various embodiments, the processor (e.g., the processor 120) may execute a sound source play application including the sound source information (e.g., the first content), and display the execution screen 1180 of the executed sound source play application on the first display 1161 and/or the second display 1162.

As illustrated in FIG. 11(b), according to various embodiments, the second display 1162 of the electronic device 1101 may slide in a first direction 1111 so that at least a partial area 1163 of the second display 1162 may overlap with the first display 1161 which displays the execution screen 1180 including the sound source information (e.g., the first content).

According to various embodiments, the second display 1162 may be a transparent display. According to various embodiments, if the second display 1162 slides in the first direction 1111 so that the at least partial area 1163 of the second display 1162 may overlap with the first display 1161 which displays the execution screen 1180 of the sound source play application, a user may view part of the execution screen 1180 of the sound source play application displayed on the first display 1161, through the at least partial area 1163 of the second display 1162.

Figure 12A:
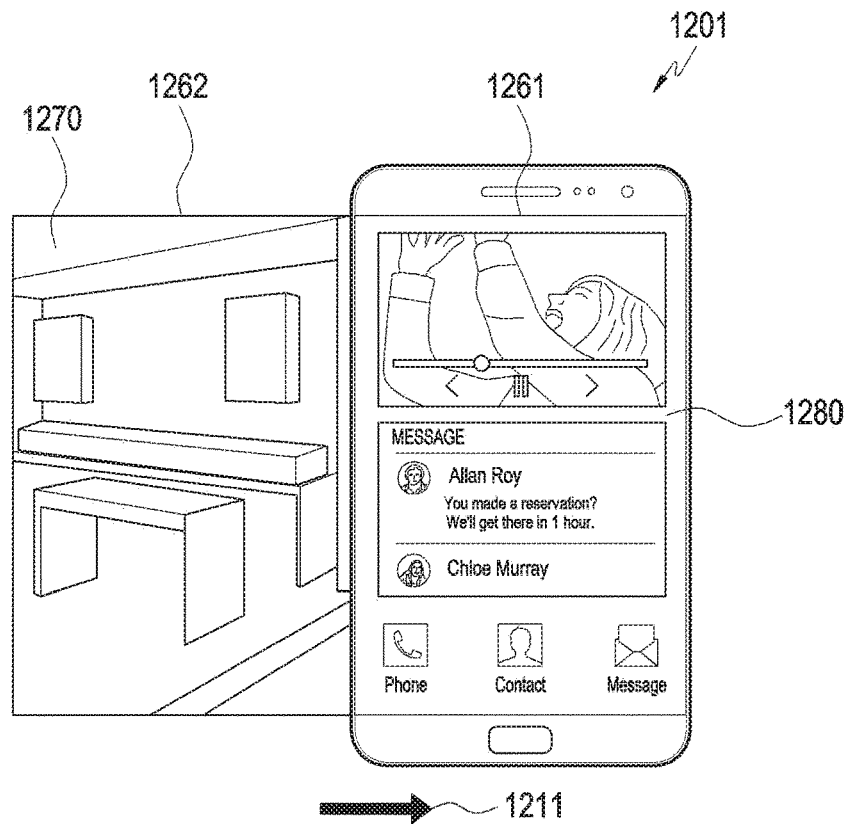
FIG. 12 is a view illustrating an electronic device which displays first content according to various embodiments of the invention.
Figure 12B:
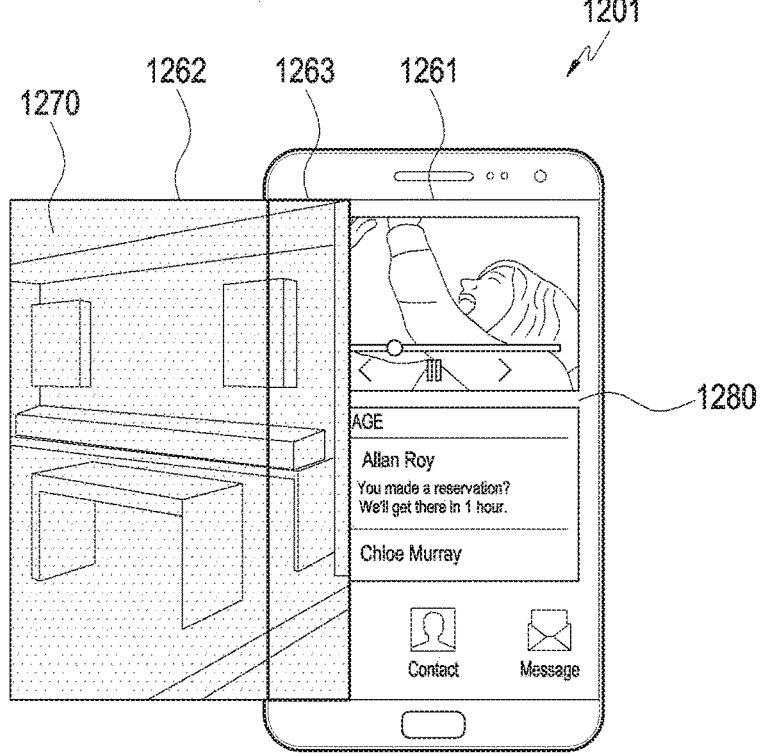

FIG. 12 illustrates an electronic device which displays first content according to various embodiments of the invention.

As illustrated in FIG. 12, according to various embodiments, an electronic device 1201 may include a first display 1261, and a second display 1262 which slides to overlap with the first display 1261 over at least a partial area.

According to various embodiments, a processor (e.g., the processor 120) may display first content on the first display 1261 and/or the second display 1262.

According to various embodiments, the processor 120 may display the first content on the first display 1261 and/or second content on the second display 1262.

According to various embodiments, the processor 120 may execute an application, and display an execution screen of the executed application on the first display 1261 and/or the second display 1262.

According to various embodiments, the processor 120 may execute a first application and/or a second application, and display an execution screen of the executed first application on the first display 1261 and/or an execution screen of the executed second application on the second display 1262.

According to various embodiments, the processor 120 may execute a gallery application, and display an execution screen 1270 of the executed gallery application on the first display 1261 and/or the second display 1262.

According to various embodiments, the processor 120 may display an idle screen 1280 on the first display 1261 and/or the second display 1262.

According to various embodiments, with the execution screen 1270 of the executed gallery application displayed on the second display 1262, and the idle screen 1280 displayed on the first display 1261, the second display 1261 displaying the execution screen 1270 of the gallery application may slide in a first direction 1211 so that at least a partial area 1263 of the second display 1262 may overlap with the first display 1261 displaying the idle screen 1280.

According to various embodiments, if the second display 1262 displaying the execution screen 1270 of the gallery application slides in the first direction 1211 so that the at least partial area 1263 of the second display 1262 may overlap with the first display 1261 displaying the idle screen 1280, the processor 120 may sense the sliding in the first direction 1211 through a sliding sensor (e.g., the sliding sensor 830 or 930).

Figure 13:
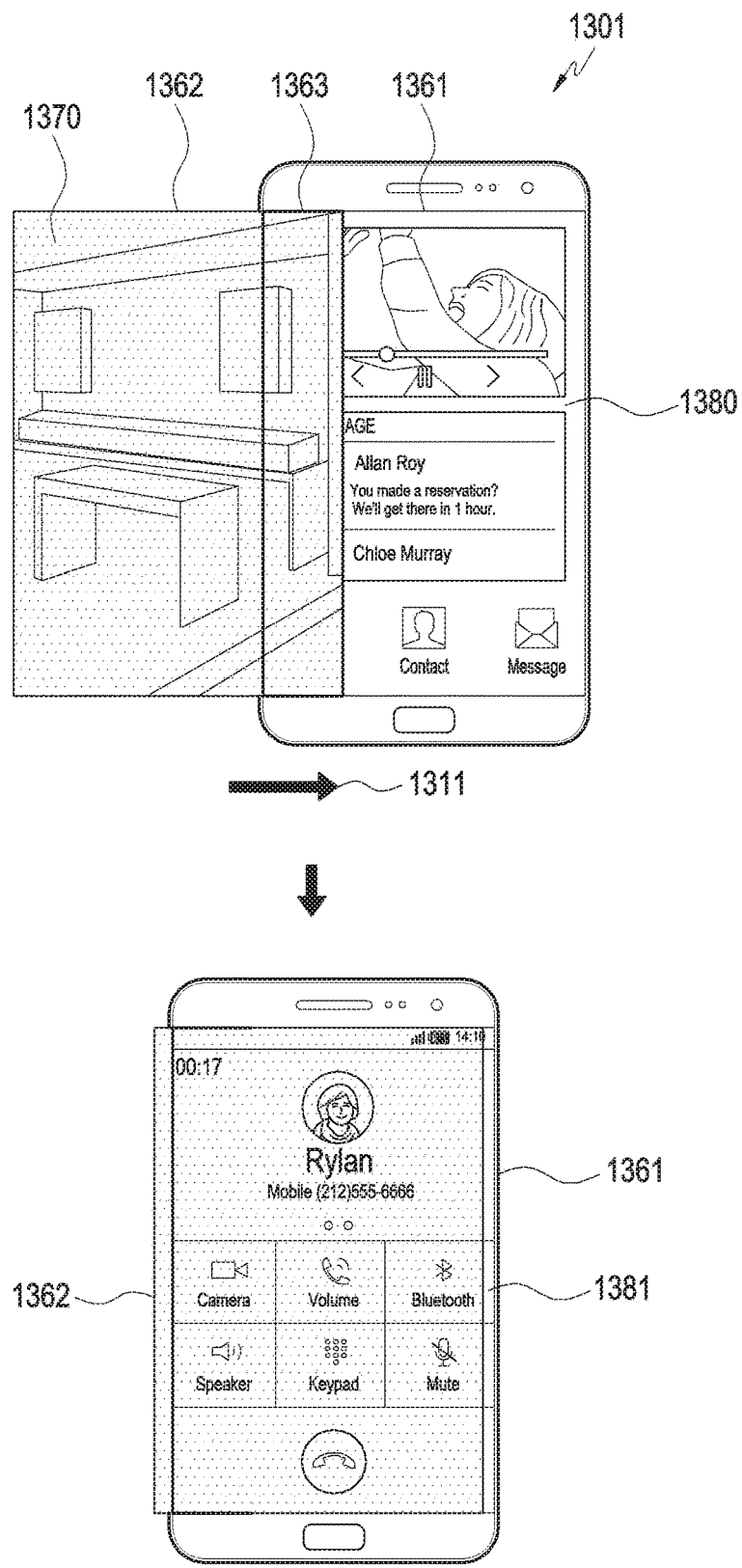
FIG. 13 is a view illustrating an electronic device which displays at least one piece of content related to first content according to various embodiments of the invention.

FIG. 13 illustrates an electronic device which displays at least one piece of content related to first content according to various embodiments of the invention.

As illustrated in FIG. 13, according to various embodiments, if a second display 1362 which displays an execution screen 1370 of a gallery application slides in a first direction 1311 so that at least a partial area 1363 of the second display 1362 may overlap with a first display 1361 which displays an idle screen 1380, the processor 120 may sense the sliding in the first direction 1311 through a sliding sensor (e.g., the sliding sensor 830 or 930).

According to various embodiments, after the second display 1362 which displays the execution screen 1370 of the gallery application slides in the first direction 1311 so that the at least partial area 1363 of the second display 1362 may overlap with the first display 1361 which displays the idle screen 1380, if the second display 1362 further slides in the first direction 1311 so as to overlap wholly with the first display 1361, the processor 120 may sense, through the sliding sensor (e.g., the sliding sensor 830 or 930), the sliding of the second display 1362 in the first direction 1311, which incurs full overlap between the second display 1362 and the first display 1361.

According to various embodiments, after the processor 120 senses, through the sliding sensor (e.g., the sliding sensor 830 or 930), the sliding of the second display 1362 in the first direction 1311, which incurs full overlap between the second display 1362 and the first display 1361, the processor 120 may display a transparent screen, instead of the gallery application screen 1370 displayed on the second display 1362.

According to various embodiments, the transparent screen may refer to a screen without any information.

According to various embodiments, after the processor 120 senses, through the sliding sensor (e.g., the sliding sensor 830 or 930), the sliding of the second display 1362 in the first direction 1311, which incurs full overlap between the second display 1362 and the first display 1361, the processor 120 may acquire place information "Rylan" included in the execution screen of the gallery application displayed on the second display 1362.

According to various embodiments, the processor 130 may acquire the place information "Rylan" included in the execution screen of the gallery application displayed on the second display 1362, and execute a contacts application related to the place information "Rylan" on the basis of the acquired place information "Rylan" and/or the sliding in the first direction 1311. For example, the processor 120 may detect contacts information related to the place information "Rylan" by the executed contacts application, and request dialing to the detected contacts information.

According to various embodiments, the processor 120 may display, on the first display 1361, an execution screen 1381 of the contacts application related to the place information "Rylan", which has been executed on the basis of the acquired place information "Rylan". For example, the execution screen 1381 of the contacts application related to the place information "Rylan" may be a screen requesting dialing to the contacts information detected in the contacts application executed on the basis of the acquired place information "Rylan" and/or the sliding in the first direction 1311.

According to various embodiments, after the processor 120 senses the sliding of the second display 1362 in the first direction 1311, which incurs full overlap between the second display 1362 and the first display 1361, the processor 120 may display a transparent screen on the second display 1362 and/or the contacts application screen 1381 related to the gallery application screen on the first display 1361 on the basis of the gallery application screen displayed on the second display 1362 and/or the sliding in the first direction 1311.

Figure 14:
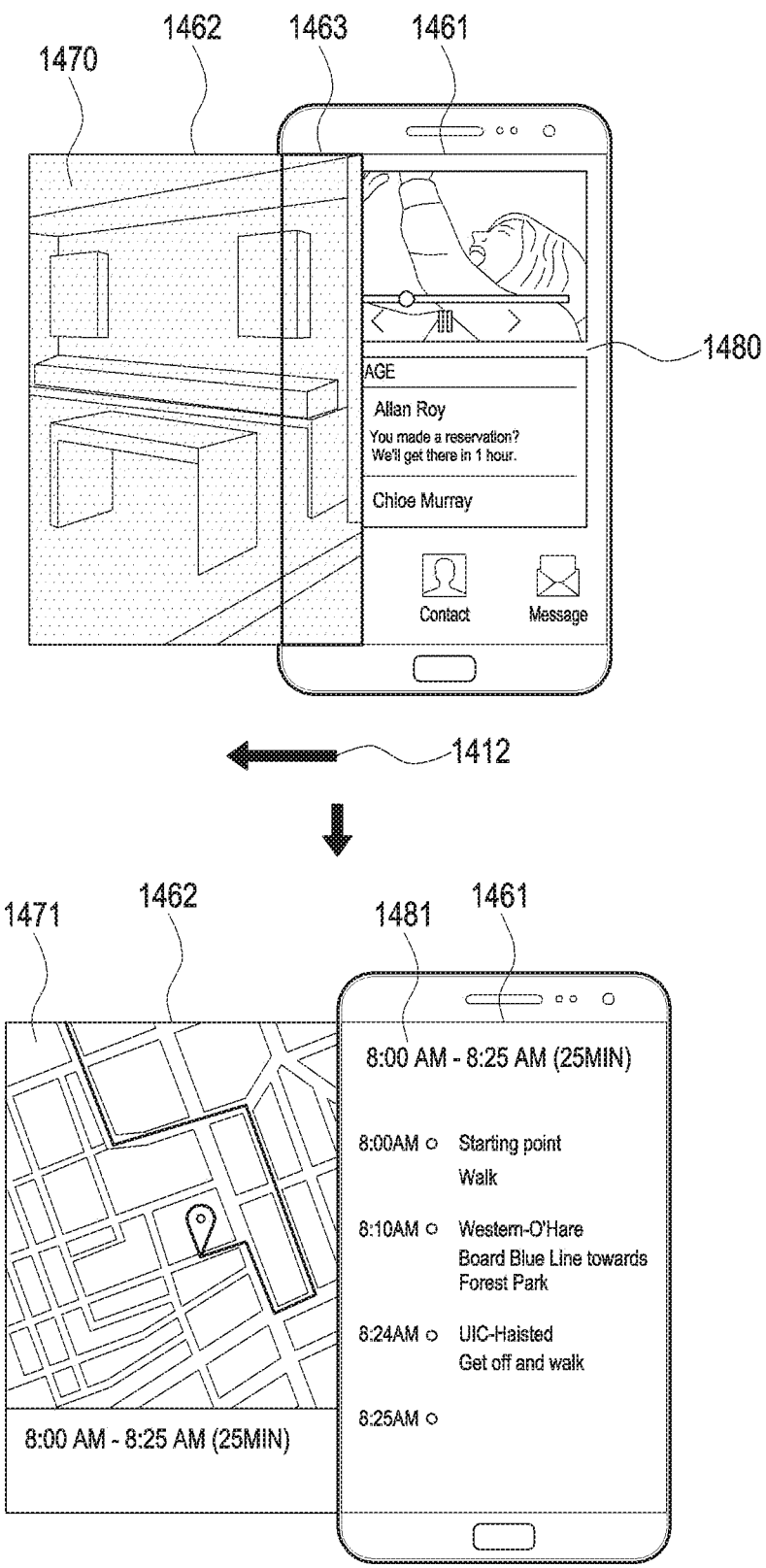
FIG. 14 is a view illustrating an electronic device which displays at least one piece of content related to first content according to various embodiments of the invention.

FIG. 14 illustrates an electronic device which displays at least one piece of content related to first content according to various embodiments of the invention.

As illustrated in FIG. 14, according to various embodiments, if a second display 1462 which displays an execution screen 1470 of a gallery application slides in a first direction 1411 so that at least a partial area 1463 of the second display 1462 may overlap with a first display 1461 which displays an idle screen 1480, the processor 120 may sense the sliding in the first direction 1411 through a sliding sensor (e.g., the sliding sensor 830 or 930).

According to various embodiments, after the second display 1462 displaying the execution screen 1480 of the gallery application slides in the first direction 1411 so that the at least partial area 1463 of the second display 1462 may overlap with the first display 1461 which displays the idle screen 1480, if the second display 1462 slides in a second direction 1412, decreasing the overlapped area 1463 between the second display 1462 and the first display 1461, the processor 120 may sense, through the sliding sensor (e.g., the sliding sensor 830 or 930), that the second display 1462 has slided in the second direction 1412, decreasing the overlapped area 1463 between the second display 1462 and the first display 1461.

According to various embodiments, after the processor 120 senses, through the sliding sensor (e.g., the sliding sensor 830 or 930), that the second display 1462 has slided in the second direction 1412, decreasing the overlapped area 1463 between the second display 1462 and the first display 1461, the processor 120 may display a first screen 1471 of a navigation application on the second display 1462, instead of the gallery application screen 1470, and a second screen 1481 of the navigation application on the first display 1461, instead of an idle screen 1480, on the basis of the gallery application screen displayed on the second display 1462 and/or the sliding in the second direction 1412.

According to various embodiments, after the processor 120 senses, through the sliding sensor (e.g., the sliding sensor 830 or 930), that the second display 1462 has slided in the second direction 1412, decreasing the overlapped area 1463 between the second display 1462 and the first display 1461, the processor 120 may acquire place information "Rylan" included in the execution screen of the gallery application displayed on the second display 1462.

According to various embodiments, the processor 130 may acquire the place information "Rylan" included in the execution screen of the gallery application displayed on the second display 1462, and execute a navigation application related to the place information "Rylan" on the basis of the acquired place information "Rylan" and/or the sliding in the second direction 1412. For example, the processor 120 may detect location information related to the place information "Rylan" by the executed navigation application, and execute navigation to the detected location information.

For example, the first screen 1471 and the second screen 1481 of the navigation application related to the place information "Rylan" may be screens through which navigation to the detected location information is performed.

Figure 15:
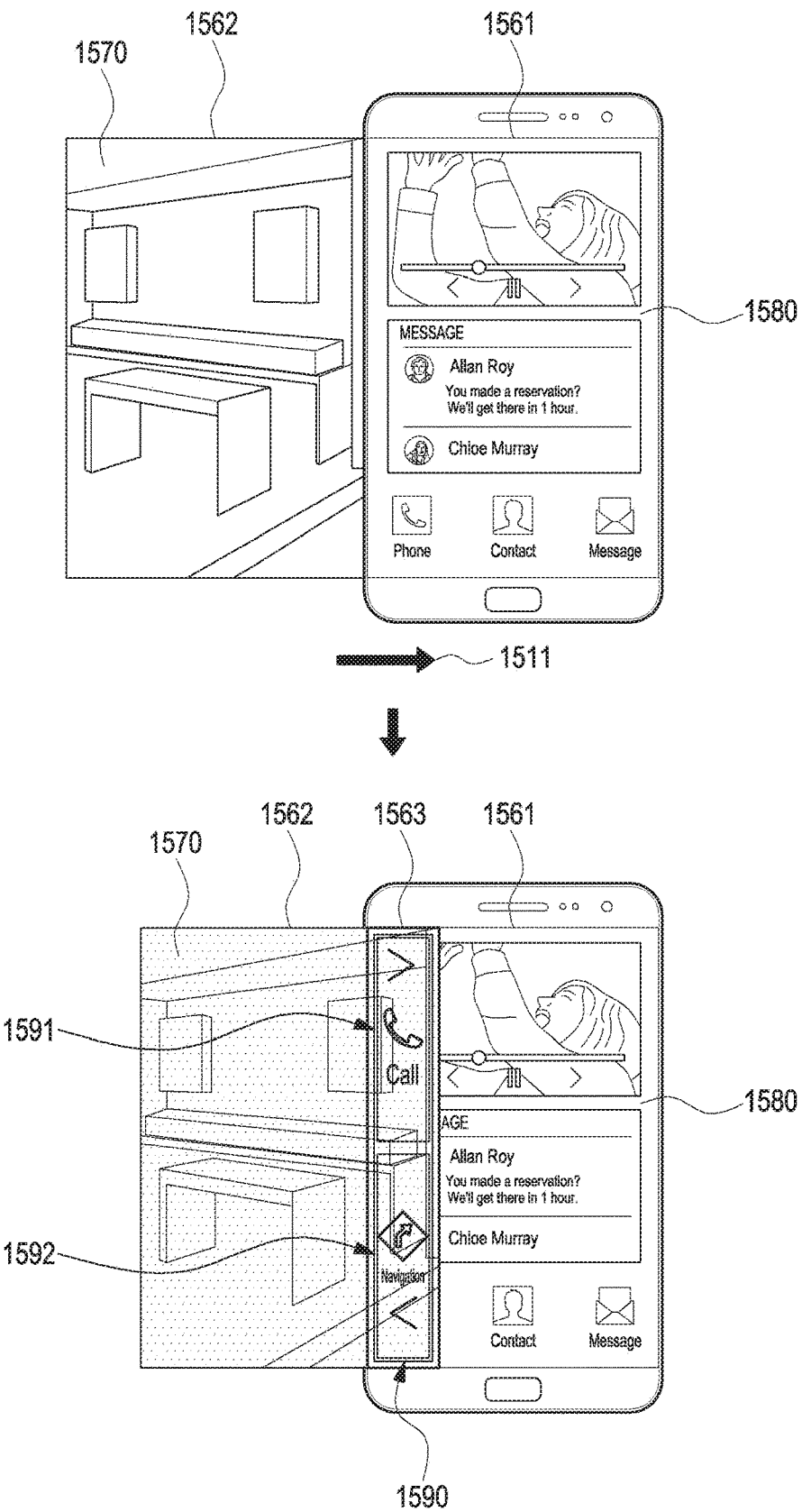
FIG. 15 is a view illustrating an electronic device which displays first content and guide information according to various embodiments of the invention.

FIG. 15 illustrates an electronic device which displays first content and guide information according to various embodiments of the invention.

As illustrated in FIG. 15, according to various embodiments, an electronic device (e.g., the electronic device 101) may include a first display 1561, and a second display 1562 which slides so as to overlap with the first display 1561 over at least a partial area.

According to various embodiments, a processor (e.g., the processor 120) may display first content on the first display 1561 and/or the second display 1562.

According to various embodiments, the processor 120 may display the first content on the first display 1561 and/or second content on the second display 1562.

According to various embodiments, the processor 120 may execute an application, and display an execution screen of the executed application on the first display 1561 and/or the second display 1562.

According to various embodiments, the processor 120 may execute a first application and/or a second application, and display an execution screen of the first application on the first display 1561 and/or an execution screen of the second application on the second display 1562.

According to various embodiments, the processor 120 may execute a gallery application, and display an execution screen 1570 of the executed gallery application on the first display 1561 and/or the second display 1562.

According to various embodiments, with the execution screen 1570 of the gallery application displayed on the second display 1562, and an idle screen 1580 displayed on the first display 1561, the second display 1562 displaying the execution screen 1570 of the gallery application may slide in a first direction 1511 so that at least a partial area 1563 of the second display 1562 may overlap with the first display 1561 displaying the idle screen 1580.

According to various embodiments, if the second display 1562 displaying the execution screen 1570 of the gallery application slides in the first direction 1511 so that the at least partial area 1563 of the second display 1562 may overlap with the first display 1561 displaying the idle screen 1580, the processor 120 may sense the sliding in the first direction 1511 through a sliding sensor (e.g., the sliding sensor 830 or 930).

According to various embodiments, if the processor 120 senses through the sliding sensor (e.g., the sliding sensor 830 or 930) that the second display 1562 has slided in the first direction 1511 so that the at least partial area 1563 of the second display 1562 may overlap with the first display 1561, the processor 120 may display guide information (e.g., user guide information) 1590 for displaying at least one piece of content related to first content (e.g., the execution screen 1570 of the gallery application) in the overlapped at least partial area 1563.

For example, the guide information 1590 for displaying at least one piece of content related to the execution screen 1570 of the gallery application may include call guide information 1591 including a guide tab indicating the first direction 1511 (e.g., an arrow directed in the first direction 1511) and/or a function tab representing a function of requesting dialing to place information "Rylan" included in the gallery application execution screen 1570, a function of executing a contacts application according to the dialing request, and/or a function of displaying an execution screen of the contacts application on the first display 1561.

For example, the guide information 1590 for displaying at least one piece of content related to the execution screen 1570 of the gallery application may include navigation guide information 1592 including a guide tab indicating the second direction 1512 (e.g., an arrow directed in the second direction 1512) and/or a function tab representing a function of detecting location information related to the place information "Rylan" included in the execution screen 1570 of the gallery application, and/or a function of executing navigation to the detected location information, and/or a function of displaying an execution screen of the navigation application on the second display 1562.

Figure 16:
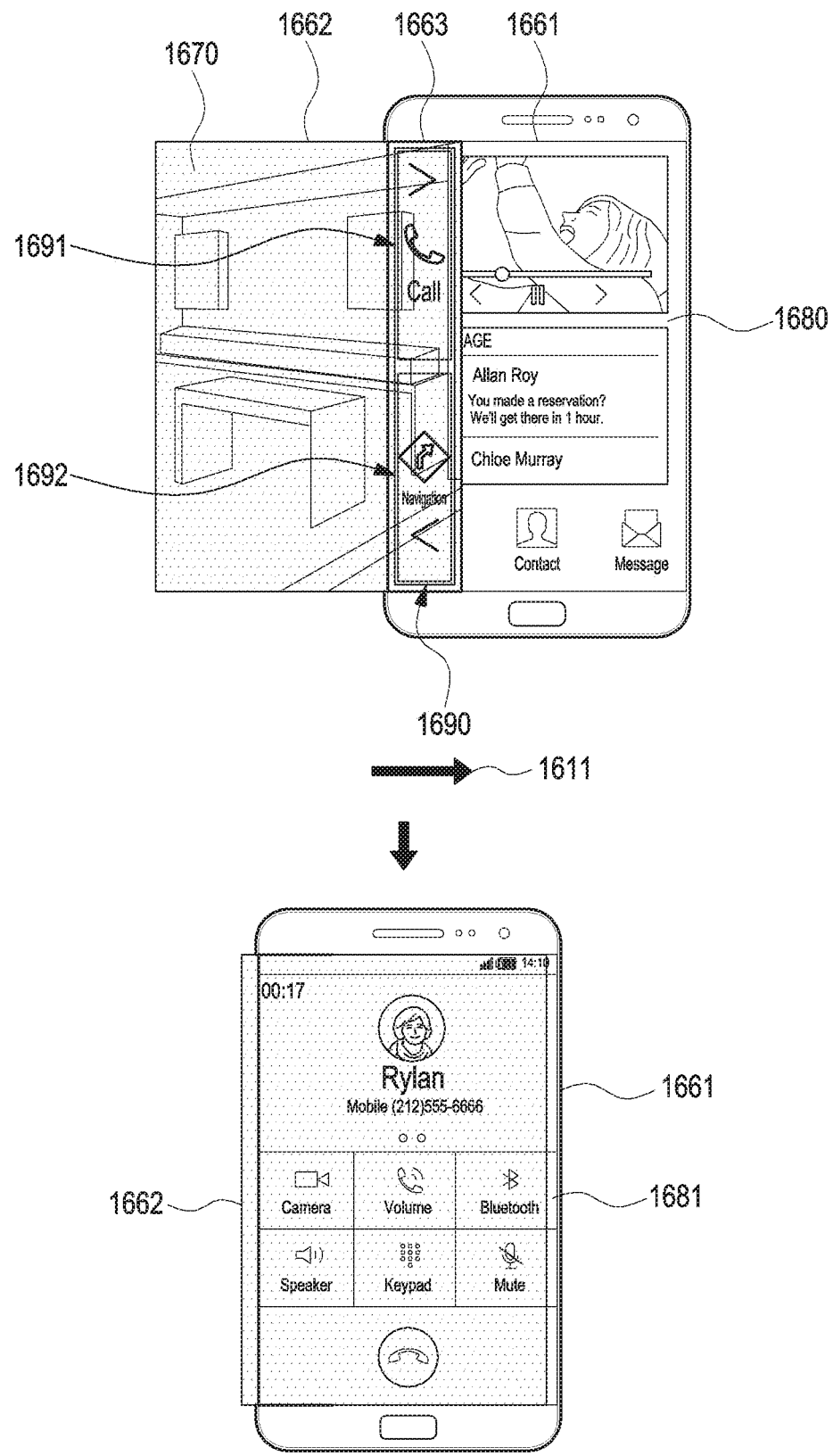
FIG. 16 is a view illustrating an electronic device which displays at least one piece of content related to first content according to various embodiments of the invention.

FIG. 16 illustrates an electronic device which displays at least one piece of content related to first content according to various embodiments of the invention.

As illustrated in FIG. 16, according to various embodiments, if a second display 1662 displaying an execution screen 1670 of a gallery application slides in a first direction 1611 so that at least a partial area 1663 of the second display 1662 may overlap with a first display 1661 displaying an idle screen 1680, the processor 120 may sense the sliding in the first direction 1611 through a sliding sensor (e.g., the sliding sensor 830 or 930).

According to various embodiments, if the processor 120 senses through the sliding sensor (e.g., the sliding sensor 830 or 930) that the second display 1662 has slided in the first direction 1611 so that the at least partial area 1663 of the second display 1662 may overlap with the first display 1661, the processor 120 may display guide information 1690 for displaying at least one piece of content related to first content (e.g., the execution screen 1670 of the gallery application) in the overlapped at least partial area 1663.

For example, the guide information 1690 for displaying at least one piece of content related to the execution screen 1670 of the gallery application may include call guide information 1691 including a guide tab indicating the first direction 1611 (e.g., an arrow directed in the first direction 1611) and/or a function tab representing a function of requesting dialing to place information "Rylan" included in the execution screen 1670 of the gallery application, a function of executing a contacts application according to the dialing request, and/or a function of displaying an execution screen of the contacts application on the first display 1661.

For example, the guide information 1690 for displaying at least one piece of content related to the execution screen 1670 of the gallery application may include navigation guide information 1692 including a guide tab indicating the second direction 1612 (e.g., an arrow directed in the second direction 1612) and/or a function tab representing a function of detecting location information related to the place information "Rylan" included in the execution screen 1670 of the gallery application, and/or a function of executing navigation to the detected location information, and/or a function of displaying an execution screen of the navigation application on the second display 1662.

According to various embodiments, after the second display 1662 displaying the execution screen 1670 of the gallery application slides in the first direction 1611 so that the at least partial area 1663 of the second display 1662 may overlap with the first display 1661 displaying the idle screen 1680, if the second display 1662 slides in the first direction 1611 so as to overlap wholly with the first display 1661, the processor 120 may sense through the sliding sensor (e.g., the sliding sensor 830 or 930) that the second display 1662 has slided in the first direction 1611 so as to overlap wholly with the first display 1661.

According to various embodiments, after the processor 120 senses through the sliding sensor (e.g., the sliding sensor 830 or 930) that the second display 1662 has slided in the first direction 1611 so as to overlap wholly with the first display 1661, the processor 120 may display a transparent screen, instead of the gallery application screen 1670 displayed on the second display 1662.

According to various embodiments, after the processor 120 senses through the sliding sensor (e.g., the sliding sensor 830 or 930) that the second display 1662 has slided in the first direction 1611 so as to overlap wholly with the first display 1661, the processor 120 may acquire place information "Rylan" included in the gallery application execution screen displayed on the second display 1662.

According to various embodiments, the processor 130 may acquire the place information "Rylan" included in the execution screen of the gallery application displayed on the second display 1662, and execute a contacts application related to the place information "Rylan" on the basis of the acquired place information "Rylan" and/or the sliding in the first direction 1611. For example, the processor 120 may detect contacts information related to the place information "Rylan" by the executed contacts application, and request dialing to the detected contacts information.

According to various embodiments, the processor 120 may display, on the first display 1661, an execution screen 1681 of the contacts application related to the place information "Rylan", which has been executed on the basis of the acquired place information "Rylan". For example, the execution screen 1681 of the contacts application related to the place information "Rylan" may be a screen requesting dialing to the contacts information detected in the contacts application executed on the basis of the acquired place information "Rylan" and/or the sliding in the first direction 1611.

According to various embodiments, after the processor 120 senses, through the sliding sensor 830 or 930, that the second display 1662 has slided in the first direction 1611 so that the second display 1662 may overlap wholly with the first display 1661, the processor 120 may display a transparent screen on the second display 1662 and/or the contacts application screen 1681 related to the gallery application screen on the first display 1661 on the basis of the gallery application screen displayed on the second display 1662 and/or the sliding in the first direction 1611.

Figure 17:
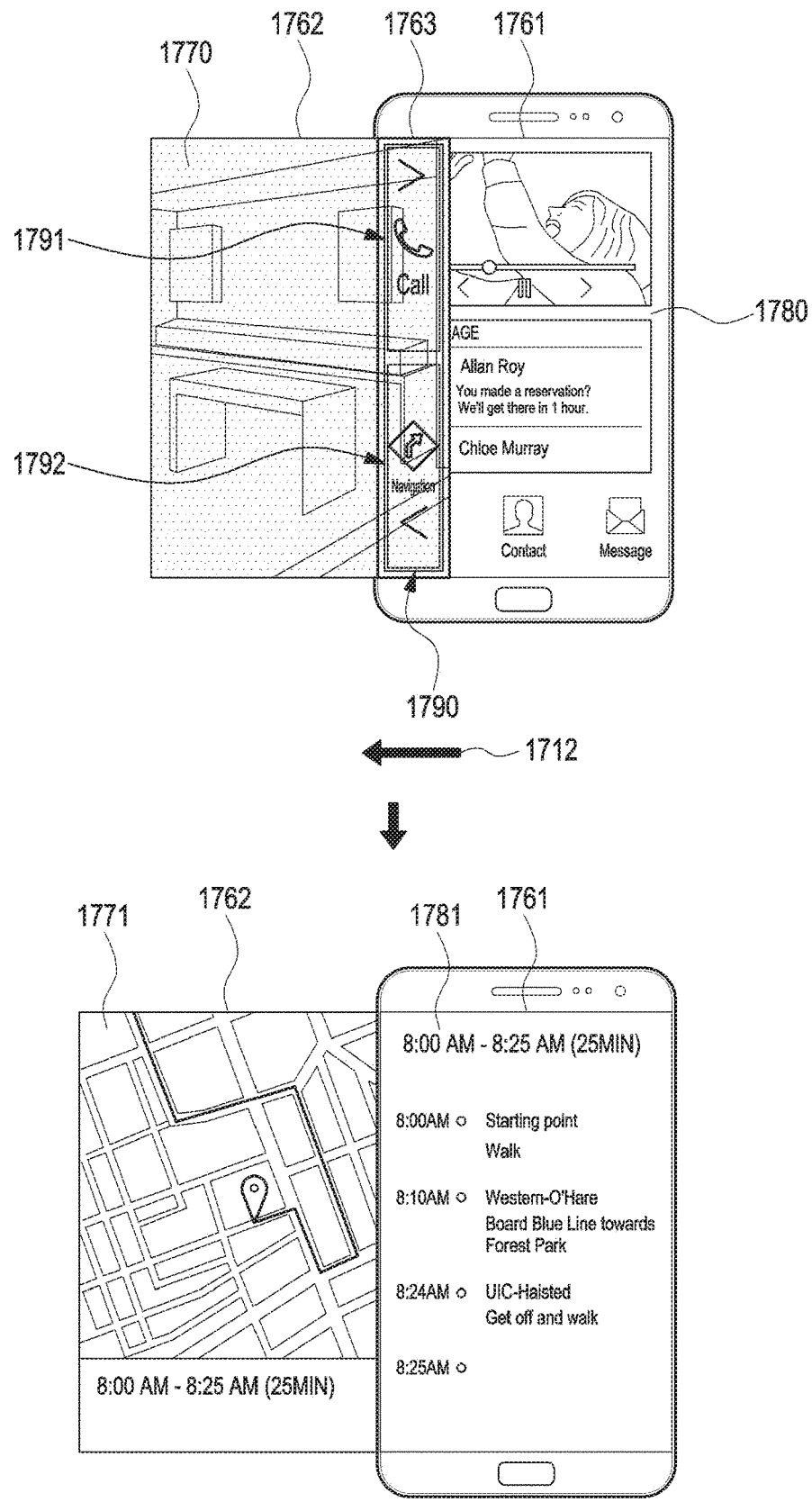
FIG. 17 is a view illustrating an electronic device which displays at least one piece of content related to first content according to various embodiments of the invention.

FIG. 17 illustrates an electronic device which displays at least one piece of content related to first content according to various embodiments of the invention.

As illustrated in FIG. 17, according to various embodiments, if a second display 1762 displaying an execution screen 1770 of a gallery application slides in a first direction 1711 so that at least a partial area 1763 of the second display 1762 may overlap with a first display 1761 displaying an idle screen 1780, the processor 120 may sense the sliding in the first direction 1711 through a sliding sensor (e.g., the sliding sensor 830 or 930).

According to various embodiments, if the processor 120 senses, through the sliding sensor 830 or 930, that the second display 1662 has slided in the first direction 1611 so that the at least partial area 1663 of the second display 1662 may overlap with the first display 1761, the processor 120 may display guide information 1790 for displaying at least one piece of content related to first content (e.g., the execution screen 1770 of the gallery application) in the overlapped at least partial area 1763.

For example, the guide information 1790 for displaying at least one piece of content related to the execution screen 1770 of the gallery application may include call guide information 1791 including a guide tab indicating the first direction 1711 (e.g., an arrow directed in the first direction 1711) and/or a function tab representing a function of requesting dialing to place information "Rylan" included in the execution screen 1770 of the gallery application, a function of executing a contacts application according to the dialing request, and/or a function of displaying an execution screen of the contacts application on the first display 1761.

For example, the guide information 1790 for displaying at least one piece of content related to the execution screen 1770 of the gallery application may include navigation guide information 1792 including a guide tab indicating the second direction 1712 (e.g., an arrow directed in the second direction 1712) and/or a function tab representing a function of detecting location information related to the place information "Rylan" included in the execution screen 1770 of the gallery application, and/or a function of executing navigation to the detected location information, and/or a function of displaying an execution screen of the navigation application on the second display 1762.

According to various embodiments, after the second display 1762 displaying the execution screen 1770 of the gallery application slides in the first direction 1711 so that the at least partial area 1763 of the second display 1762 may overlap with the first display 1761 displaying the idle screen 1780, if the second display 1762 slides in a second direction 1712, decreasing the overlapped area 1763 between the second display 1762 and the first display 1761, the processor 120 may sense, through the sliding sensor (e.g., the sliding sensor 830 or 930), that the second display 1762 has slided in the second direction 1712, decreasing the overlapped area 1763 between the second display 1762 and the first display 1761.

According to various embodiments, after the processor 120 senses, through the sliding sensor (e.g., the sliding sensor 830 or 930), that the second display 1762 has slided in the second direction 1712, decreasing the overlapped area 1763 between the second display 1762 and the first display 1761, the processor 120 may display a first screen 1771 of the navigation application on the second display 1762, instead of the gallery application screen 1770 on the basis of the gallery application screen displayed on the second display 1762 and/or the sliding in the second direction 1712.

According to various embodiments, after the processor 120 senses, through the sliding sensor 830 or 930, that the second display 1762 has slided in the second direction 1712, decreasing the overlapped area 1763 between the second display 1762 and the first display 1761, the processor 120 may acquire the place information "Rylan" included in the execution screen of the gallery application displayed on the second display 1762.

According to various embodiments, the processor 130 may acquire the place information "Rylan" included in the execution screen of the gallery application displayed on the second display 1762, and execute the navigation application related to the place information "Rylan" on the basis of the acquired place information "Rylan" and/or the sliding in the second direction 1712. For example, the processor 120 may detect location information related to the place information "Rylan" and execute navigation to the detected location information in the executed navigation application.

For example, the first screen 1771 and a second screen 1781 of the navigation application related to the place information "Rylan" may be screens through which navigation to the detected location information is performed.

Figure 18:
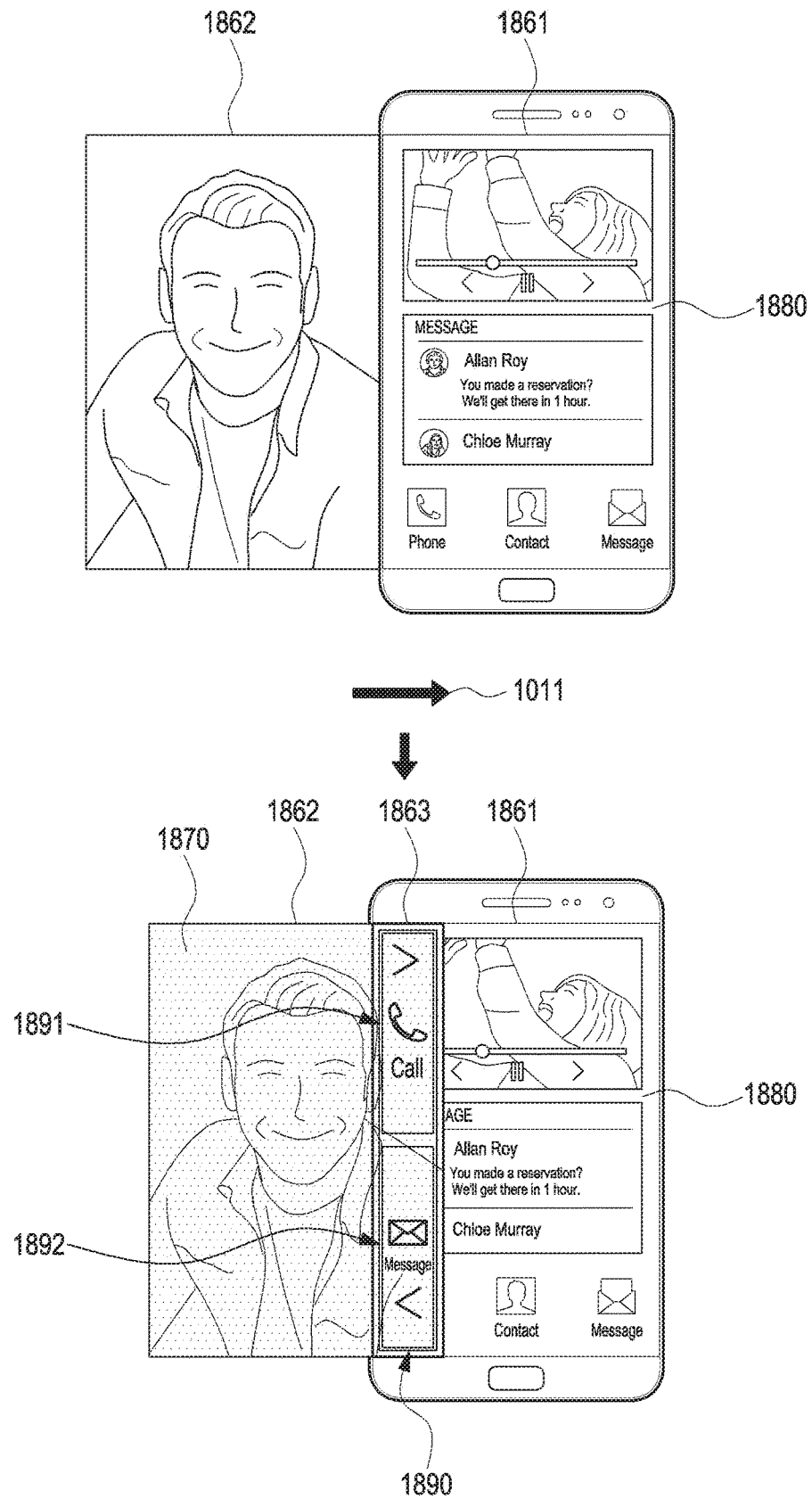
FIG. 18 is a view illustrating an electronic device which displays first content and guide information according to various embodiments of the invention.

FIG. 18 illustrates an electronic device which displays first content and guide information according to various embodiments of the invention.

As illustrated in FIG. 18, according to various embodiments, an electronic device (e.g., the electronic device 101) may include a first display 1861, and a second display 1862 which slides so as to overlap with the first display 1861 over at least a partial area.

According to various embodiments, a processor (e.g., the processor 120) may display first content on the first display 1861 and/or the second display 1862.

According to various embodiments, the processor 120 may display the first content on the first display 1861 and/or second content on the second display 1862.

According to various embodiments, the processor 120 may execute an application, and display an execution screen of the executed application on the first display 1861 and/or the second display 1862.

According to various embodiments, the processor 120 may execute a first application and/or a second application, and display an execution screen of the first application on the first display 1861 and/or an execution screen of the second application on the second display 1862.

According to various embodiments, the processor 120 may execute a gallery application, and display an execution screen 1870 of the executed gallery application on the first display 1861 and/or the second display 1862.

According to various embodiments, with the execution screen 1870 of the gallery application displayed on the second display 1862, and an idle screen 1880 displayed on the first display 1861, the second display 1862 displaying the execution screen 1870 of the gallery application may slide in a first direction 1811 so that at least a partial area 1863 of the second display 1862 may overlap with the first display 1861 displaying the idle screen 1880.

According to various embodiments, if the second display 1862 displaying the execution screen 1870 of the gallery application slides in the first direction 1811 so that the at least partial area 1863 of the second display 1862 may overlap with the first display 1861 displaying the idle screen 1880, the processor 120 may sense the sliding in the first direction 1811 through a sliding sensor (e.g., the sliding sensor 830 or 930).

According to various embodiments, if the processor 120 senses, through the sliding sensor 830 or 930, that the second display 1862 has slided in the first direction 1811 so that the at least partial area 1863 of the second display 1862 may overlap with the first display 1861, the processor 120 may display guide information (e.g., user guide information) 1890 for displaying at least one piece of content related to first content (e.g., the execution screen 1870 of the gallery application) in the overlapped at least partial area 1863.

For example, the guide information 1890 for displaying at least one piece of content related to the execution screen 1870 of the gallery application may include call guide information 1891 including a guide tab indicating the first direction 1811 (e.g., an arrow directed in the first direction 1811) and/or a function tab representing a function of requesting dialing to person information "Sam" included in the execution screen 1870 off the gallery application, a function of executing a contacts application according to the dialing request, and/or a function of displaying an execution screen of the contacts application on the first display 1861.

For example, the guide information 1890 for displaying at least one piece of content related to the execution screen 1870 of the gallery application may include navigation guide information 1892 including a guide tab indicating the second direction 1812 (e.g., an arrow directed in the second direction 1812) and/or a function tab representing a function of displaying a window in which to receive a message to be transmitted to the person information "Sam" included in the execution screen 1870 of the gallery application, and/or a function of displaying an execution screen of a message application for executing the function of transmitting a received message, on the second display 1862.

Figure 19:
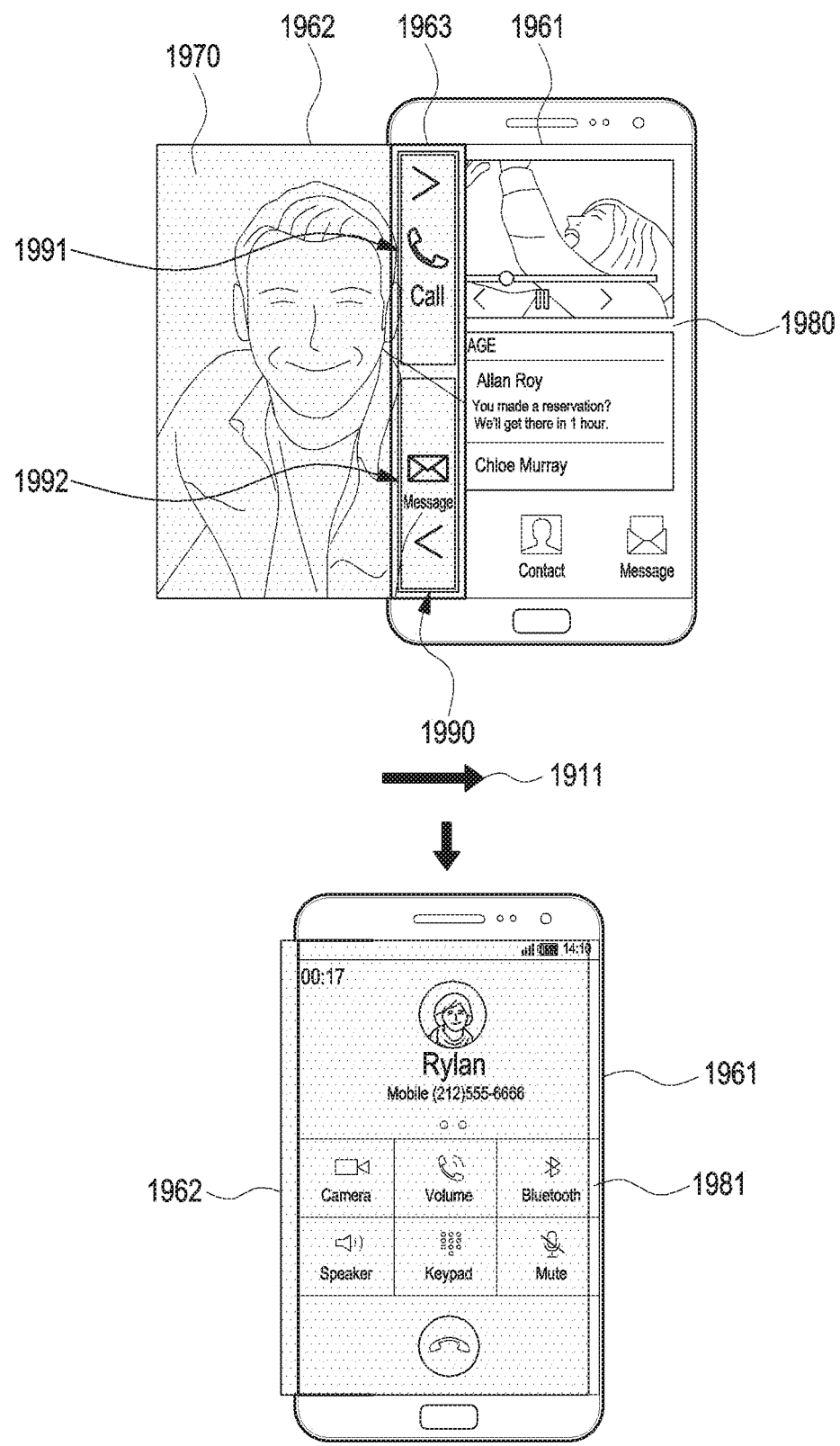
FIG. 19 is a view illustrating an electronic device which displays at least one piece of content related to first content according to various embodiments of the invention.

FIG. 19 illustrates an electronic device which displays at least one piece of content related to first content according to various embodiments of the invention.

As illustrated in FIG. 19, according to various embodiments, if a second display 1962 displaying an execution screen 1970 of a gallery application slides in a first direction 1911 so that at least a partial area 1963 of the second display 1962 may overlap with a first display 1961 displaying an idle screen 1980, the processor 120 may sense the sliding in the first direction 1911 through a sliding sensor (e.g., the sliding sensor 830 or 930).

According to various embodiments, if the processor 120 senses, through the sliding sensor 830 or 930, that the second display 1962 has slided in the first direction 1911 so that the at least partial area 1963 of the second display 1962 may overlap with the first display 1961, the processor 120 may display guide information 1990 for displaying at least one piece of content related to first content (e.g., the execution screen 1970 of the gallery application) in the overlapped at least partial area 1963.

For example, the guide information 1990 for displaying at least one piece of content related to the execution screen 1970 of the gallery application may include call guide information 1991 including a guide tab indicating the first direction 1911 (e.g., an arrow directed in the first direction 1911) and/or a function tab representing a function of requesting dialing to person information "Sam" included in the execution screen 1970 of the gallery application, a function of executing a contacts application according to the dialing request, and/or a function of displaying an execution screen of the contacts application on the first display 1961.

For example, the guide information 1990 for displaying at least one piece of content related to the execution screen 1970 of the gallery application may include navigation guide information 1992 including a guide tab indicating the second direction 1912 (e.g., an arrow directed in the second direction 1912) and/or a function tab representing a function of displaying a window in which to receive a message to be transmitted to the person information "Sam" included in the execution screen 1970 of the gallery application, and/or a function of displaying an execution screen of a message application for executing the function of transmitting a received message, on the second display 1962.

According to various embodiments, after the second display 1962 displaying an execution screen 1970 of the gallery application slides in the first direction 1911 so that the at least partial area 1963 of the second display 1962 may overlap with the first display 1961 displaying an idle screen 1980, if the second display 1962 slides in the first direction 1911 so as to overlap wholly with the first display 1961, the processor 120 may sense, through the sliding sensor (e.g., the sliding sensor 830 or 930), that the second display 1962 has slided in the first direction 1911 so as to overlap wholly with the first display 1961.

According to various embodiments, after the processor 120 senses, through the sliding sensor (e.g., the sliding sensor 830 or 930), that the second display 1962 has slided in the first direction 1911 so as to overlap wholly with the first display 1961, the processor 120 may display a transparent screen, instead of the gallery application screen 1970 displayed on the second display 1962.

According to various embodiments, after the processor 120 senses, through the sliding sensor 830 or 930, that the second display 1962 has slided in the first direction 1911 so as to overlap wholly with the first display 1961, the processor 120 may acquire person information "Sam" included in the execution screen of the gallery application displayed on the second display 1962.

According to various embodiments, the processor 130 may acquire the person information "Sam" included in the execution screen of the gallery application displayed on the second display 1962, and execute a contacts application related to the person information "Sam" on the basis of the acquired person information "Sam" and/or the sliding in the first direction 1911. For example, the processor 120 may detect contacts information related to the person information "Sam", and request dialing to the detected contacts information in the executed contacts application.

According to various embodiments, the processor 120 may display, on the first display 1961, an execution screen 1981 of the contacts application related to the person information "Sam", which has been executed on the basis of the acquired person information "Sam". For example, the execution screen 1981 of the contacts application related to the person information "Sam" may be a screen requesting dialing to the person information detected in the contacts application executed on the basis of the acquired person information "Sam" and/or the sliding in the first direction 1911.

According to various embodiments, after the processor 120 senses that the second display 1962 has slided in the first direction 1611 so as to overlap wholly with the first display 1961, the processor 120 may display a transparent screen on the second display 1962 and/or the contacts application screen 1981 related to the gallery application screen, on the first display 1961, on the basis of the gallery application screen displayed on the second display 1962 and/or the sliding in the first direction 1611.

Figure 20:
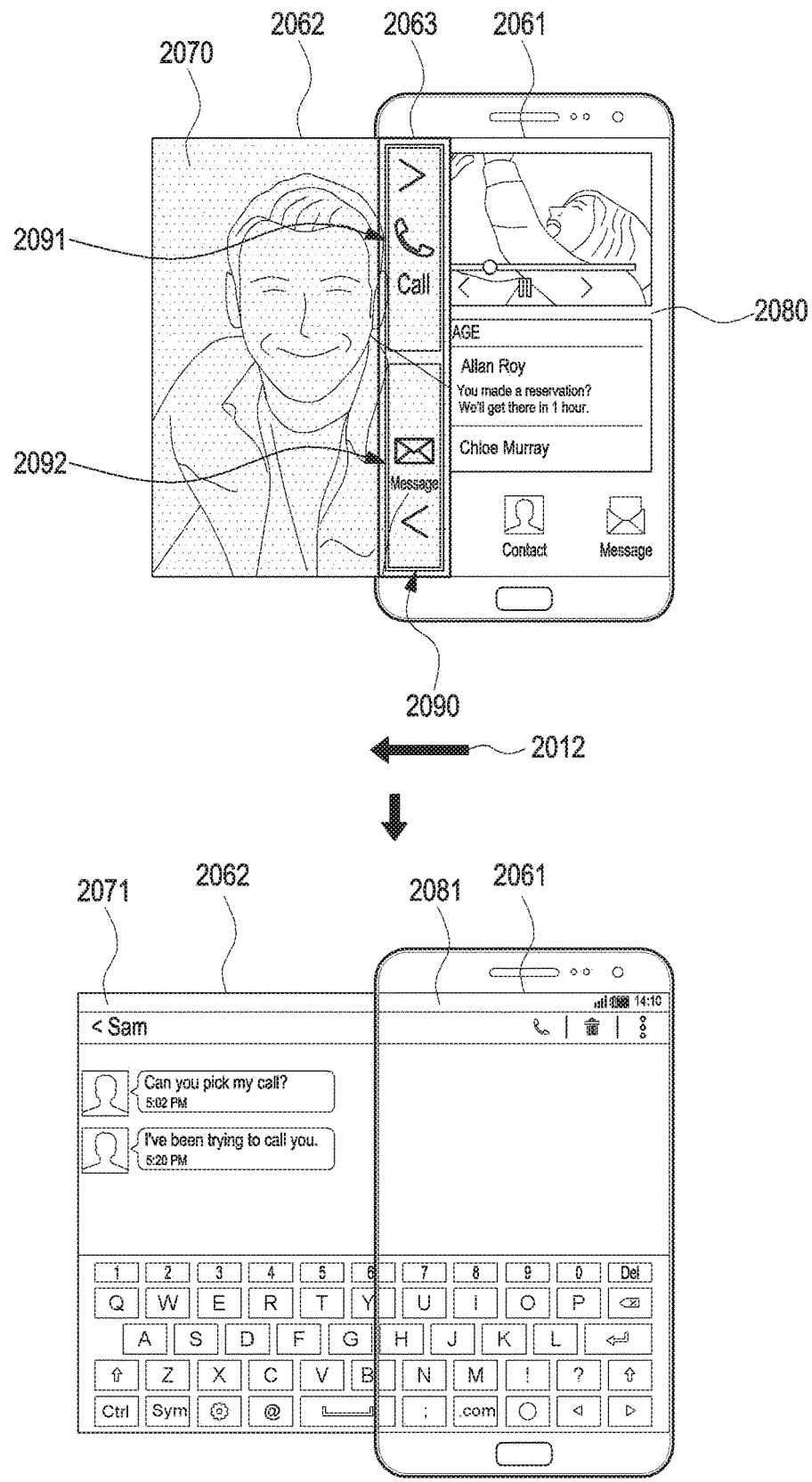
FIG. 20 is a view illustrating an electronic device which displays at least one piece of content related to first content according to various embodiments of the invention.

FIG. 20 illustrates an electronic device which displays at least one piece of content related to first content according to various embodiments of the invention.

As illustrated in FIG. 20, according to various embodiments, if a second display 2062 displaying an execution screen 2070 of a gallery application slides in a first direction 1911 so that at least a partial area 2063 of the second display 2062 may overlap with a first display 2061 displaying an idle screen 2080, the processor 120 may sense the sliding in the first direction 2011 through a sliding sensor (e.g., the sliding sensor 830 or 930).

According to various embodiments, if the processor 120 senses, through the sliding sensor 830 or 930, that the second display 2062 has slided in the first direction 2011 so that the at least partial area 2063 of the second display 2062 may overlap with the first display 2061, the processor 120 may display guide information 2090 for displaying at least one piece of content related to first content (e.g., the execution screen 2070 of the gallery application) in the overlapped at least partial area 2063.

For example, the guide information 2090 for displaying at least one piece of content related to the execution screen 2070 of the gallery application may include call guide information 2091 including a guide tab indicating the first direction 2011 (e.g., an arrow directed in the first direction 2011) and/or a function tab representing a function of requesting dialing to person information "Sam" included in the execution screen 2070 of the gallery application, a function of executing a contacts application according to the dialing request, and/or a function of displaying an execution screen of the contacts application on the first display 2061.

For example, the guide information 2090 for displaying at least one piece of content related to the execution screen 2070 of the gallery application may include message guide information 2092 including a guide tab indicating a second direction 2012 (e.g., an arrow directed in the second direction 2012) and/or a function tab representing a function of displaying a window in which to receive a message to be transmitted to the person information "Sam" included in the execution screen 2070 of the gallery application, and/or a function of displaying an execution screen of a message application for executing the function of transmitting a received message, on the second display 2062.

According to various embodiments, after the second display 2062 displaying the execution screen 2070 of the gallery application slides in the first direction 2011 so that the at least partial area 2063 of the second display 2062 may overlap with the first display 2061 displaying the idle screen 2080, if the second display 1962 slides in the second direction 2012, decreasing the overlapped area 2063 between the second display 2062 and the first display 2061, the processor 120 may sense through the sliding sensor (e.g., the sliding sensor 830 or 930) that the second display 2062 has slid in the second direction 2012, decreasing the overlapped area 2063 between the second display 2062 and the first display 2061.

According to various embodiments, after the processor 120 senses, through the sliding sensor (e.g., the sliding sensor 830 or 930), that the second display 2062 has slid in the second direction 2012, decreasing the overlapped area 2063 between the second display 2062 and the first display 2061, the processor 120 may display a first screen 2071 of the message application on the second display 2062, instead of the gallery application screen 2070, and a second screen 2081 of the message application on the first display 2061, instead of the idle screen 2080, on the basis of the gallery application screen displayed on the second display 2062 and/or the sliding in the second direction 2012.

According to various embodiments, after the processor 120 senses, through the sliding sensor 830 or 930, that the second display 2062 has slid in the second direction 2012, decreasing the overlapped area 2063 between the second display 2062 and the first display 2061, the processor 120 may acquire the person information "Sam" included in the execution screen of the gallery application displayed on the second display 2062.

According to various embodiments, the processor 130 may acquire the person information "Sam" included in the execution screen of the gallery application displayed on the second display 2062, and execute a message application related to the person information "Sam" on the basis of the acquired person information "Sam" and/or the sliding in the second direction 2012. For example, the processor 120 may receive a message to be transmitted to the person information "Sam", and transmit the received message to the person information "Sam" through a communication module (e.g., the communication module 170) in the executed message application.

For example, the first screen 2071 and the second screen 2081 of the message application related to the person information "Sam" may be screens through which a message is received and transmitted to the person information "Sam" in the message application executed on the basis of the acquired person information "Sam" and/or the sliding in the second direction 2012.

Figure 21:
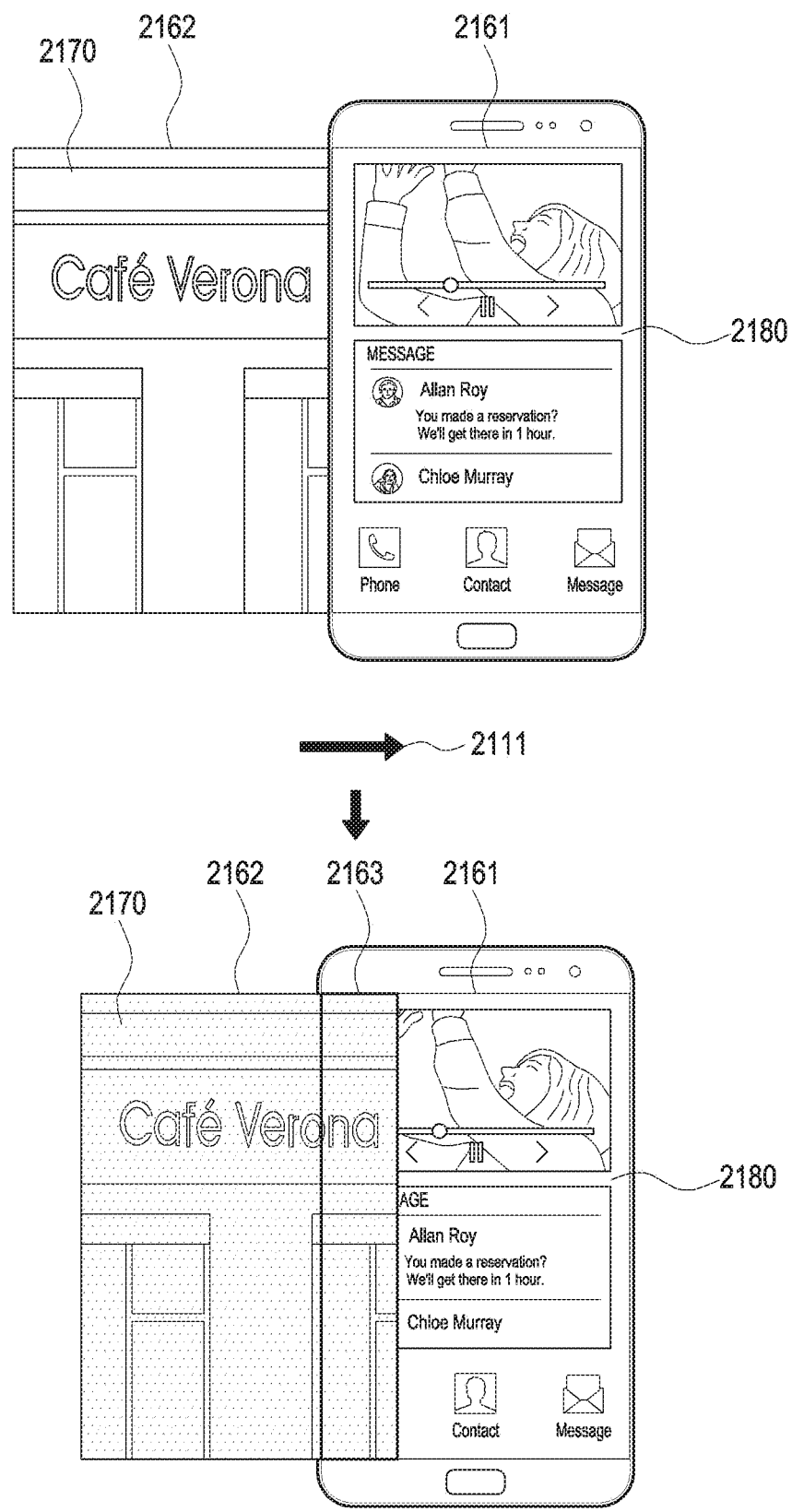
FIG. 21 is a view illustrating an electronic device according to various embodiments of the invention.

FIG. 21 illustrates an electronic device according to various embodiments of the invention.

As illustrated in FIG. 21, according to various embodiments, an electronic device (e.g., the electronic device 101) may include a first display 2161, and a second display 2162 which slides to overlap with the first display 2161 over at least a partial area.

According to various embodiments, a processor (e.g., the processor 120) may display first content on the first display 2161 and/or the second display 2162.

According to various embodiments, the processor 120 may display the first content on the first display 2161 and/or second content on the second display 2162.

According to various embodiments, the processor 120 may execute an application, and display an execution screen of the executed application on the first display 2161 and/or the second display 2162.

According to various embodiments, the processor 120 may execute a first application and/or a second application, and display an execution screen of the first application on the first display 2161 and/or an execution screen of the second application on the second display 2162.

According to various embodiments, the processor 120 may execute a camera application, and display an execution screen 2170 of the executed camera application on the first display 2161 and/or the second display 2162.

According to various embodiments, the processor 120 may display an idle screen 2180 on the first display 2161 and/or the second display 2162.

According to various embodiments, with the execution screen 2170 of the camera application displayed on the second display 2162, and the idle screen 2180 displayed on the first display 2161, the second display 2162 displaying the execution screen 2170 of the camera application may slide in a first direction 2111 so that at least a partial area 2163 of the second display 2162 may overlap with the first display 2161 displaying the idle screen 2180.

According to various embodiments, if the second display 2162 displaying the execution screen 2170 of the camera application slides in the first direction 2111 so that the at least partial area 2163 of the second display 2162 may overlap with the first display 2161 displaying the idle screen 2180, the processor 120 may sense the sliding in the first direction 2111 through a sliding sensor (e.g., the sliding sensor 830 or 930).

The processor 120 may display an image of a place object "Café Verona building" sensed through a camera module (e.g., the camera module 291) in the form of place information "café Verona" in the execution screen 2170 of the camera application on the second display 1262.

Figure 22:
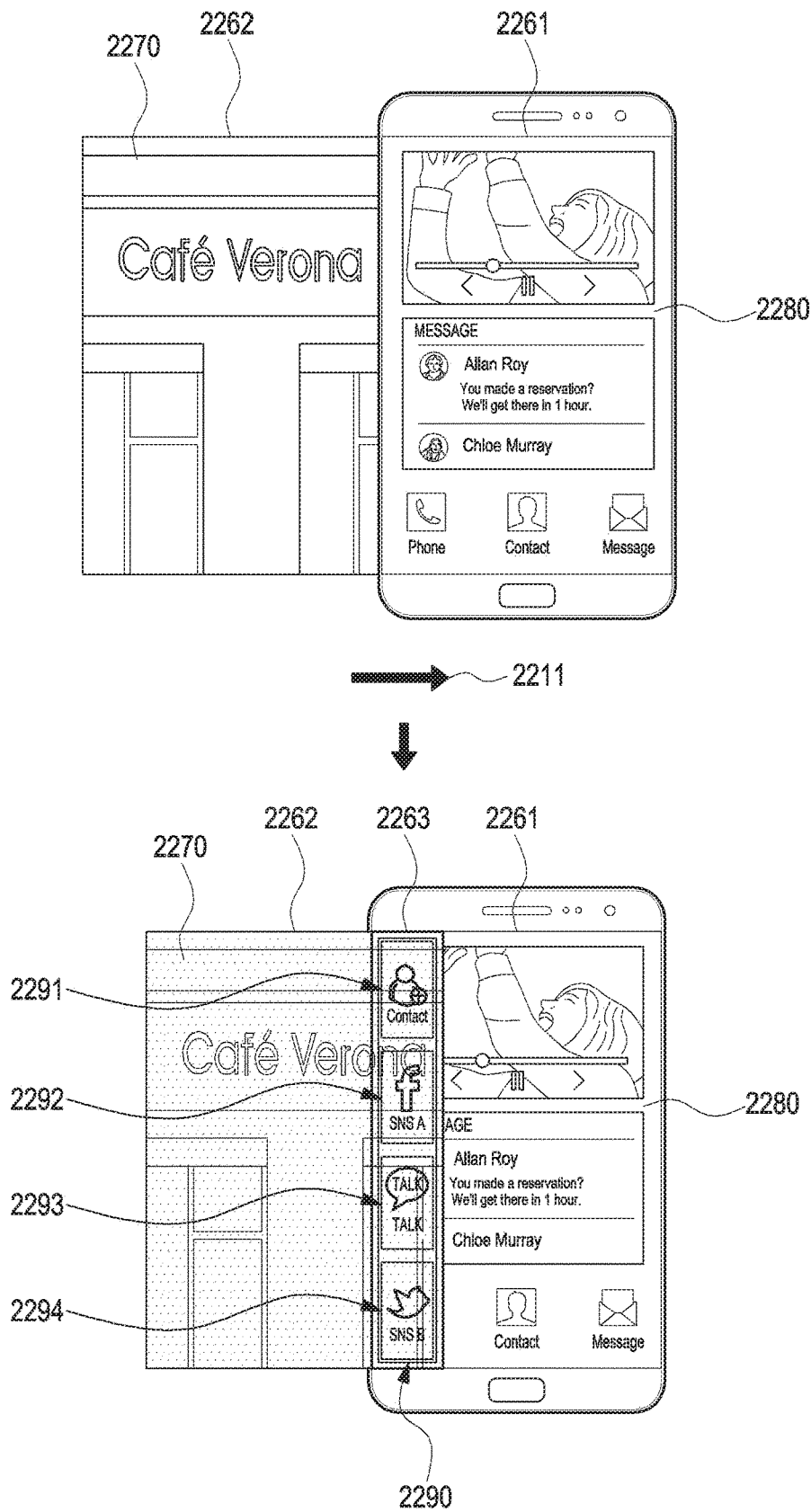
FIG. 22 is a view illustrating an electronic device according to various embodiments of the invention.

FIG. 22 illustrates an electronic device according to various embodiments of the invention.

As illustrated in FIG. 22, according to various embodiments, an electronic device (e.g., the electronic device 101) may include a first display 2261, and a second display 2262 which slides to overlap with the first display 2261 over at least a partial area.

According to various embodiments, a processor (e.g., the processor 120) may display first content on the first display 2261 and/or the second display 2262.

According to various embodiments, the processor 120 may display the first content on the first display 2261 and/or second content on the second display 2262.

According to various embodiments, the processor 120 may execute an application, and display an execution screen of the executed application on the first display 2261 and/or the second display 2262.

According to various embodiments, the processor 120 may execute a first application and/or a second application, and display an execution screen of the first application on the first display 2261 and/or an execution screen of the second application on the second display 2262.

According to various embodiments, the processor 120 may execute a camera application, and display an execution screen 2270 of the executed camera application on the first display 2261 and/or the second display 2262.

According to various embodiments, the processor 120 may display an idle screen 2280 on the first display 2261 and/or the second display 2262.

According to various embodiments, with the execution screen 2270 of the camera application displayed on the second display 2262, and the idle screen 2280 displayed on the first display 2261, the second display 2262 displaying the execution screen 2170 of the camera application may slide in a first direction 2211 so that at least a partial area 2263 of the second display 2262 may overlap with the first display 2261 displaying the idle screen 2280.

According to various embodiments, if the second display 2262 displaying the execution screen 2170 of the camera application slides in the first direction 2211 so that the at least partial area 2263 of the second display 2262 may overlap with the first display 2161 displaying the idle screen 2280, the processor 120 may sense the sliding in the first direction 2211 through a sliding sensor (e.g., the sliding sensor 830 or 930).

According to various embodiments, if the processor 120 senses, through the sliding sensor 830 or 930, that the second display 2262 has slided in the first direction 2211 so that the at least partial area 2263 of the second display 2262 may overlap with the first display 2261, the processor 120 may display guide information (e.g., user guide information) 2290 for displaying at least one piece of content related to first content (e.g., the execution screen 2270 of the camera application) in the overlapped at least partial area 2263.

For example, the guide information 2290 for displaying at least one piece of content related to the execution screen 2270 of the camera application may include upload guide information 2290 including a first SNS application tab 2291, a second SNS application tab 2292, a third SNS application tab 2293, and/or a fourth SNS application tab 2294, for uploading place information "Café Verona" included in the camera application execution screen 2270.

Figure 23:
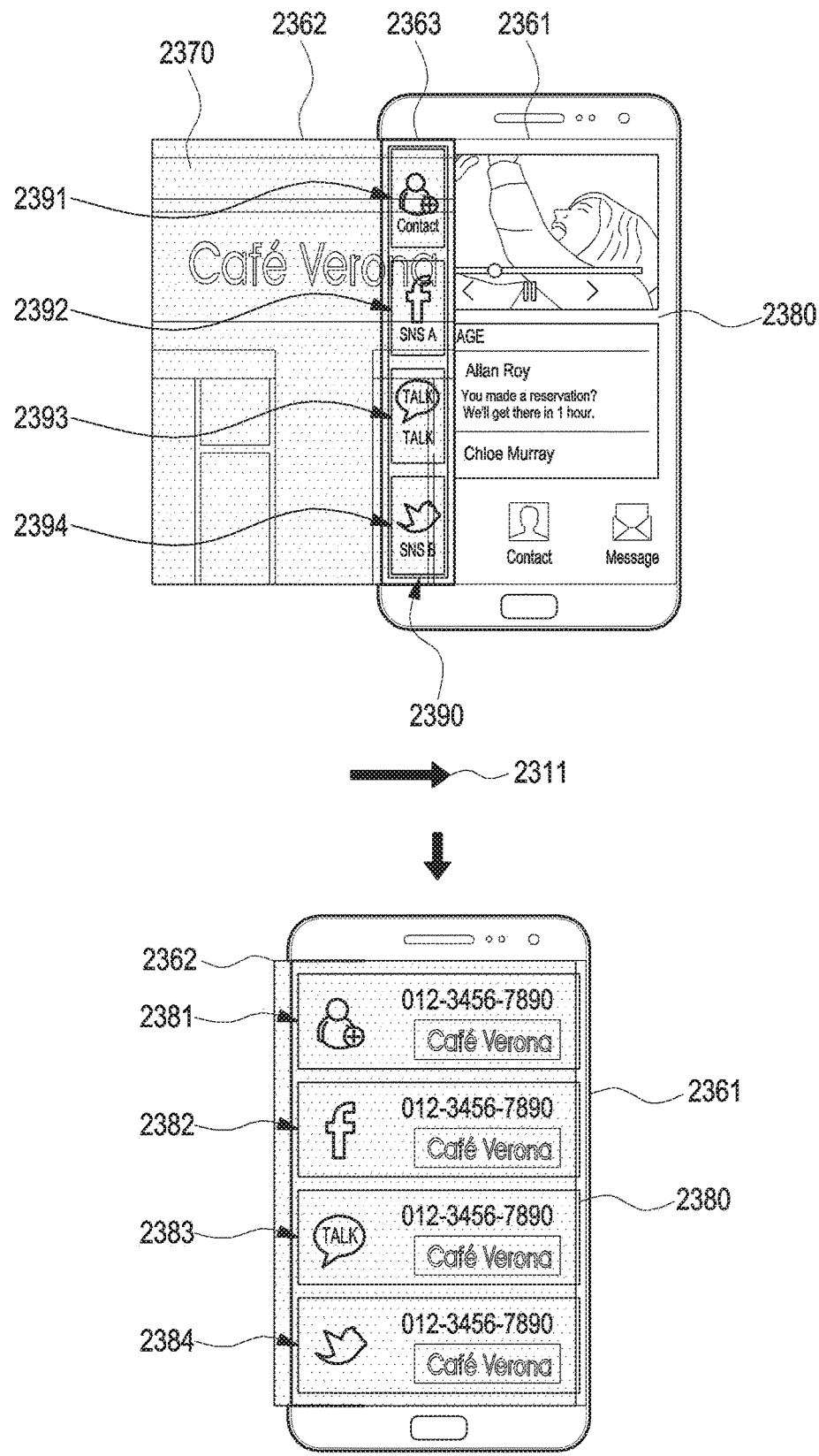
FIG. 23 is a view illustrating a method of uploading first content according to various embodiments of the invention.

FIG. 23 illustrates a method of uploading first content according to various embodiments of the invention.

As illustrated in FIG. 23, according to various embodiments, if a second display 1962 displaying an execution screen 1970 of the camera application slides in a first direction 1911 so that at least a partial area 1963 of the second display 1962 may overlap with a first display 1961 displaying an idle screen 1980, the processor 120 may sense the sliding in the first direction 1911 through a sliding sensor (e.g., the sliding sensor 830 or 930).

According to various embodiments, if the processor 120 senses, through the sliding sensor 830 or 930, that the second display 2262 displaying the execution screen 2270 of the camera application has slided in the first direction 2211 so that the at least partial area 2263 of the second display 2262 may overlap with the first display 2261 displaying the idle screen 2280, the processor 120 may display guide information (e.g., user guide information) 2290 for displaying at least one piece of content related to first content (e.g., the execution screen 2270 of the camera application) in the overlapped at least partial area 2263.

For example, the guide information 2290 for displaying at least one piece of content related to the execution screen 2270 of the camera application may include upload guide information 2290 including the first SNS application tab 2291, the second SNS application tab 2292, the third SNS application tab 2293, and/or the fourth SNS application tab 2294, for uploading the place information "Café Verona" included in the camera application execution screen 2270.

According to various embodiments, after the second display 1962 displaying the execution screen 1970 of the gallery application slides in the first direction 1911 so that the at least partial area 1963 of the second display 1962 may overlap with the first display 1961 displaying the idle screen 1980, if the second display 1962 slides in the first direction 1911 so as to overlap wholly with the first display 1961, the processor 120 may sense, through the sliding sensor (e.g., the sliding sensor 830 or 930), that the second display 1962 has slided in the first direction 1911 so as to overlap wholly with the first display 1961.

According to various embodiments, after the processor 120 senses, through the sliding sensor (e.g., the sliding sensor 830 or 930), that the second display 1962 has slided in the first direction 1911 so as to overlap wholly with the first display 1961, the processor 120 may display a transparent screen, instead of the camera application screen 1970 displayed on the second display 1962.

According to various embodiments, after the processor 120 senses, through the sliding sensor 830 or 930, that the second display 1962 has slided in the first direction 1911 so as to overlap wholly with the first display 1961, the processor 120 may acquire the place information "Café Verona" included in the execution screen of the camera application displayed on the second display 1962.

According to various embodiments, the processor 120 may acquire the place information "Café Verona" included in the execution screen of the camera application displayed on the second display 1962, and acquire a phone number "012-3456-7890" related to the place information "Café Verona" on the basis of the acquired place information "Café Verona" and/or the sliding in the first direction 1911.

According to various embodiments, the processor 120 may detect a first SNS application, a second SNS application, a third SNS application, and/or a fourth SNS application in order to upload the phone number "012-3456-7890" related to the place information "Café Verona".

According to various embodiments, the processor 120 may execute the detected first SNS application, second SNS application, third SNS application, and/or fourth SNS application, and upload the phone number "012-3456-7890" related to the place information "Café Verona" by the executed first SNS application, second SNS application, third SNS application, and/or fourth SNS application.

According to various embodiments, the processor 120 may display, on a first display 2361, a window 2380 showing the result of uploading the phone number "012-3456-7890" related to the place information "Café Verona", detected on the basis of the acquired place information "Café Verona", by the first SNS application, second SNS application, third SNS application, and/or fourth SNS application.

According to various embodiments, the processor 120 may display, on the first display 2361, a first upload result window 2381 showing the result of uploading the phone number "012-3456-7890" related to the place information "Café Verona", detected on the basis of the acquired place information "Café Verona", by the first SNS application.

According to various embodiments, the processor 120 may display, on the first display 2361, a second upload result window 2382 showing the result of uploading the phone number "012-3456-7890" related to the place information "Café Verona", detected on the basis of the acquired place information "Café Verona", by the second SNS application.

According to various embodiments, the processor 120 may display, on the first display 2361, a third upload result window 2383 showing the result of uploading the phone number "012-3456-7890" related to the place information "Café Verona", detected on the basis of the acquired place information "Café Verona", by the third SNS application.

According to various embodiments, the processor 120 may display, on the first display 2361, a fourth upload result window 2384 showing the result of uploading the phone number "012-3456-7890" related to the place information "Café Verona", detected on the basis of the acquired place information "Café Verona", by the fourth SNS application.

Figure 24:
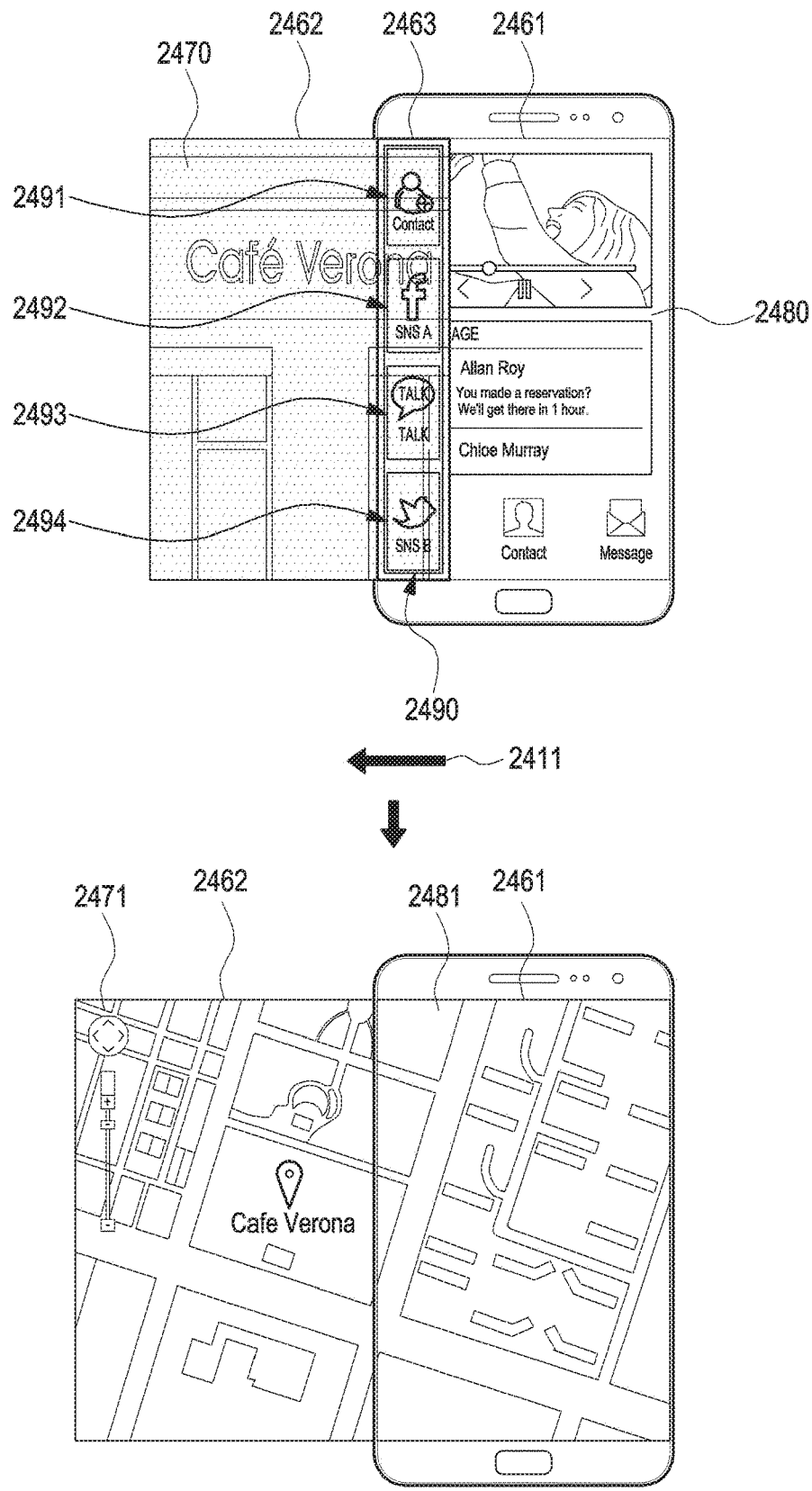
FIG. 24 is a view illustrating an electronic device which displays at least one piece of content related to first content according to various embodiments of the invention.

FIG. 24 illustrates an electronic device which displays at least one piece of content related to first content according to various embodiments of the invention.

As illustrated in FIG. 24, according to various embodiments, if a second display 2462 displaying an execution screen 2470 of a camera application slides in a first direction 2411 so that at least a partial area 2463 of the second display 2462 may overlap with a first display 2461 displaying an idle screen 2480, the processor 120 may sense the sliding in the first direction 2411 through a sliding sensor (e.g., the sliding sensor 830 or 930).

According to various embodiments, if the processor 120 senses, through the sliding sensor 830 or 930, that the second display 2462 has slid in the first direction 2411 so that the at least partial area 2463 of the second display 2462 may overlap with the first display 2461, the processor 120 may display guide information 2490 for displaying at least one piece of content related to first content (e.g., the execution screen 2470 of the camera application) in the overlapped at least partial area 2463.

According to various embodiments, after the second display 2462 displaying the execution screen 2470 of the camera application slides in the first direction 2411 so that the at least partial area 2463 of the second display 2462 may overlap with the first display 1961 displaying the idle screen 2480, if the second display 2462 slides in a second direction 2412, decreasing the overlapped area 2463 between the second display 2462 and the first display 2461, the processor 120 may sense, through the sliding sensor (e.g., the sliding sensor 830 or 930), that the second display 2462 has slided in the second direction 2412, decreasing the overlapped area 2463 between the second display 2462 and the first display 2461.

According to various embodiments, after the processor 120 senses, through the sliding sensor (e.g., the sliding sensor 830 or 930), that the second display 2462 has slided in the second direction 2412, decreasing the overlapped area 2463 between the second display 2462 and the first display 2461, the processor 120 may display a first screen 2471 of a map application on the second display 2462, instead of the camera application screen 2470, on the basis of the camera application screen displayed on the second display 2462 and/or the sliding in the second direction 2412.

According to various embodiments, after the processor 120 senses, through the sliding sensor 830 or 930, that the second display 2462 has slid in the second direction 2412, decreasing the overlapped area 2463 between the second display 2462 and the first display 2461, the processor 120 may acquire place information "Café Verona" included in the execution screen of the camera application displayed on the second display 2462.

According to various embodiments, the processor 120 may acquire the place information "Café Verona" included in the execution screen of the camera application displayed on the second display 2462, and execute a map application related to the place information "Café Verona" on the basis of the acquired place information "Café Verona" and/or the sliding in the second direction 2412. For example, the processor 120 may display location information related to the place information "Café Verona" in the executed map application.

For example, the first screen 2471 and a second screen 2481 of the map application related to the place information "Café Verona" may be screens displaying location information detected in the executed contacts application on the basis of the acquired place information "Café Verona" and/or the sliding in the second direction 2412.

Figure 25:
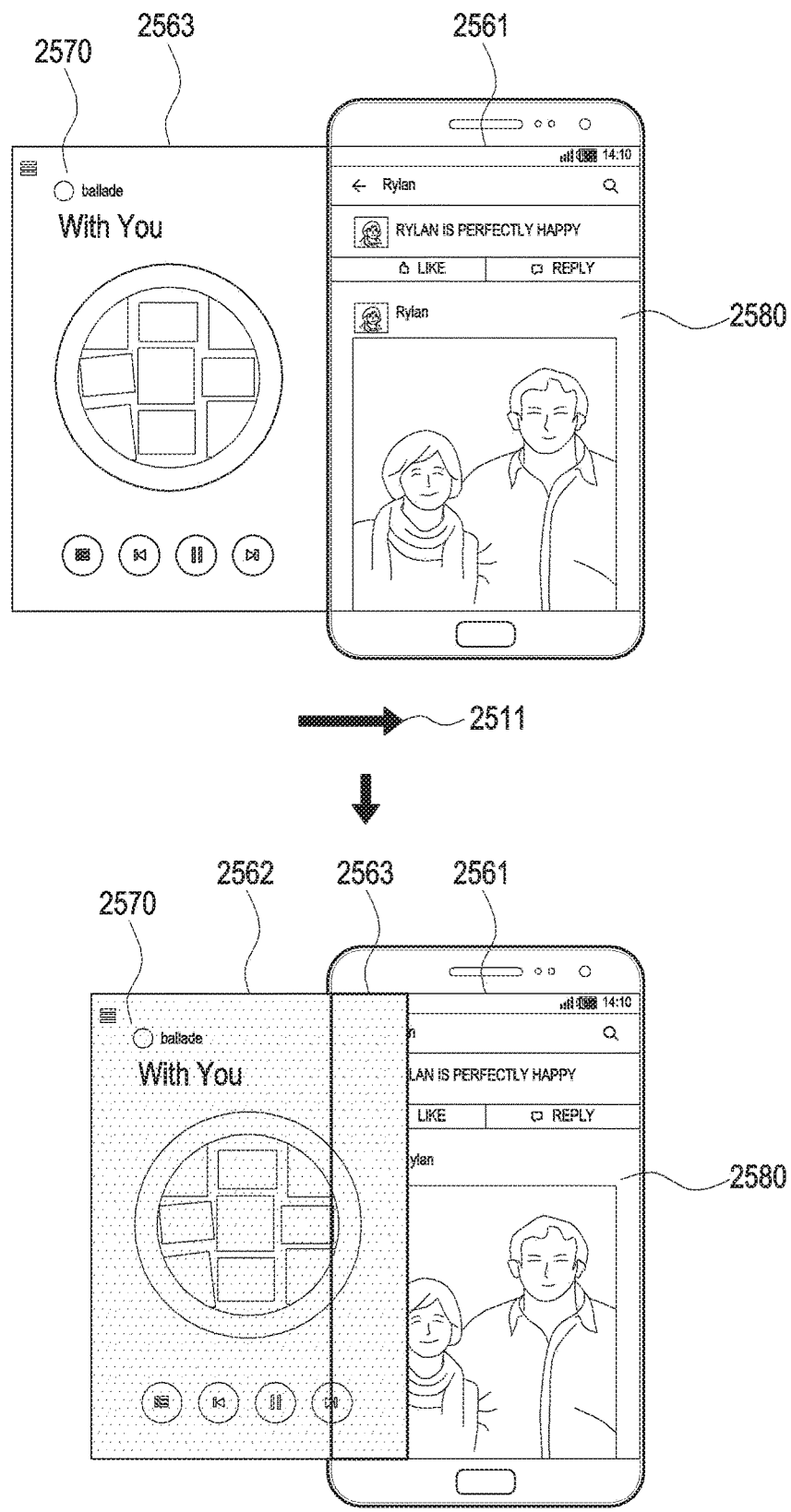
FIG. 25 is a view illustrating an electronic device which displays first content and guide information according to various embodiments of the invention.

FIG. 25 illustrates an electronic device which displays first content and guide information according to various embodiments of the invention.

As illustrated in FIG. 25, according to various embodiments, an electronic device (e.g., the electronic device 101) may include a first display 2561, and a second display 2562 which slides to overlap with the first display 2561 over at least a partial area.

According to various embodiments, a processor (e.g., the processor 120) may display first content on the first display 2561 and/or the second display 2562.

According to various embodiments, the processor 120 may display the first content on the first display 2561 and/or second content on the second display 2562.

According to various embodiments, the processor 120 may execute an application, and display an execution screen of the executed application on the first display 2561 and/or the second display 2562.

According to various embodiments, the processor 120 may execute a first application and/or a second application, and display an execution screen of the first application on the first display 2561 and/or an execution screen of the second application on the second display 2562.

According to various embodiments, the processor 120 may execute a sound source play application which plays first sound source information "KIM Jo-Han", and display an execution screen 2570 of the sound source play application which plays the first sound source information "KIM Jo-Han" on the first display 2561 and/or the second display 2562.

According to various embodiments, the processor 120 may execute a sound source play application, and display an execution screen 2580 of the executed sound source play application on the first display 2561 and/or the second display 2562.

According to various embodiments, with the execution screen 2570 of the sound source play application which plays the first sound source information "KIM Jo-Han" displayed on the second display 2562, and an SNS application screen 2580 including user state information displayed on the first display 2561, the second display 2562 displaying the execution screen 2570 of the sound source play application which plays the first sound source information "KIM Jo-Han" may slide in a first direction 2511 so that at least a partial area 2563 of the second display 2262 may overlap with the first display 2561.

According to various embodiments, if the second display 2562 displaying the execution screen 2570 of the sound source play application which plays the first sound source information "KIM Jo-Han" slides in the first direction 2511 so that the at least partial area 2563 of the second display 2562 may overlap with the first display 2561 displaying the SNS application screen 2580, the processor 120 may sense the sliding in the first direction 2511 through a sliding sensor (e.g., the sliding sensor 830 or 930).

Figure 26:
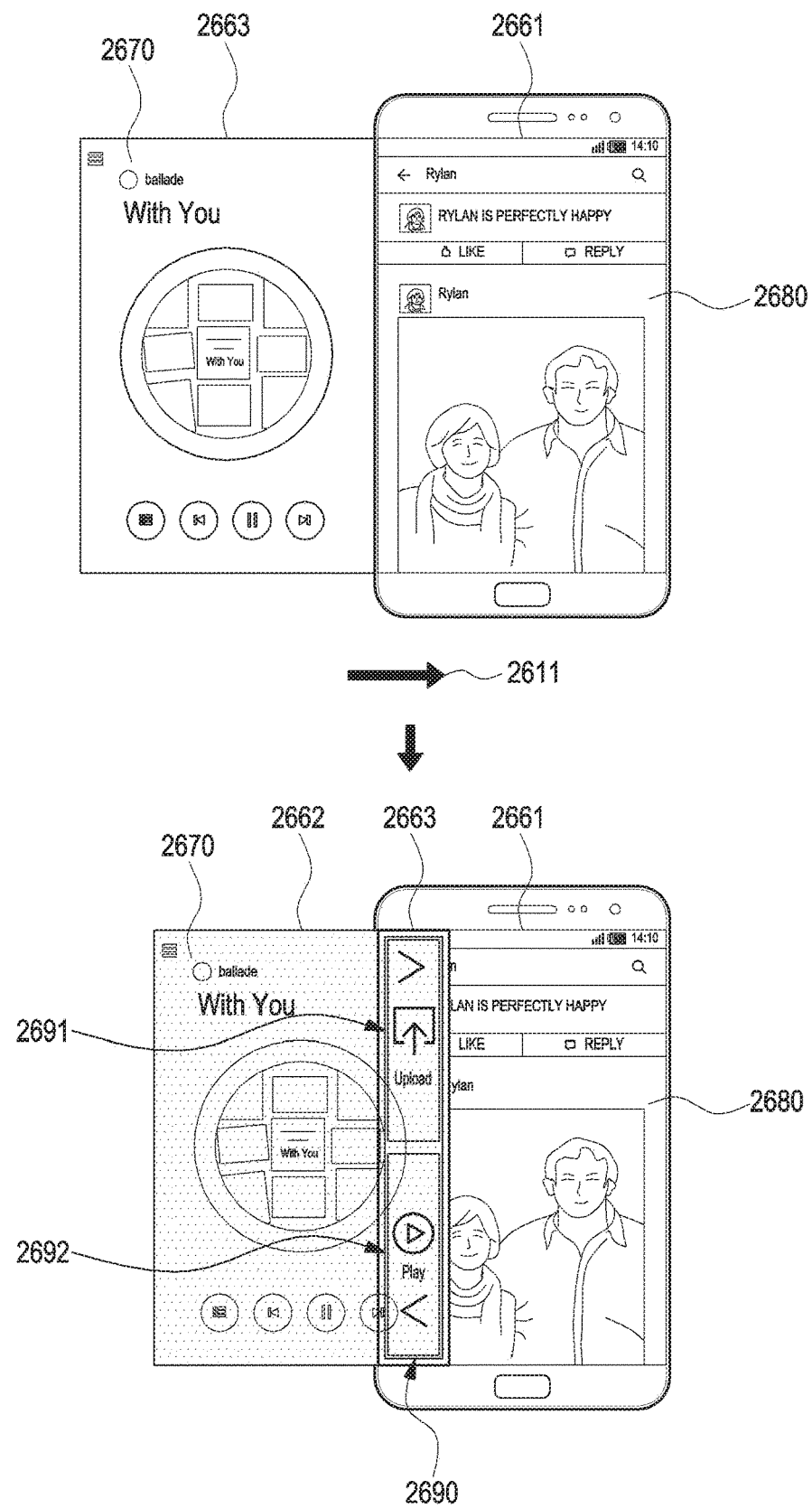
FIG. 26 is a view illustrating an electronic device which displays first content and guide information according to various embodiments of the invention.

FIG. 26 illustrates an electronic device which displays first content and guide information according to various embodiments of the invention.

As illustrated in FIG. 26, according to various embodiments, an electronic device (e.g., the electronic device 101) may include a first display 2661, and a second display 2662 which slides to overlap with the first display 2661 over at least a partial area.

According to various embodiments, a processor (e.g., the processor 120) may display first content on the first display 2661 and/or the second display 2662.

According to various embodiments, the processor 120 may display the first content on the first display 2661 and/or second content on the second display 2662.

According to various embodiments, the processor 120 may execute an application, and display an execution screen of the executed application on the first display 2661 and/or the second display 2662.

According to various embodiments, the processor 120 may execute a first application and/or a second application, and display an execution screen of the first application on the first display 2661 and/or an execution screen of the second application on the second display 2662.

According to various embodiments, the processor 120 may execute a sound source play application which plays first sound source information "KIM Jo-Han", and display an execution screen 2670 of the sound source play application which plays the first sound source information "KIM Jo-Han" on the first display 2661 and/or the second display 2662.

According to various embodiments, the processor 120 may execute a sound source play application, and display an execution screen 2680 of the executed sound source play application on the first display 2661 and/or the second display 2662.

According to various embodiments, with the execution screen 2670 of the sound source play application which plays the first sound source information "KIM Jo-Han" displayed on the second display 2662, and an SNS application screen 2680 including user state information displayed on the first display 2661, the second display 2662 displaying the execution screen 2670 of the sound source play application which plays the first sound source information "KIM Jo-Han" may slide in a first direction 2611 so that at least a partial area 2663 of the second display 2662 may overlap with the first display 2661.

According to various embodiments, if the second display 2662 displaying the execution screen 2670 of the sound source play application which plays the first sound source information "KIM Jo-Han" slides in the first direction 2611 so that the at least partial area 2663 of the second display 2662 may overlap with the first display 2661 displaying the SNS application screen 2680, the processor 120 may sense the sliding in the first direction 2611 through a sliding sensor (e.g., the sliding sensor 830 or 930).

According to various embodiments, if the processor 120 senses, through the sliding sensor 830 or 930, that the second display 2662 has slid in the first direction 1511 so that the at least partial area 2663 of the second display 2662 may overlap with the first display 2661, the processor 120 may display guide information (e.g., user guide information) 2690 for displaying at least one piece of content related to first content (e.g., the execution screen 2670 of the sound source play application which plays the first sound source information) in the overlapped at least partial area 2663.

For example, the guide information 2690 for displaying at least one piece of content related to the execution screen 2670 of the sound source play application which plays the first sound source information may include upload guide information 2691 including a guide tab indicating the first direction 2611 (e.g., an arrow directed in the first direction 2611) and/or a function tab representing a function of uploading, to an SNS, the first sound source information "KIM Jo-Han" included in the execution screen 2670 of the sound source play application which plays the first sound source information by an SNS application, and a function of displaying, on the first display 2661, an SNS application screen providing the result of uploading the first sound source information.

For example, the guide information 2690 for displaying at least one piece of content related to the execution screen 2670 of the sound source play application which plays the first sound source information may include play guide information 2692 including a guide tap representing indicating the second direction 2612 (e.g., an arrow directed in the second direction 2612), and/or a function tab representing a function of playing second sound information "Happy" on the basis of user state information (e.g., "Perfectly happy") included in the SNS application execution screen 2680 and/or the execution screen 2670 of the sound source play application displayed on the second display 2662, and/or a function of displaying, on the second display 2662, a sound source play application screen including playing the second sound source information.

Figure 27:
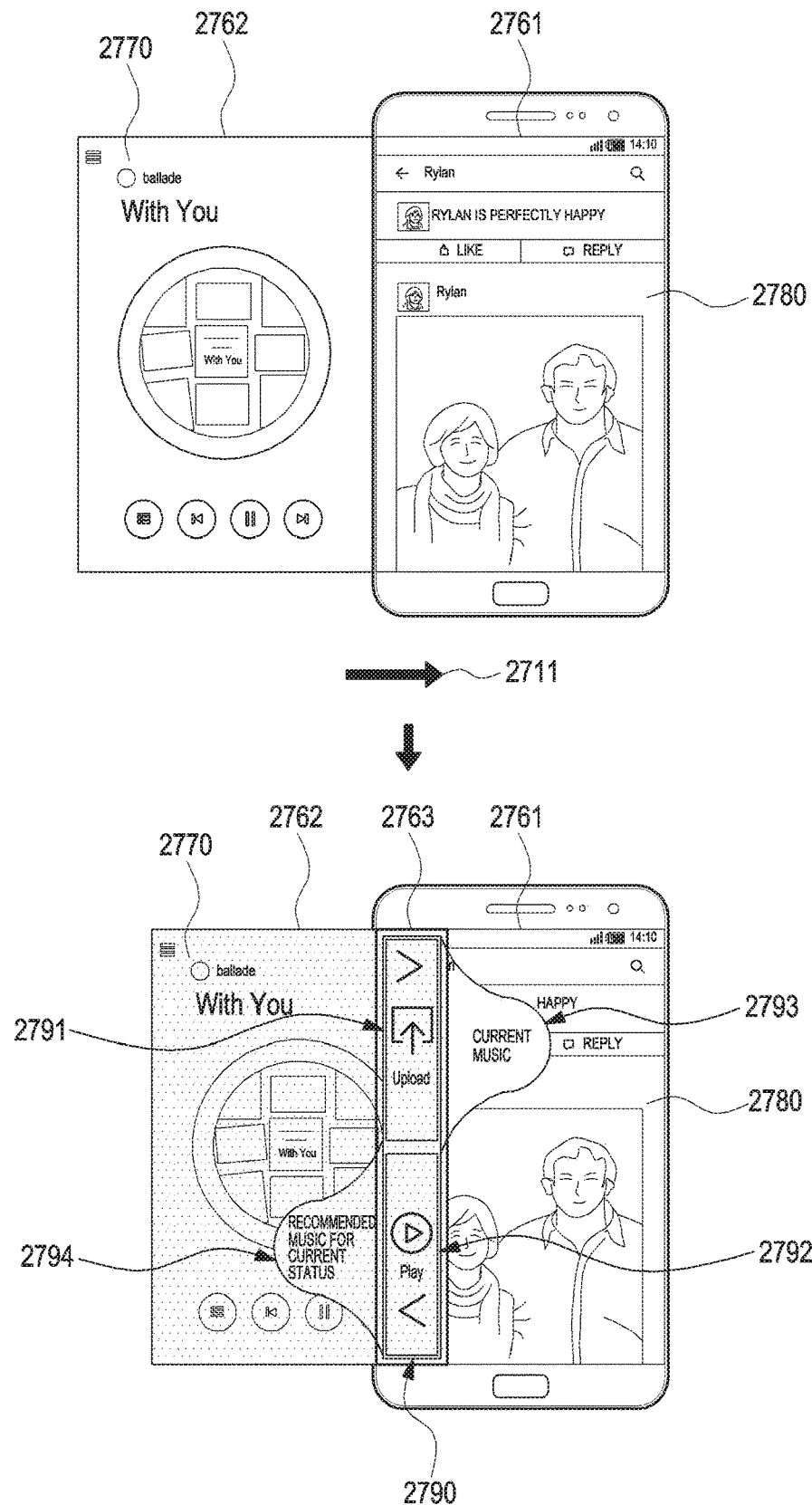
FIG. 27 is a view illustrating an electronic device which displays first content and guide information according to various embodiments of the invention.

FIG. 27 illustrates an electronic device which displays first content and guide information according to various embodiments of the invention.

As illustrated in FIG. 27, according to various embodiments, an electronic device (e.g., the electronic device 101) may include a first display 2761, and a second display 2762 which slides to overlap at least partially with the first display 2761 over at least a partial area.

According to various embodiments, a processor (e.g., the processor 120) may display first content on the first display 2761 and/or the second display 2762.

According to various embodiments, the processor 120 may display the first content on the first display 2761 and/or second content on the second display 2762.

According to various embodiments, the processor 120 may execute an application, and display an execution screen of the executed application on the first display 2761 and/or the second display 2762.

According to various embodiments, the processor 120 may execute a first application and/or a second application, and display an execution screen of the first application on the first display 2761 and/or an execution screen of the second application on the second display 2762.

According to various embodiments, the processor 120 may execute a sound source play application which plays first sound source information "KIM Jo-Han", and display an execution screen 2770 of the sound source play application which plays the first sound source information "KIM Jo-Han" on the first display 2761 and/or the second display 2762.

According to various embodiments, the processor 120 may execute a sound source play application, and display an execution screen 2780 of the executed sound source play application on the first display 2761 and/or the second display 2762.

According to various embodiments, with the execution screen 2770 of the sound source play application which plays the first sound source information "KIM Jo-Han" displayed on the second display 2762, and an SNS application screen 2780 including user state information displayed on the first display 2761, the second display 2762 displaying the execution screen 2770 of the sound source play application which plays the first sound source information "KIM Jo-Han" may slide in a first direction 2711 so that at least a partial area 2763 of the second display 2762 may overlap with the first display 2761.

According to various embodiments, if the second display 2762 displaying the execution screen 2770 of the sound source play application which plays the first sound source information "KIM Jo-Han" slides in the first direction 2711 so that the at least partial area 2763 of the second display 2762 may overlap with the first display 2761 displaying the SNS application screen 2780, the processor 120 may sense the sliding in the first direction 2711 through a sliding sensor (e.g., the sliding sensor 830 or 930).

According to various embodiments, if the processor 120 senses, through the sliding sensor 830 or 930, that the second display 2762 has slid in the first direction 2711 so that the at least partial area 2763 of the second display 2762 may overlap with the first display 2761, the processor 120 may display guide information (e.g., user guide information) 2790 for displaying at least one piece of content related to first content (e.g., the execution screen 2770 of the sound source play application which plays the first sound source information) in the overlapped at least partial area 2763.

For example, the guide information 2790 for displaying at least one piece of content related to the execution screen 2770 of the sound source play application which plays the first sound source information may include first upload guide information 2791 including a guide tab indicating the first direction 2711 (e.g., an arrow directed in the first direction 2711) and/or a function tab representing a function of uploading, to an SNS, the first sound source information "KIM Jo-Han" included in the execution screen 2770 of the sound source play application which plays the first sound source information by an SNS application, and a function of displaying, on the first display 2761, an SNS application screen providing the result of uploading the first sound source information.

For example, the guide information 2790 for displaying at least one piece of content related to the execution screen 2770 of the sound source play application which plays the first sound source information may include first play guide information 2792 including a guide tap representing indicating a second direction 2712 (e.g., an arrow directed in the second direction 2712) and/or a function tab representing a function of playing second sound information "Happy" on the basis of user state information (e.g., "Perfectly happy") included in the SNS application execution screen 2780, and/or a function of displaying, on the second display 2762, a sound source play application screen including playing the second sound source information.

For example, the guide information 2790 for displaying at least one piece of content related to the execution screen 2770 of the sound source play application which plays the first sound source information may include second upload guide text ("a current sound source") 2793 indicating that if the second display 2762 slides in the first direction 2711, the first sound source information "KIM Jo-Han" is uploaded to the SNS by the SNS application.

For example, if the second display 2762 slides in the second direction 2712, the guide information 2790 for displaying at least one piece of content related to the execution screen 2770 of the sound source play application which plays the first sound source information may include second play guide text 2793 indicating that the second sound source information "Happy" is played on the basis of the user state information ("Perfectly happy!") included in the SNS application execution screen 2780.

Figure 28:
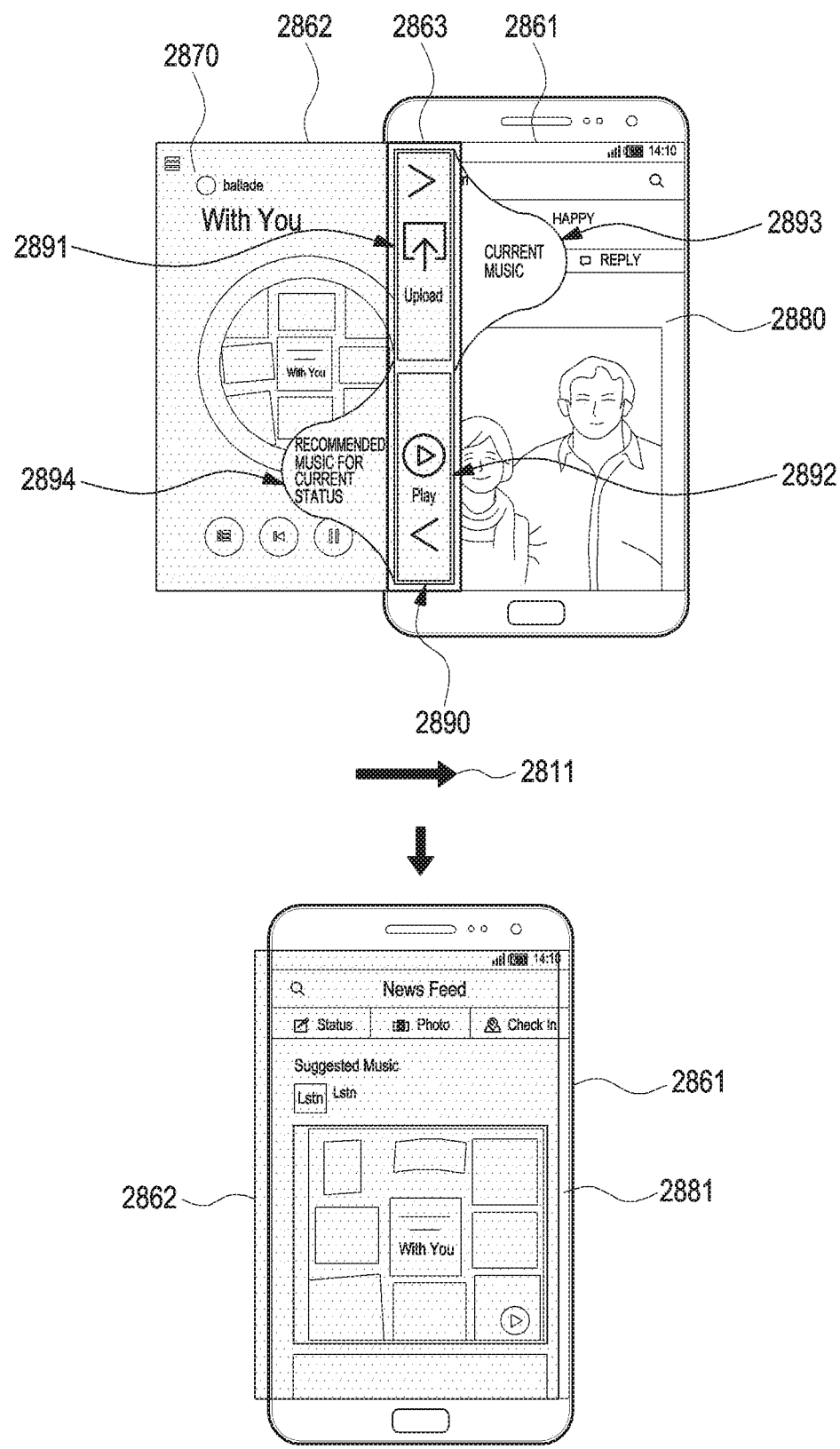
FIG. 28 is a view illustrating an electronic device which displays at least one piece of content related to first content according to various embodiments of the invention.

FIG. 28 illustrates an electronic device which displays at least one piece of content related to first content according to various embodiments of the invention.

As illustrated in FIG. 28, if a second display 2862 displaying an execution screen 1670 of a sound source play application which plays first sound source information slides in a first direction 2811 so that an at least partial area 2863 of the second display 2862 may overlap with the first display 2861 displaying an idle screen 2880, the processor 120 may sense the sliding in the first direction 2811 through a sliding sensor (e.g., the sliding sensor 830 or 930).

According to various embodiments, if the processor 120 senses, through the sliding sensor 830 or 930, that the second display 2862 has slided in the first direction 2811 so that the at least partial area 2863 of the second display 2862 may overlap with the first display 2861, the processor 120 may display guide information (e.g., user guide information) 2890 for displaying at least one piece of content related to first content (e.g., an execution screen 2870 of the sound source play application which plays the first sound source information) in the overlapped at least partial area 2863.

According to various embodiments, after the second display 2862 displaying the execution screen 2870 of the sound source play application which plays the first sound source information has slided in the first direction 2811 so that the at least partial area 2863 of the second display 2862 may overlap with the first display 2861 displaying the idle screen 2880, if the second display 2862 slides in the first direction 2811 to overlap wholly with the first display 2861, the processor 120 may sense the sliding in the first direction 2811, which incurs whole overlap between the second display 2862 and the first display 2861.

According to various embodiments, after the processor 120 senses, through the sliding sensor (e.g., the sliding sensor 803 or 903), the sliding in the first direction 2811, which incurs whole overlap between the second display 2862 and the first display 2861, the processor 120 may display a transparent screen, instead of the screen 2870 of the sound source play application which plays the first sound source information, displayed on the second display 2862.

According to various embodiments, after the processor 120 senses, through the sliding sensor 830 or 930, that the second display 2862 has slided in the first direction 2811 so as to overlap wholly with the first display 2861, the processor 120 may acquire first sound information "KIM Jo-Han" included in the screen of the sound source play application, displayed on the second display 2862.

According to various embodiments, the processor 130 may acquire the first sound information "KIM Jo-Han" included in the execution screen of the sound source play application, displayed on the second display 2862, and execute an SNS application related to the first sound information "KIM Jo-Han" on the basis of the acquired first sound information "KIM Jo-Han" and/or the sliding in the first direction 2811. For example, the processor 120 may upload the first sound information "KIM Jo-Han" to the SNS by the executed SNS application.

According to various embodiments, the processor 120 may display, on the first display 2861, an execution screen 2881 of the SNS application related to the first sound information "KIM Jo-Han", executed on the basis of the acquired first sound information "KIM Jo-Han" and/or the sliding in the first direction 2811. For example, the execution screen 2881 of the contacts application related to the first sound information "KIM Jo-Han" may be a screen displaying the result of uploading the first sound information "KIM Jo-Han" in the SNS application executed on the basis of the acquired first sound information "KIM Jo-Han" and/or the sliding in the first direction 2811

According to various embodiments, after the processor 120 senses, through the sliding sensor 830 or 930, that the second display 2862 has slided in the first direction 2811 to over alp wholly with the first display 2861, the processor 120 may display a transparent screen on the second display 2862, and/or display, on the first display 2861, the execution screen 2881 of the SNS application related to the first sound information "KIM Jo-Han", executed on the basis of the acquired first sound information "KIM Jo-Han" and/or the sliding in the first direction 2811.

Figure 29:
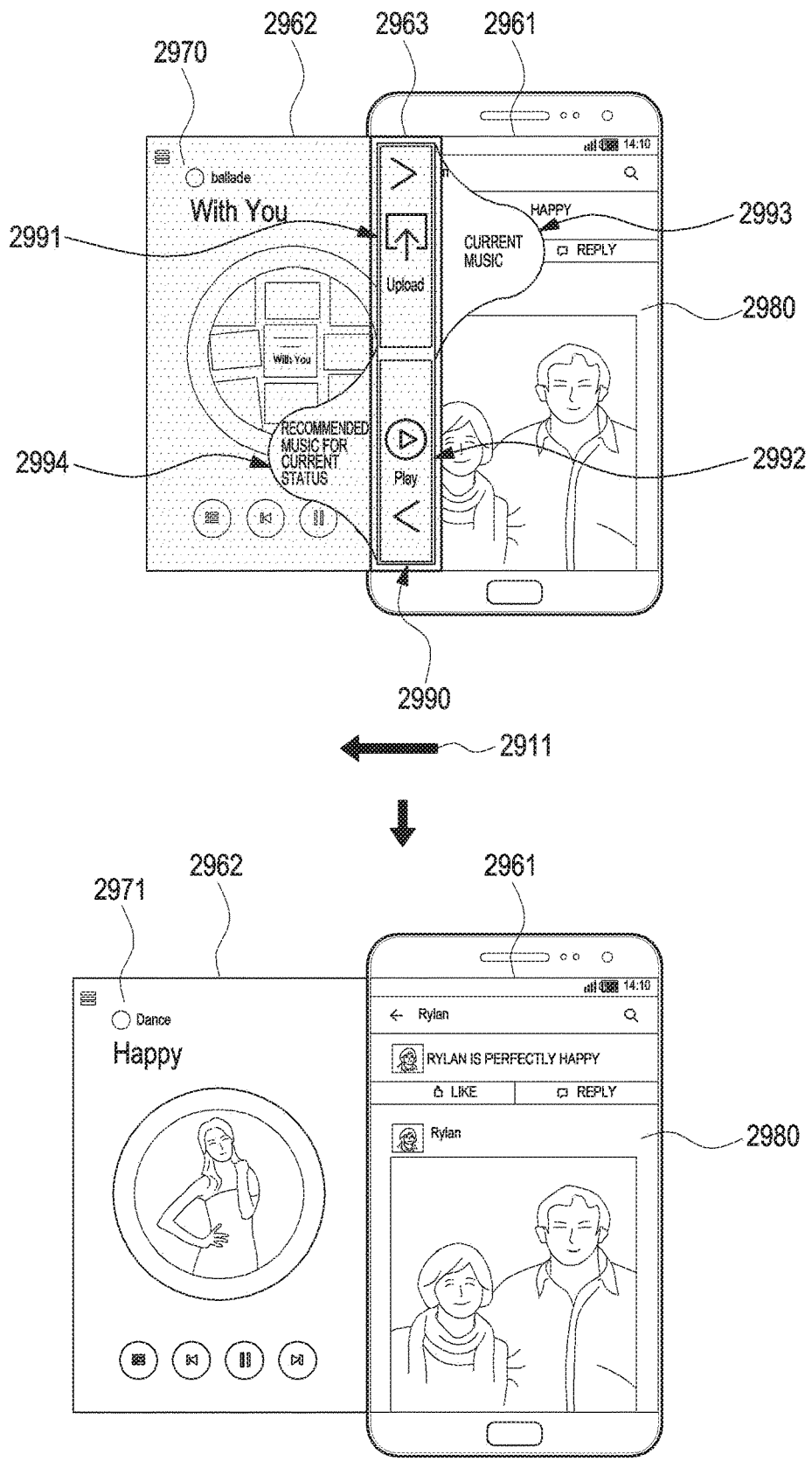
FIG. 29 is a view illustrating an electronic device which displays at least one piece of content related to first content according to various embodiments of the invention.

FIG. 29 illustrates an electronic device which displays at least one piece of content related to first content according to various embodiments of the invention.

As illustrated in FIG. 29, according to various embodiments, if a second display 2962 displaying an execution screen 2970 of a sound source application which plays first sound source information slides in a first direction 2911 so that at least a partial area 2963 of the second display 2962 may overlap with a first display 2961 displaying an idle screen 2980, the processor 120 may sense the sliding in the first direction 2911 through a sliding sensor (e.g., the sliding sensor 830 or 930).

According to various embodiments, if the processor 120 senses, through the sliding sensor 830 or 930, that the second display 2962 has slided in the first direction 2911 so that the at least partial area 2963 of the second display 2962 may overlap with the first display 2961, the processor 120 may display guide information 2990 for displaying at least one piece of content related to first content (e.g., the execution screen 2970 of the sound source application which plays the first sound source information) in the overlapped at least partial area 2963.

According to various embodiments, after the second display 2962 displaying the execution screen 2970 of the sound source application which plays the first sound source information slides in the first direction 2911 so that the at least partial area 2963 of the second display 2962 may overlap with the first display 2961 displaying the idle screen 2980, if the second display 2962 slides in a second direction 2912, decreasing the overlapped area 2963 between the second display 2962 and the first display 2961, the processor 120 may sense, through the sliding sensor 830 or 930, that the second display 2962 has slided in the second direction 2912, decreasing the overlapped area 2963 between the second display 2962 and the first display 2961.

According to various embodiments, after the processor 120 senses, through the sliding sensor (e.g., the sliding sensor 830 or 930), that the second display 2962 has slided in the second direction 2912, decreasing the overlapped area 2963 between the second display 2962 and the first display 2961, the processor 120 may play second sound source information "Happy" corresponding to user state information "Perfectly happy", instead of the first sound source information "KIM Jo-Han", on the basis of at least one of the screen of the sound source application which plays the first sound source information, displayed on the second display 2962, the sliding in the second direction 2912, or the user state information "Perfectly happy" included in the SNS application screen.

According to various embodiments, the processor 120 may display a sound source play application screen 2971 through which the second sound source information "Happy" is played, on the second display 2962.

Figure 30:
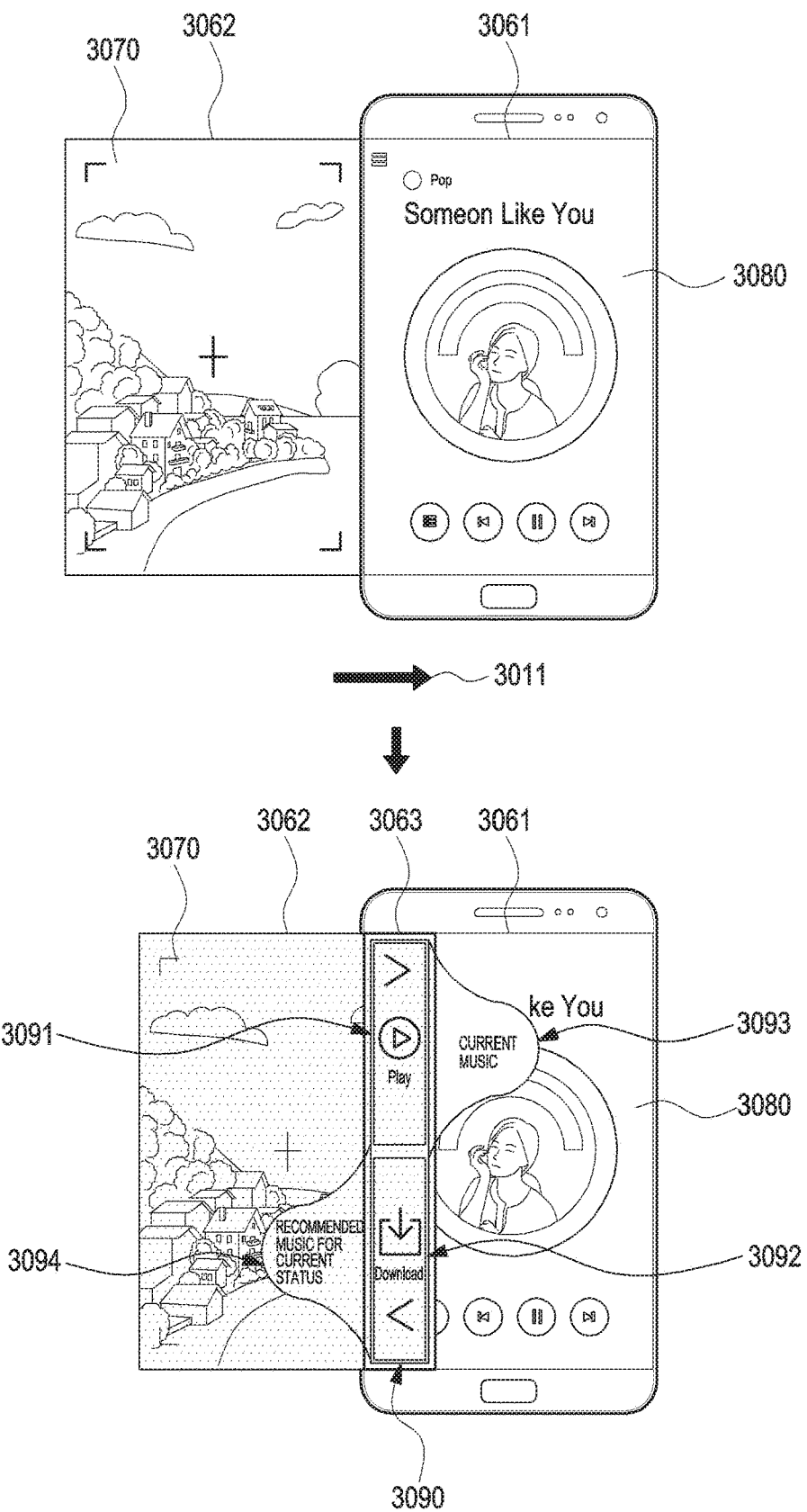
FIG. 30 is a view illustrating an electronic device which displays first content and guide information according to various embodiments of the invention.

FIG. 30 illustrates an electronic device which displays first content and guide information according to various embodiments of the invention.

As illustrated in FIG. 30, according to various embodiments, with an execution screen 3070 of a camera application, including an image 3070 resulting from sensing a night sea (e.g., place information) displayed on a second display 3062, and an execution screen 3080 of a sound source play application which plays first sound source information "KIM Jo-Han" displayed on a first display 3061, the second display 3062 displaying the execution screen 3070 of the camera application, including the image 3070 resulting from sensing the night sea (e.g., the place information) may slide in a first direction 3011 so that at least a partial area 3063 of the second display 3062 may overlap with the first display 3061.

According to various embodiments, if the second display 3062 displaying the execution screen 3070 of the camera application, including the image 3070 resulting from sensing the night sea (e.g., the place information) slides in the first direction 3011 so that the at least partial area 3063 of the second display 3062 may overlap with the first display 3061 displaying the execution screen 3080 of the sound source play application which plays the first sound source information "KIM Jo-Han", the processor 120 may sense the sliding in the first direction 3011 through a sliding sensor (e.g., the sliding sensor 830 or 930).

According to various embodiments, if the processor 120 senses, through the sliding sensor 830 or 930, that the second display 3062 has slided in the first direction 3011 so that the at least partial area 3063 of the second display 3062 may overlap with the first display 3061, the processor 120 may display guide information (e.g., user guide information) 3090 for displaying at least one piece of content related to first content (e.g., the execution screen 3070 of the sound source play application which plays the first sound source information) in the overlapped at least partial area 3063.

Figure 31:
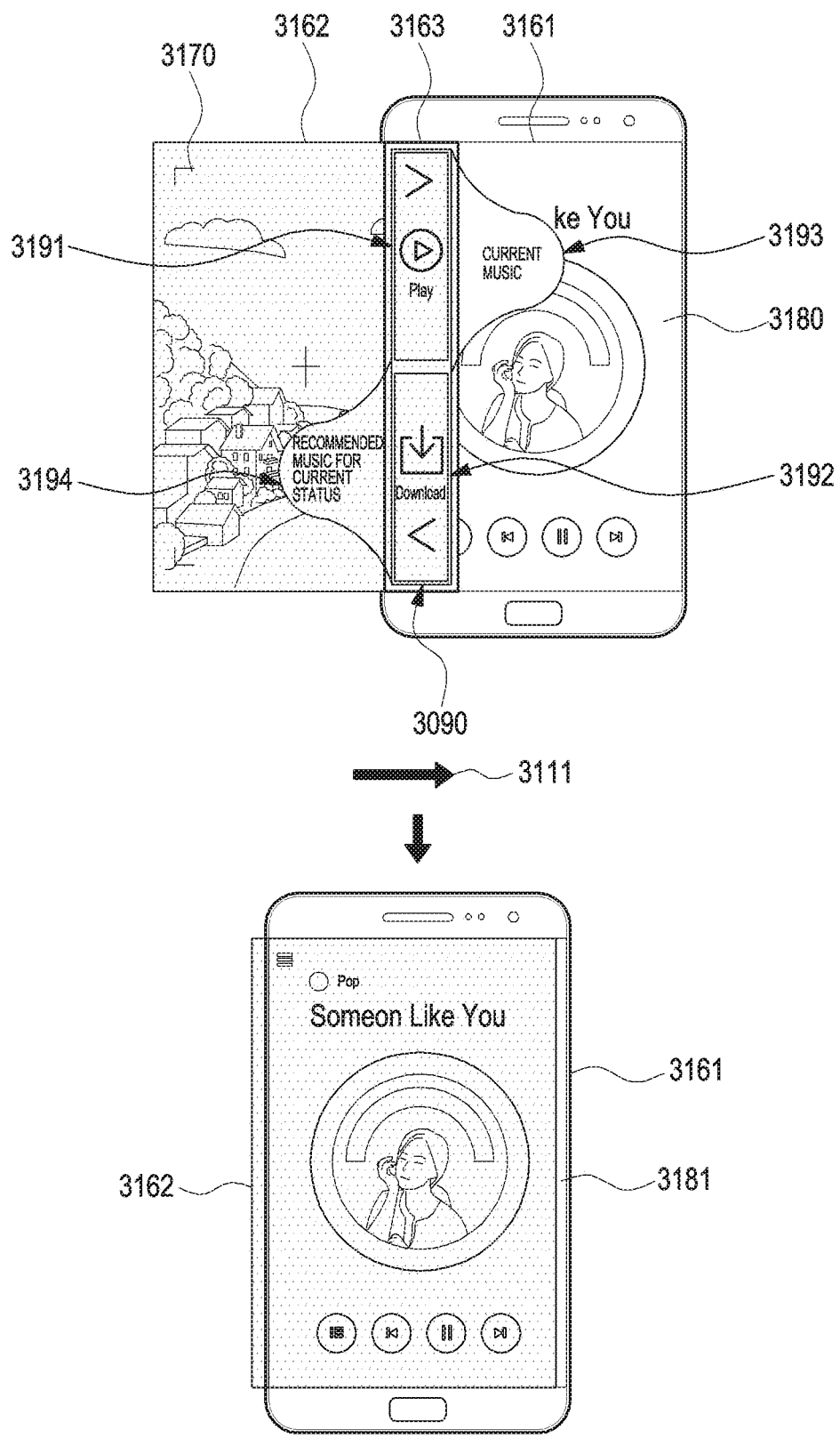
FIG. 31 is a view illustrating an electronic device which displays at least one piece of content related to first content according to various embodiments of the invention.

FIG. 31 illustrates an electronic device which displays at least one piece of content related to first content according to various embodiments of the invention.

As illustrated in FIG. 31, according to various embodiments, if the processor 120 senses, through the sliding sensor 830 or 930, that a second display 3162 has slided in a first direction 3111 so that at least a partial area 3163 of the second display 3162 may overlap with a first display 3161, the processor 120 may display guide information (e.g., user guide information) 3190 for displaying at least one piece of content related to first content (e.g., an execution screen 3170 of a sound source play application which plays first sound source information) in the overlapped at least partial area 3163.

According to various embodiments, if with the guide information 3190 displayed, the second display 3162 slides in the first direction 3111, the processor 120 may sense that the second display 3162 has slided in the first direction 3111, play second sound source information corresponding to an image of a night sea by a sound source play application on the basis of the sliding in the first direction 3111, the image of the night sea (e.g., place information) included in a camera application screen 3170, and/or the sound source play application screen displayed on the first display 3161, and display a sound source application screen 3181 indicating play of the second sound source information on the first display 3161.

Figure 32:
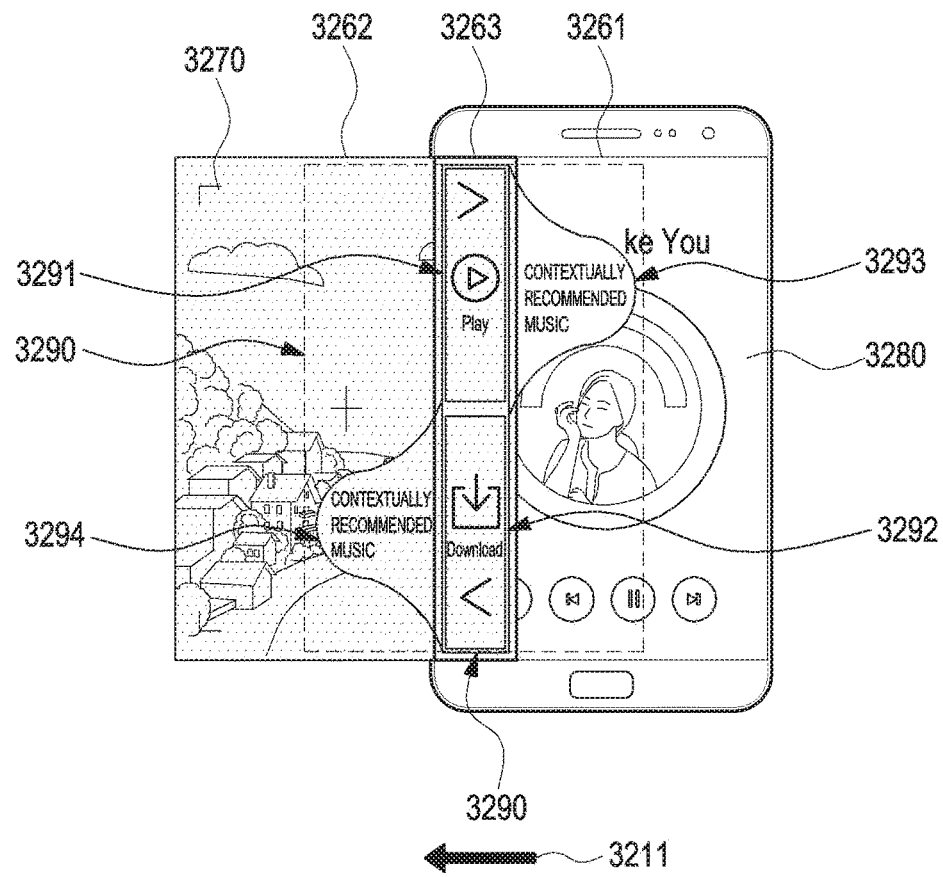
FIG. 32 is a view illustrating an electronic device which displays at least one piece of content related to first content according to various embodiments of the invention.
Figure 32:
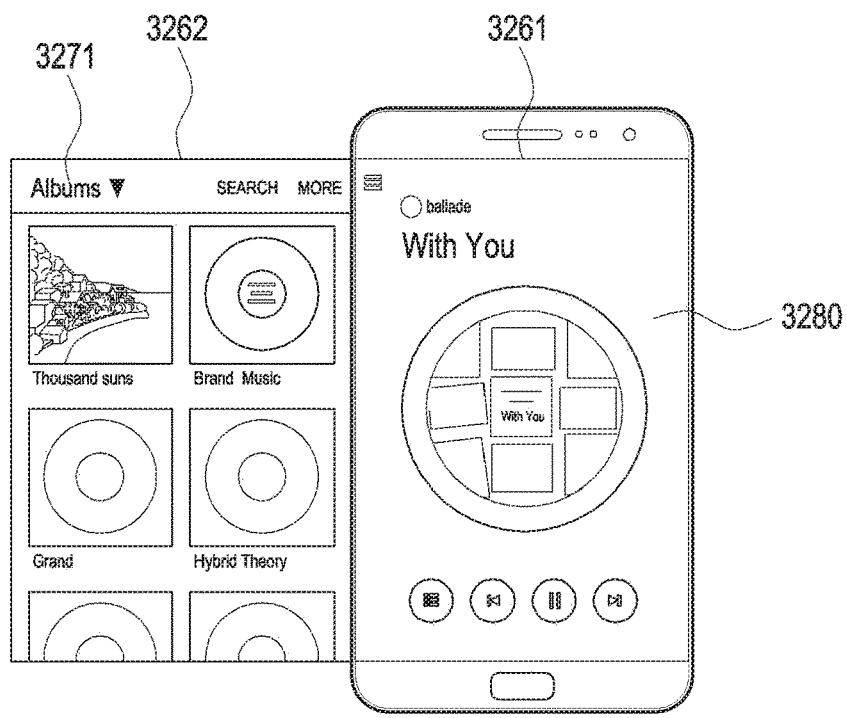

FIG. 32 illustrates an electronic device which displays at least one piece of content related to first content according to various embodiments of the invention.

As illustrated in FIG. 32, according to various embodiments, if with a first display 3261 overlapped with at least a partial area 3263 of a second display 3262, the second display 3262 slides in a second direction 3212, a processor 120 (e.g., the processor 120) may sense that the second display 3162 has slided in the second direction 3212, download at least one piece of sound source information corresponding to an image 3270 of a night sea on the basis of the sliding in the second direction 3212, the sound source play application displayed on the first display 3261, and/or the image 3270 of the night sea, by the sound source play application, and display, on the second display 3262, a sound source play application screen 3271 indicating the result of the download.

Figure 33:
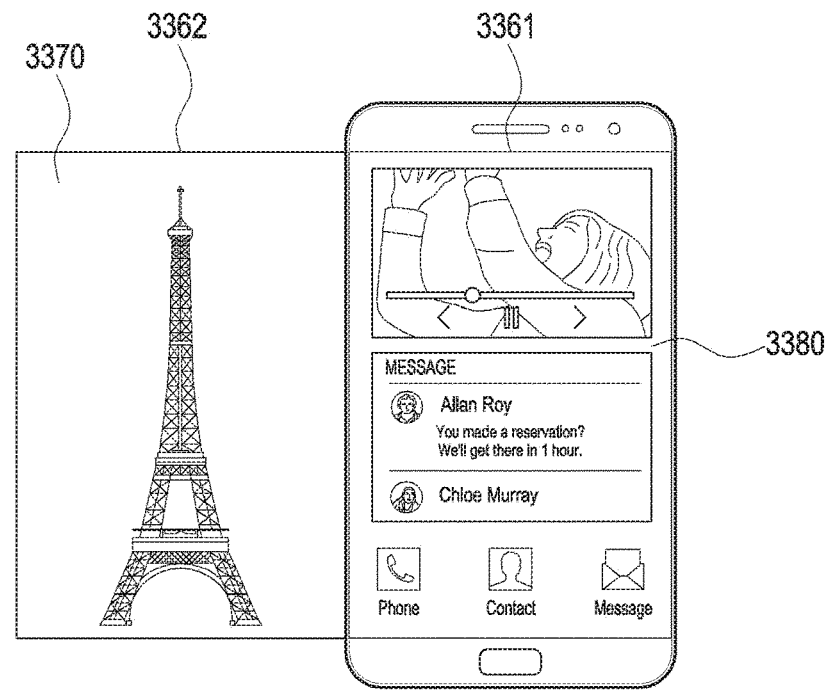
FIG. 33 is a view illustrating an electronic device which displays first content and guide information according to various embodiments of the invention.
Figure 33:
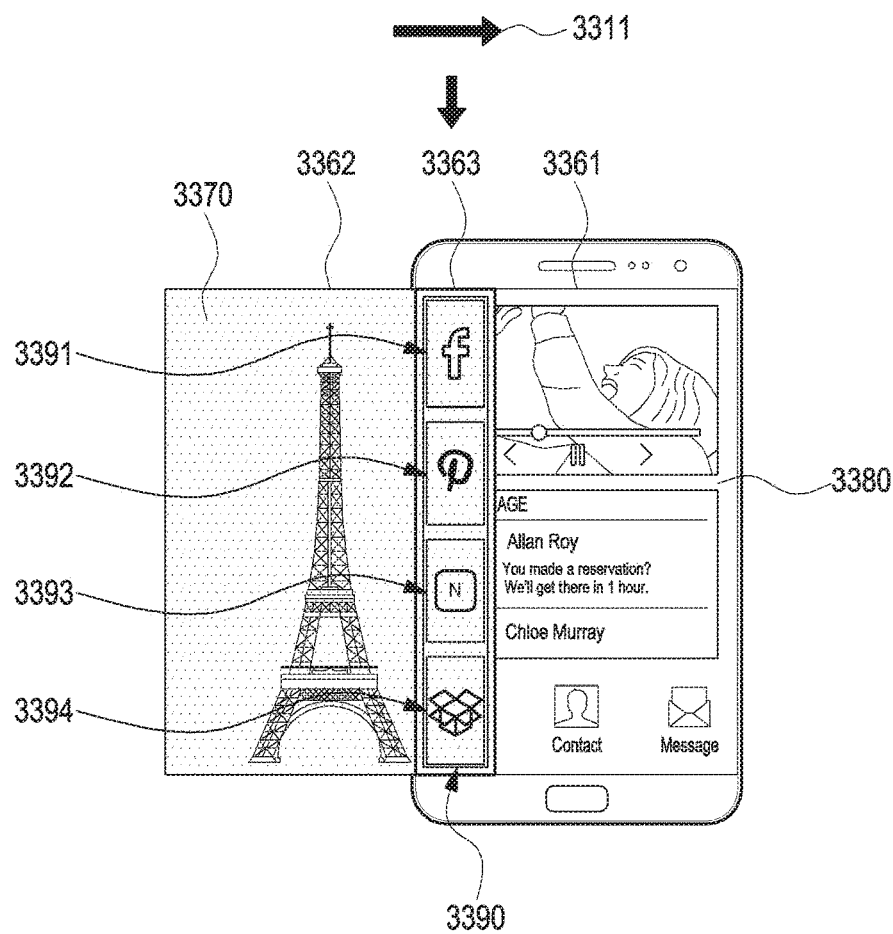

FIG. 33 illustrates first content and guide information according to various embodiments of the invention.

As illustrated in FIG. 33, with an idle screen 3380 displayed on a first display 3361, and a gallery application 3370 displayed on a second display 3362, a processor (e.g., the processor 120) may sense sliding of the second display 3362 in a first direction 3311 so that at least a partial area of the second display 3362 may overlap with the first display 3361.

According to various embodiments, if the processor 120 senses that the second display 3362 has slid in the first direction 3311 so that the at least partial area 3363 of the second display 3362 may overlap with the first display 3361, the processor 120 may display, in the overlapped at least partial area 2263, guide information 3390 including a first SNS application tab 3391, a second SNS application tab 3392, a third SNS application tab 3393, and/or a fourth SNS application tab 3394.

Figure 34:
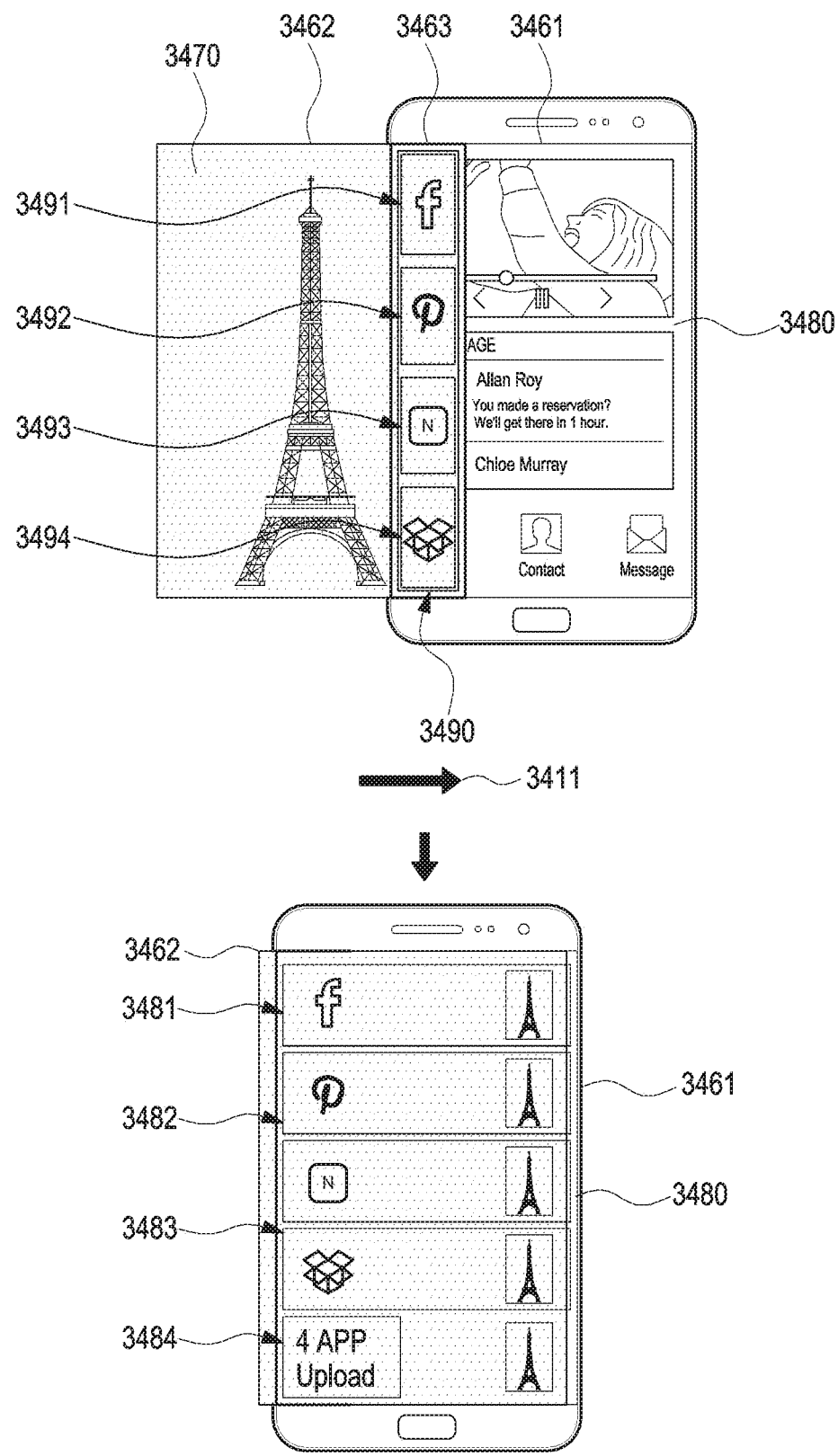
FIG. 34 is a view illustrating an operation of uploading a picture to a plurality of social network services (SNSs) according to various embodiments of the invention.

FIG. 34 illustrates a method of uploading a picture to a plurality of SNSs according to various embodiments of the invention.

As illustrated in FIG. 34, according to various embodiments, a processor (e.g., the processor 120) may display a gallery application 3470 on a second display 3462, and an idle screen 3480 on a first display 3461.

According to various embodiments, the processor 120 may display, in at least a partial area 3463 over which the first display 3461 overlaps with the second display 3462, guide information 3490 including a first SNS application tab 3491, a second SNS application tab 3492, a third SNS application tab 3493, and/or the fourth SNS application tab 3494.

According to various embodiments, in the state where the guide information 3490 is displayed, including a first SNS application tab 3491, a second SNS application tab 3492, a third SNS application tab 3493, and/or the fourth SNS application tab 3494, the processor 120 may sense that the second display 3462 has slid in a second direction 3411, with the at least partial area 3463 of the second display 3462 overlapped with the first display 3461.

According to various embodiments, if the processor 120 senses that the second display 3462 has slid in the second direction 3411, with the at least partial area 3463 of the second display 3462 overlapped with the first display 3461, the processor 120 may display a transparent screen on the second display 3462.

According to various embodiments, if the processor 120 senses that the second display 3462 has slid in the second direction 3411, with the at least partial area 3463 of the second display 3462 overlapped with the first display 3461, the processor 120 may upload a gallery application screen 3470 and/or content included in the gallery application screen 3470 by a first SNS application corresponding to the first SNS application tab 3491.

According to various embodiments, if the processor 120 senses that the second display 3462 has slid in the second direction 3411, with the at least partial area 3463 of the second display 3462 overlapped with the first display 3461, the processor 120 may upload the gallery application screen 3470 and/or the content included in the gallery application screen 3470 by a second SNS application corresponding to the second SNS application tab 3492.

According to various embodiments, if the processor 120 senses that the second display 3462 has slid in the second direction 3411, with the at least partial area 3463 of the second display 3462 overlapped with the first display 3461, the processor 120 may upload the gallery application screen 3470 and/or the content included in the gallery application screen 3470 by a third SNS application corresponding to the third SNS application tab 3493.

According to various embodiments, if the processor 120 senses that the second display 3462 has slid in the second direction 3411, with the at least partial area 3463 of the second display 3462 overlapped with the first display 3461, the processor 120 may upload the gallery application screen 3470 and/or the content included in the gallery application screen 3470 by a fourth SNS application corresponding to the fourth SNS application tab 3494.

According to various embodiments, if the processor 120 senses that the second display 3462 has slid in the second direction 3411, with the at least partial area 3463 of the second display 3462 overlapped with the first display 3461, the processor 120 may display, on the first display 3461, a first upload result window 3481 indicating the result of uploading the gallery application screen 3470 and/or the content included in the gallery application screen 3470 by the first SNS application corresponding to the first SNS application tab 3491.

According to various embodiments, if the processor 120 senses that the second display 3462 has slid in the second direction 3411, with the at least partial area 3463 of the second display 3462 overlapped with the first display 3461, the processor 120 may display, on the first display 3461, a second upload result window 3482 indicating the result of uploading the gallery application screen 3470 and/or the content included in the gallery application screen 3470 by the second SNS application corresponding to the second SNS application tab 3492.

According to various embodiments, if the processor 120 senses that the second display 3462 has slid in the second direction 3411, with the at least partial area 3463 of the second display 3462 overlapped with the first display 3461, the processor 120 may display, on the first display 3461, a third upload result window 3483 indicating the result of uploading the gallery application screen 3470 and/or the content included in the gallery application screen 3470 by the third SNS application corresponding to the third SNS application tab 3493.

According to various embodiments, if the processor 120 senses that the second display 3462 has slid in the second direction 3411, with the at least partial area 3463 of the second display 3462 overlapped with the first display 3461, the processor 120 may display, on the first display 3461, a fourth upload result window 3484 indicating the result of uploading the gallery application screen 3470 and/or the content included in the gallery application screen 3470 by the fourth SNS application corresponding to the fourth SNS application tab 3494.

Figure 35:
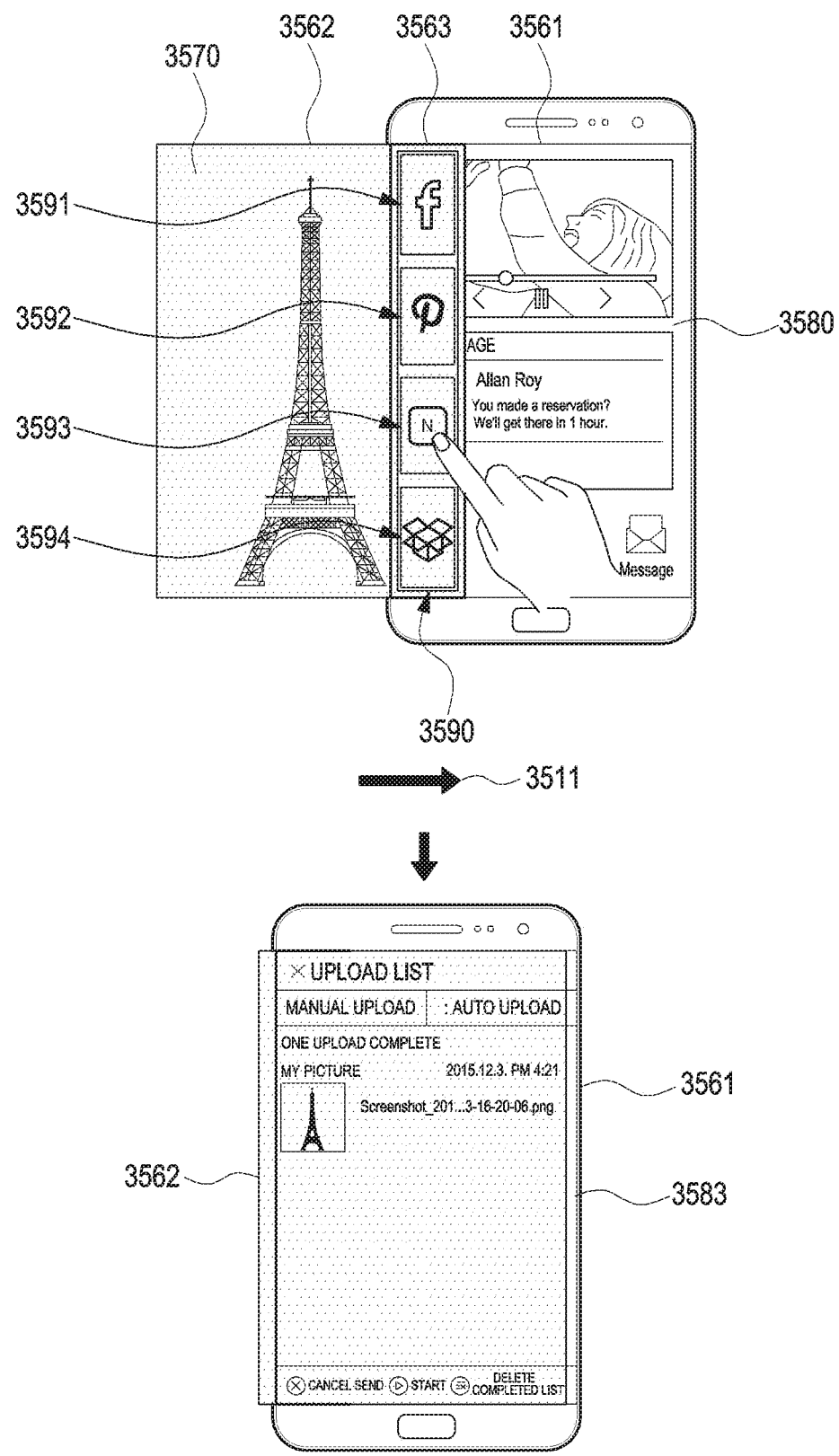
FIG. 35 is a view illustrating an operation of uploading a picture to a selected SNS according to various embodiments of the invention.

FIG. 35 illustrates an operation of uploading a picture to a selected SNS according to various embodiments of the invention.

According to various embodiments, a processor (e.g., the processor 120) may display a gallery application screen 3570 on a second display 3562, and an idle screen 3580 on a first display 3561.

According to various embodiments, the processor 120 may display, in at least a partial area 3563 over which the first display 3561 overlaps with the second display 3562, guide information 3590 including a first SNS application tab 3591, a second SNS application tab 3592, a third SNS application tab 3593, and/or the fourth SNS application tab 3594.

According to various embodiments, in the state where the guide information 3590 is displayed, including the first SNS application tab 3591, the second SNS application tab 3592, the third SNS application tab 3593, and/or the fourth SNS application tab 3594, the processor 120 may receive a selection of the third SNS application tab 3593 from among the first to fourth SNS application tabs 3691, 3592, 3593, and 3594, while the second display 3562 slides in a second direction 3511, with the at least partial area 3563 of the second display 3562 overlapped with the first display 3561.

According to various embodiments, if the second display 3562 has slided in the second direction 3511, with the at least partial area 3563 of the second display 3562 overlapped with the first display 3561, and the processor 120 has received the selection of the third SNS application tab 3593, the processor 120 may display a transparent screen on the second display 3562.

According to various embodiments, if the second display 3562 has slided in the second direction 3511, with the at least partial area 3563 of the second display 3562 overlapped with the first display 3561, and the processor 120 has received the selection of the third SNS application tab 3593, the processor 120 may upload the gallery application screen 3570 and/or the content included in the gallery application screen 3570 by a third SNS application corresponding to the selected third SNS application tab 3593.

According to various embodiments, if the processor 120 senses that the second display 3562 has slided in the second direction 3511, with the at least partial area 3563 of the second display 3562 overlapped with the first display 3561, the processor 120 may display, on the first display 3561, a third upload result window 3583 indicating the result of uploading the gallery application screen 3570 and/or the content included in the gallery application screen 3570 by the third SNS application corresponding to the third SNS application tab 3593.

Figure 36:
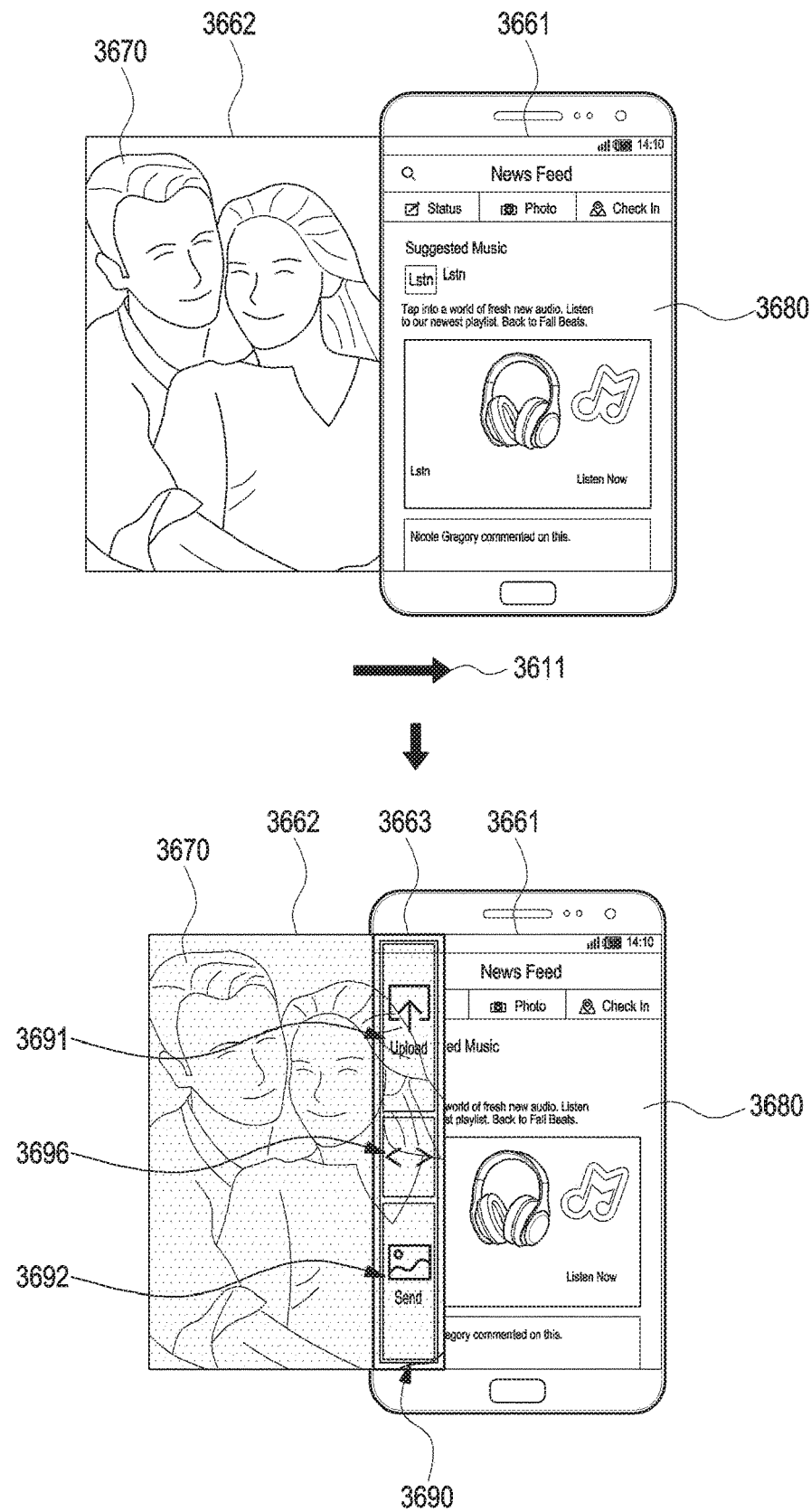
FIG. 36 is a view illustrating an operation of displaying a plurality of guides according to various embodiments of the invention.

FIG. 36 illustrates an operation of display a plurality of guides according to various embodiments of the invention.

As illustrated in FIG. 36, according to various embodiments, a processor (e.g., the processor 120) may display an SNS application screen 3680 on a first display 3661, and a gallery application screen 3670 on a second display 3662.

According to various embodiments, the processor 120 may sense that the second display 3662 is sliding in a first direction 3611 so that at least a partial area 3663 of the second display 3662 may overlap with the first display 3661.

According to various embodiments, if the processor 120 senses the sliding of the second display 3662 in the first direction 3611, the processor 120 may display, in the at least partial area 3663 of the second display 3662 overlapped with the first display 3661, guide information 3690 including upload guide information 3691, transmission guide information 3692, and/or direction guide information 3696 regarding the first direction 3611 and a second direction (e.g., the second direction 3211).

Figure 37:
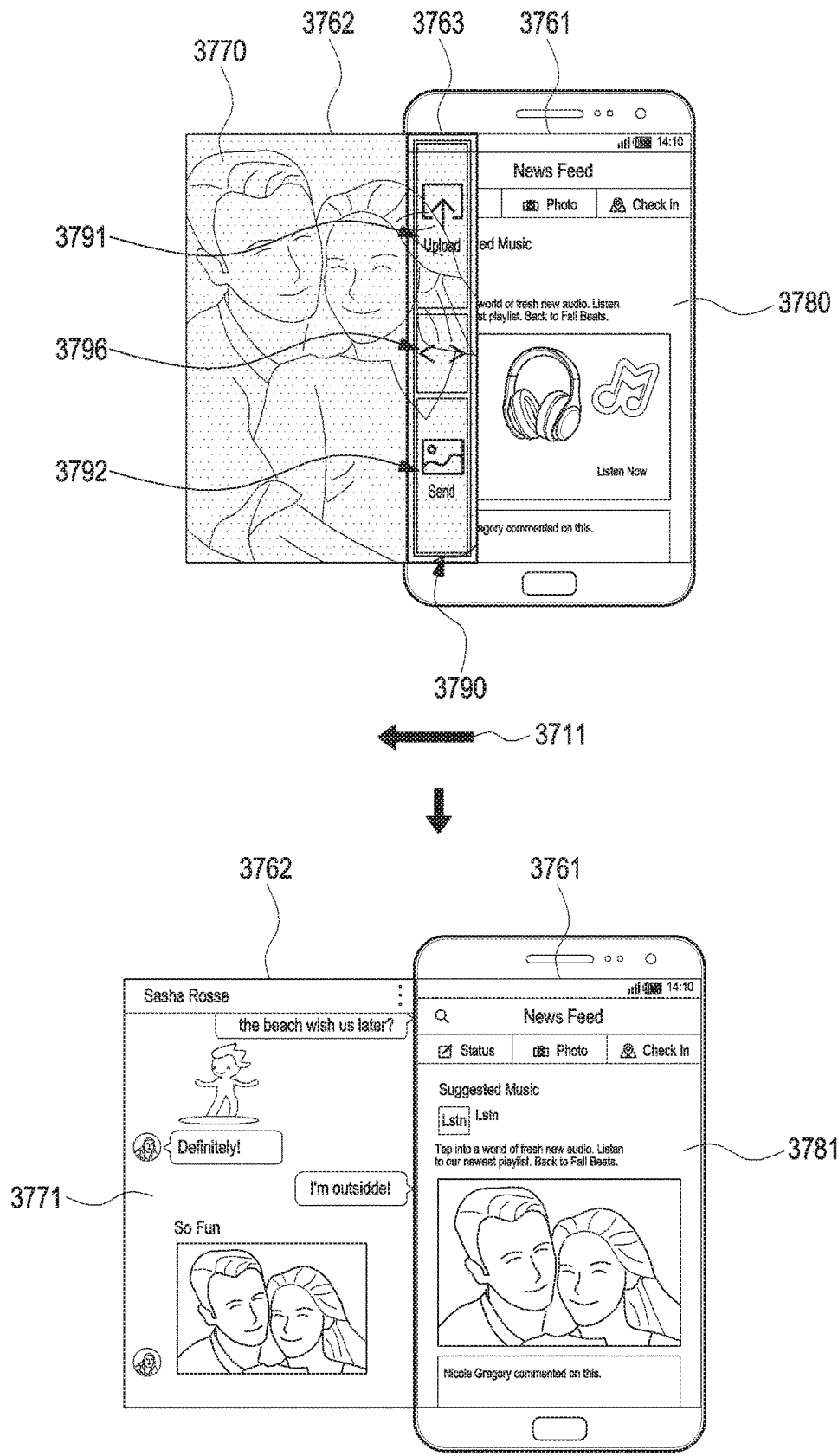
FIG. 37 is a view illustrating execution of a plurality of functions, and the result of the execution of the plurality of functions according to various embodiments of the invention.

FIG. 37 is a view illustrating execution of a plurality of functions, and results of the execution of the plurality of functions according to various embodiments of the invention.

As illustrated in FIG. 37, according to various embodiments, with upload guide information 3791, transmission guide information 3792, and/or direction guide information 3796 regarding a first direction 3711 and a second direction (e.g., the second direction 3211) displayed in at least a partial area 3763, a processor (e.g., the processor 120) may sense sliding of a second display 3762 in the second direction 3711.

According to various embodiments, if the processor 120 senses the sliding of the second display 3762 in the second direction 3711, with the guide information 3790 including the upload guide information 3791 and/or the transmission guide information 3792 displayed in the at least partial area 3763, the processor 120 may upload content included in a gallery application screen 3770 displayed on the second display 3762 by an SNS application corresponding to an SNS application screen 3780 displayed on a first display 3761, on the basis of the SNS application corresponding to the SNS application screen 3780 displayed on the first display 3761, the gallery application screen 3770 displayed on the second display 3762, and/or the sliding in the second direction 3711.

According to various embodiments, if the processor 120 senses the sliding of the second display 3762 in the second direction 3711, with the guide information 3790 including the upload guide information 3791 and/or the transmission guide information 3792 displayed in the at least partial area 3763, the processor 120 may display, on the first display 3761, an SNS application screen 3781 indicating the result of uploading the content included in the gallery application screen 3770 displayed on the second display 3762 by the SNS application corresponding to the SNS application screen 3780 displayed on the first display 3761, on the basis of the SNS application screen 3780 displayed on the first display 3761, the gallery application screen 3770 displayed on the second display 3762, and/or the sliding in the second direction 3711.

According to various embodiments, if the processor 120 senses the sliding of the second display 3762 in the second direction 3711, with the guide information 3790 including the upload guide information 3791 and/or the transmission guide information 3792 displayed in the at least partial area 3763, the processor 120 may acquire account information corresponding to the SNS application screen 3780 displayed on the first display 3761, on the basis of the SNS application screen 3780 displayed on the first display 3761, the gallery application screen 3770 displayed on the second display 3762, and/or the sliding in the second direction 3711, and transmit the content included in the gallery application screen 3770 as a message to the acquired account information.

According to various embodiments, if the processor 120 senses the sliding of the second display 3762 in the second direction 3711, with the guide information 3790 including the upload guide information 3791 and/or the transmission guide information 3792 displayed in the at least partial area 3763, the processor 120 may acquire the account information corresponding to the SNS application screen 3780 displayed on the first display 3761, on the basis of the SNS application screen 3780 displayed on the first display 3761, the gallery application screen 3770 displayed on the second display 3762, and/or the sliding in the second direction 3711, and display, on the second display 3762, a message transmission application screen 3771 indicating the result of transmitting the content included in the gallery application screen 3770 to the acquired account information.

Figure 38:
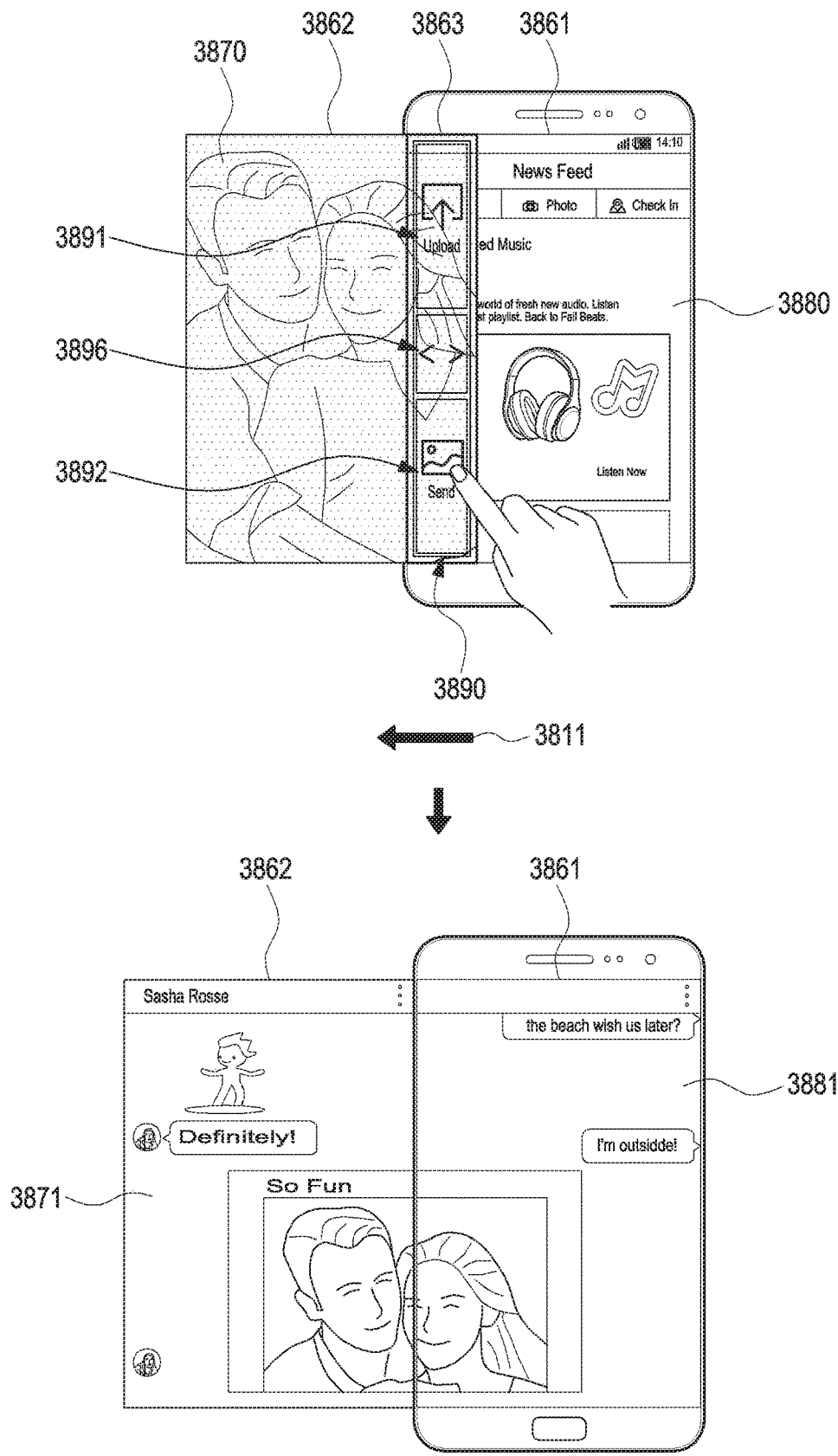
FIG. 38 is a view illustrating execution of a plurality of functions, and the result of the execution of the plurality of functions according to various embodiments of the invention.

FIG. 38 is a view illustrating execution of a plurality of functions, and results of the execution of the plurality of functions according to various embodiments of the invention.

As illustrated in FIG. 38, according to various embodiments, with guide information 3890 including upload guide information 3891, transmission guide information 3892, and/or direction guide information 3896 regarding a first direction 3811 and a second direction (e.g., the second direction 3211) displayed in at least a partial area 3863, a processor (e.g., the processor 120) may receive a selection of the transmission guide information 3892, along with sliding of a second display 3862 in a second direction 3811.

According to various embodiments, if with the guide information 3890 including the upload guide information 3891 and/or the transmission guide information 3892 displayed in the at least partial area 3863, the processor 120 receives the selection of the transmission guide information 3892, along with the sliding of the second display 3862 in the second direction 3811, the processor 120 may acquire account information corresponding to an SNS application screen 3880 displayed on the first display 3861, on the basis of the SNS application screen 3880 displayed on the first display 3861, a gallery application screen 3870 displayed on the second display 3862, the sliding in the second direction 3811, and/or the received selection of the transmission guide information 3892, and transmit the content included in the gallery application screen 3870 to the acquired account information.

According to various embodiments, if with the guide information 3890 including the upload guide information 3891 and/or the transmission guide information 3892 displayed in the at least partial area 3863, the processor 120 receives the selection of the transmission guide information 3892, along with sliding of the second display 3862 in the second direction 3811, the processor 120 may acquire the account information corresponding to the SNS application screen 3880 displayed on the first display 3861, on the basis of the SNS application screen 3880 displayed on the first display 3861, the gallery application screen 3870 displayed on the second display 3862, the sliding in the second direction 3811, and/or the received selection of the transmission guide information 3892, and display, on the second display 3862, a message transmission application screen 3871 indicating the result of transmitting the content included in the gallery application screen 3870 to the acquired account information.

Figure 39:
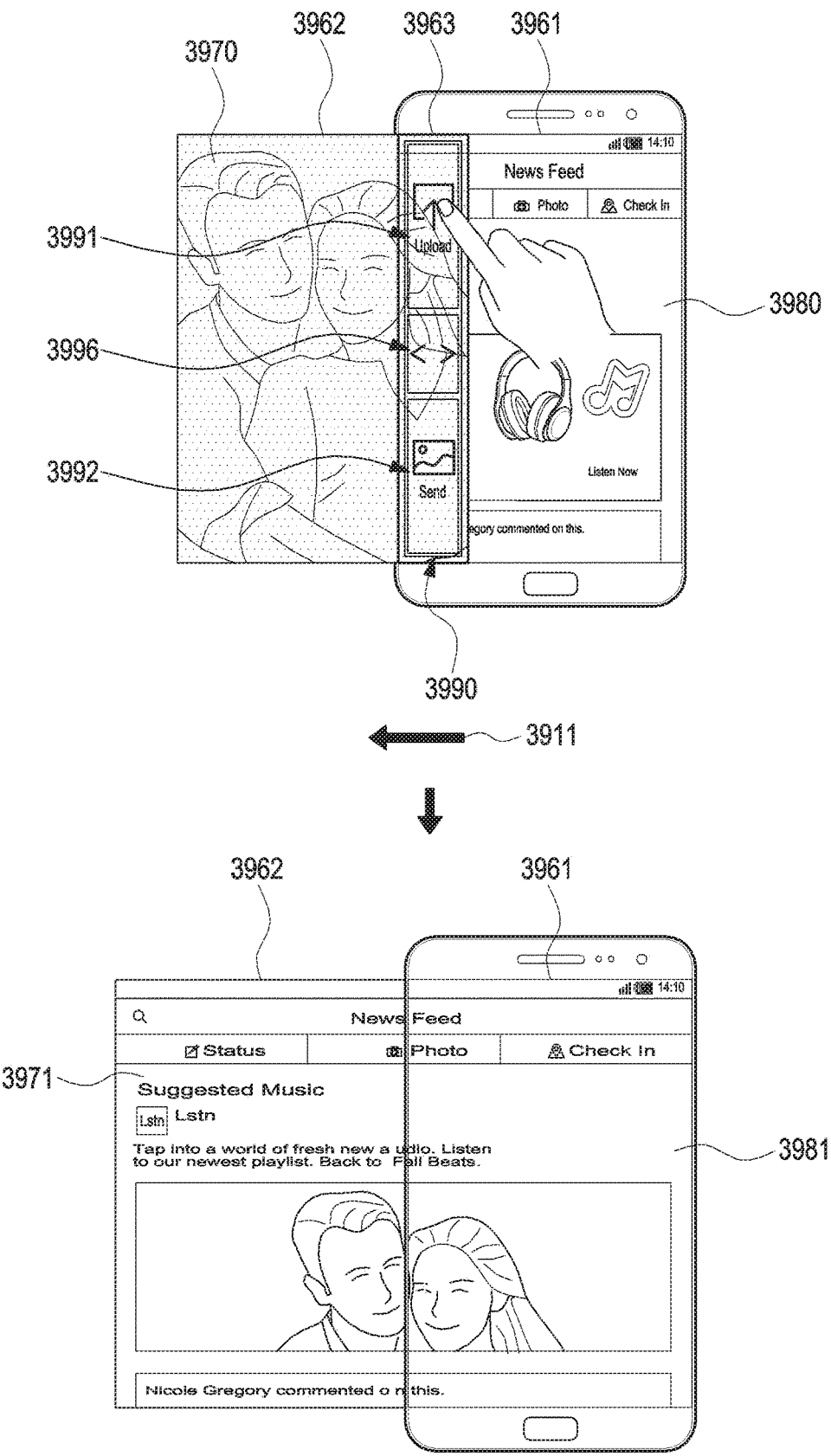
FIG. 39 is a view illustrating execution of a plurality of functions, and the result of the execution of the plurality of functions according to various embodiments of the invention.

FIG. 39 is a view illustrating execution of a plurality of functions, and results of the execution of the plurality of functions according to various embodiments of the invention.

As illustrated in FIG. 39, according to various embodiments, with guide information 3990 including upload guide information 3991, transmission guide information 3992, and/or direction guide information 3996 regarding a first direction 3911 and a second direction (e.g., the second direction 3211) displayed in at least a partial area 3963, a processor (e.g., the processor 120) may receive a selection of the upload guide information 3991, along with sliding of a second display 3962 in a second direction 3911.

According to various embodiments, if with the guide information 3990 including the upload guide information 3991 and/or the transmission guide information 3992 displayed in the at least partial area 3963, the processor 120 receives the selection of the upload guide information 3991, along with the sliding of the second display 3962 in the second direction 3911, the processor 120 may upload content included in a gallery application screen 3970 displayed on the second display 3962 by an SNS application corresponding to the SNS application screen 3990 displayed on the first display 3961, on the basis of the SNS application screen 3980 displayed on the first display 3961, the gallery application screen 3970 displayed on the second display 3962, the sliding in the second direction 3911, and/or the received selection of the upload guide information 3991.

According to various embodiments, if with the guide information 3990 including the upload guide information 3991 and/or the transmission guide information 3992 displayed in the at least partial area 3963, the processor 120 receives the selection of the upload guide information 3991, along with the sliding of the second display 3962 in the second direction 3911, the processor 120 may display, on the first display 3961, an SNS application screen 3981 indicating the result of uploading the content included in the gallery application screen 3970 displayed on the second display 3962 by the SNS application corresponding to the SNS application screen 3980 displayed on the first display 3961, on the basis of the SNS application screen 3980 displayed on the first display 3961, the gallery application screen 3970 displayed on the second display 3962, the sliding in the second direction 3911, and/or the received selection of the upload guide information 3991.

Figure 40:
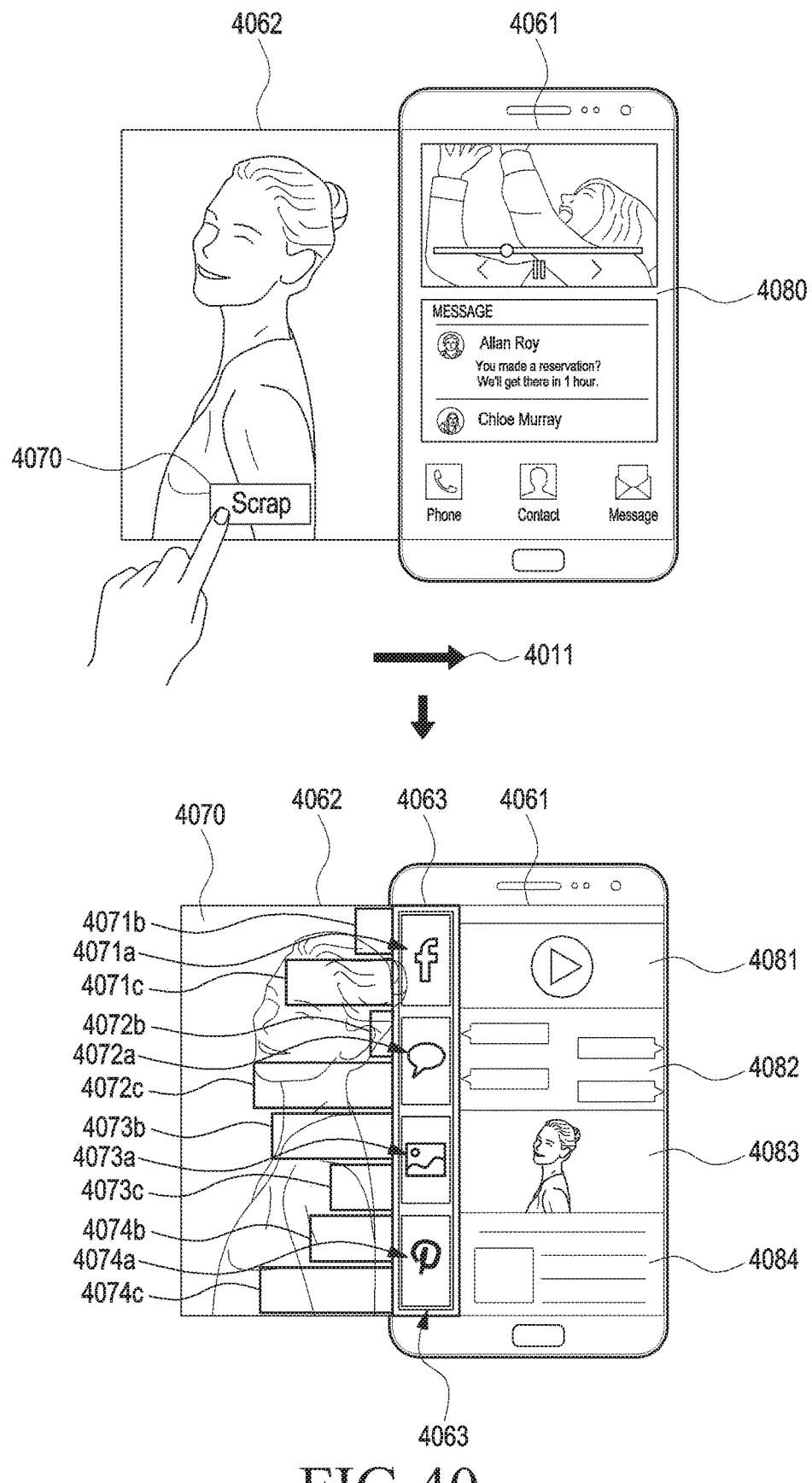
FIG. 40 is a view illustrating activity level information and/or intimacy level information about a person according to various embodiments of the invention.

FIG. 40 is a view illustrating activity level information and/or intimacy level information about a person according to various embodiments of the present invention.

As illustrated in FIG. 40, according to various embodiments, a processor (e.g., the processor 120) may display a gallery application screen 4070 including person information on a second display 4062, and an idle screen 4080 on a first display 4061.

According to various embodiments, with the gallery application screen 4070 including person information displayed on the second display 4062, and the idle screen 4080 displayed on the first display 4061, the processor 120 may sense sliding of the second display 4062 in a first direction 4011 so that the second display 4062 may overlap with the first display 4061 over at least a partial area 4063.

According to various embodiments, if the processor 120 senses the sliding of the second display 4062 in the first direction 4011 so that the second display 4062 may overlap with the first display 4061 over the at least partial area 4063, the processor 120 may display a first SNS application tab 4071a corresponding to a first SNS application in the at least partial area 4063, and display, on the second display 4062, activity level information 4071b related to the person information (e.g., first content) included in the gallery application 4070 displayed on the second display 4062 in the first SNS application (e.g., a time during which a person represented by the person information stays in the first SNS application), and/or intimacy level information 4071c between the person represented by the person information (e.g., the first content) included in the gallery application 3070 displayed on the second display 4062 and a user of an electronic device (e.g., the electronic device 101) (e.g., the number of replies, the number of likes, etc.). According to various embodiments, if the processor 120 senses the sliding of the second display 4062 in the first direction 4011 so that the second display 4062 may overlap with the first display 4061 over the at least partial area 4063, the processor 120 may display a first SNS application preview 4081 corresponding to the first SNS application in the at least partial area 4063 on the first display 4061.

For example, the processor 120 may display a first message application tab corresponding to a first message application in the at least partial area 4063, and display, on the second display 4062, activity level information related to the person information (e.g., the first content) included in the gallery application 4070 displayed on the second display 4062 (e.g., the number of messages transmitted and received between the person represented by the person information and the user), and/or intimacy level information between the person represented by the person information (e.g., the first content) included in the gallery application 3070 displayed on the second display 4062 and the user of the electronic device (e.g., the electronic device 101) (e.g., the number of used positive words, etc.), in the first message application. According to various embodiments, if the processor 120 senses the sliding of the second display 4062 in the first direction 4011 so that the second display 4062 may overlap with the first display 4061 over the at least partial area 4063, the processor 120 may display a first message application preview corresponding to the first message application in the at least partial area 4063 on the first display 4061.

For example, the processor 120 may display a first gallery application tab corresponding to a first gallery application in the at least partial area 4063, and display, on the second display 4062, activity level information related to the person information (e.g., the first content) included in the gallery application 4070 displayed on the second display 4062 (e.g., the number of pictures including the person information included in the first gallery application), and/or intimacy level information between the person represented by the person information (e.g., the first content) and the user of the electronic device (e.g., the electronic device 101) (e.g., the number of smiling expressions of the person represented by the person information, and the number of pictures reviewed by the person represented by the person information, etc.), in the first gallery application. According to various embodiments, if the processor 120 senses the sliding of the second display 4062 in the first direction 4011 so that the second display 4062 may overlap with the first display 4061 over the at least partial area 4063, the processor 120 may display a first gallery application preview corresponding to the first gallery application in the art least partial area 4063 on the first display 4061.

For example, the processor 120 may display a first contacts application tab corresponding to a first contacts application in the at least partial area 4063, and display, on the second display 4062, activity level information related to the person information (e.g., the first content) included in the contacts application 4070 displayed on the second display 4062 (e.g., the number of calls with the person represented by the person information included in the first contacts application), and/or intimacy level information between the person represented by the person information (e.g., the first content) and the user of the electronic device (e.g., the electronic device 101) (e.g., a time period during which calls are conducted with the person represented by the person information, etc.), in the first contacts application. According to various embodiments, if the processor 120 senses the sliding of the second display 4062 in the first direction 4011 so that the second display 4062 may overlap with the first display 4061 over the at least partial area 4063, the processor 120 may display a first contacts application preview corresponding to the first contacts application in the at least partial area 4063 on the first display 4061.

For example, the processor 120 may display a first memo application tab corresponding to a first memo application in the at least partial area 4063, and display, on the second display 4062, activity level information related to person information (e.g., first content) included in the memo application 4070 displayed on the second display 4062 (e.g., the number of registrations of the person information included in the first memo application), and/or intimacy level information between the person represented by the person information (e.g., the first content) and the user of the electronic device (e.g., the electronic device 101) (e.g., the number of positive words used for the person represented by the person information, etc.), in the first memo application. According to various embodiments, if the processor 120 senses the sliding of the second display 4062 in the first direction 4011 so that the second display 4062 may overlap with the first display 4061 over the at least partial area 4063, the processor 120 may display a first memo application preview corresponding to the first memo application in the at least partial area 4063 on the first display 4061.

According to various embodiments, if the processor 120 senses the sliding of the second display 4062 in the first direction 4011 so that the second display 4062 may overlap with the first display 4061 over the at least partial area 4063, the processor 120 may display a second SNS application tab 4072*a* corresponding to a second SNS application in the at least partial area 4063, and display, on the second display 4062, activity level information 4072*b* related to the person information (e.g., first content) included in the gallery application 4070 displayed on the second display 4062 (e.g., a time during which a person represented by the person information stays in the second SNS application), and/or intimacy level information 4072*c* between the person represented by the person information (e.g., the first content) included in the gallery application 4070 displayed on the second display 4062 and a user of an electronic device (e.g., the electronic device 101) (e.g., the number of replies, the number of likes, etc.), in the second SNS application. According to various embodiments, if the processor 120 senses the sliding of the second display 4062 in the first direction 4011 so that the second display 4062 may overlap with the first display 4061 over the at least partial area 4063, the processor 120 may display a second SNS application preview 4082 corresponding to the second SNS application in the at least partial area 4063 on the first display 4061.

According to various embodiments, if the processor 120 senses the sliding of the second display 4062 in the first direction 4011 so that the second display 4062 may overlap with the first display 4061 over the at least partial area 4063, the processor 120 may display a third SNS application tab 4073*a* corresponding to a third SNS application in the at least partial area 4063, and display, on the second display 4062, activity level information 4073*b* related to the person information (e.g., first content) included in the gallery application 4070 displayed on the second display 4062 (e.g., a time during which a person represented by the person information stays in a third SNS), and/or intimacy level information 4073*c* between the person represented by the person information (e.g., the first content) included in the gallery application 4070 displayed on the second display 4062 and a user of an electronic device (e.g., the electronic device 101) (e.g., the number of replies, the number of likes, etc.), in the third SNS application. According to various embodiments, if the processor 120 senses the sliding of the second display 4062 in the first direction 4011 so that the second display 4062 may overlap with the first display 4061 over the at least partial area 4063, the processor 120 may display a third SNS application preview 4083 corresponding to the third SNS application in the at least partial area 4063 on the first display 4061.

According to various embodiments, if the processor 120 senses the sliding of the second display 4062 in the first direction 4011 so that the second display 4062 may overlap with the first display 4061 over the at least partial area 4063, the processor 120 may display a fourth SNS application tab 4074*a* corresponding to a third SNS application in the at least partial area 4063, and display, on the second display 4062, activity level information 4074*b* related to the person information (e.g., first content) included in the gallery application 4070 displayed on the second display 4062 (e.g., a time during which a person represented by the person information stays in a four SNS), and/or intimacy level information 4074*c* between the person represented by the person information (e.g., the first content) included in the gallery application 4070 displayed on the second display 4062 and a user of an electronic device (e.g., the electronic device 101) (e.g., the number of replies, the number of likes, etc.), in the fourth SNS application. According to various embodiments, if the processor 120 senses the sliding of the second display 4062 in the first direction 4011 so that the second display 4062 may overlap with the first display 4061 over the at least partial area 4063, the processor 120 may display a fourth SNS application preview 4084 corresponding to the fourth SNS application in the at least partial area 4063 on the first display 4061.

Figure 41:
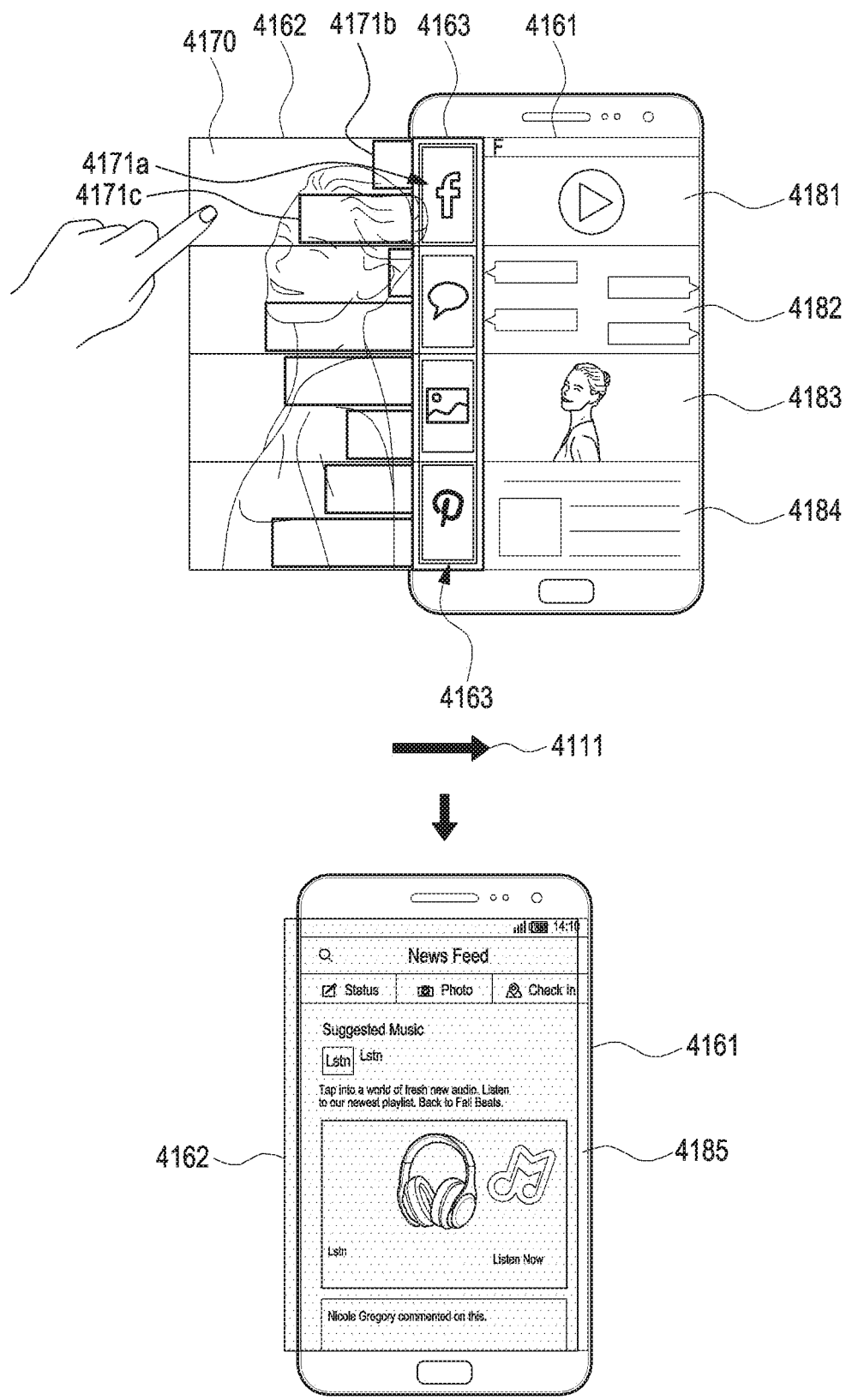
FIG. 41 is a view illustrating an operation of updating activity level information and/or intimacy level information through a selected first SNS application according to various embodiments of the invention.

FIG. 41 illustrates an operation of updating activity level information and/or intimacy level information through a selected first SNS application according to various embodiments of the invention.

As illustrated in FIG. 41, according to various embodiments, in the state where a first SNS application tab 4171a corresponding to a first SNS application is displayed in at least a partial area 4163, and a first SNS area 4171 including activity level information 4071b related to person information (e.g., first content) included in a gallery application 4170 displayed on a second display 4162 (e.g., a time during which a person represented by the person information stays in a first SNS), and/or intimacy level information 4171c between a person represented by the person information (e.g., the first content) included in the gallery application 4170 displayed on the second display 4162 and a user of an electronic device (e.g., the electronic device 101) (e.g., the number of replies, the number of likes, etc.), in the first SNS application, is displayed on the second display 4162, the processor 120 may receive a selection of the first SNS area 4171, and sense sliding of the second display 4162 in a first direction 4111.

According to various embodiments, if the processor 120 receives the selection of the first SNS area 471, and senses the sliding of the second display 4162 in the first direction 4111, the processor 120 may execute the first SNS application, and display, on the first display 4161, a person information SNS screen 4185 corresponding to the person information (e.g., the first content) included in the gallery application screen 4170 displayed on the second display 4162.

According to various embodiments, if the processor 120 receives the selection of the first SNS area 4171, and senses the sliding of the second display 4162 in the first direction 4111, the processor 120 may execute the first SNS application, display, on the first display 4161, the person information SNS screen 4185 corresponding to the person information (e.g., the first content) included in the gallery application screen 4170 displayed on the second display 4162, and update activity level information and intimacy level information corresponding to the person information.

Figure 42:
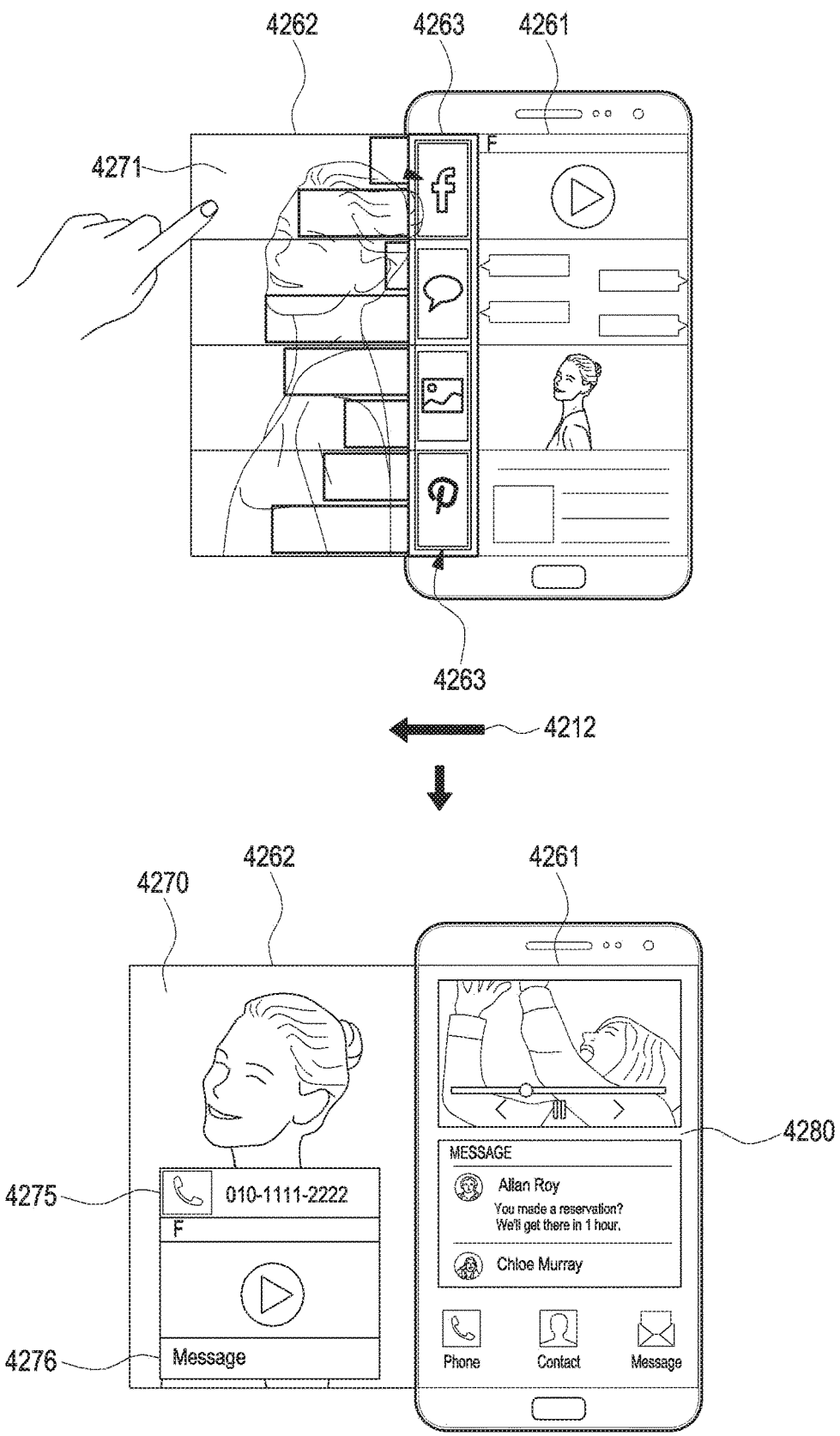
FIG. 42 is a view illustrating an operation of displaying SNS information related to updated person information through a selected first SNS application according to various embodiments of the invention.

FIG. 42 illustrates an operation of displaying SNS information related to person information updated through a selected first SNS application according to various embodiments of the invention.

As illustrated in FIG. 42, according to various embodiments, in the state where a first SNS area 4271 including a first SNS application tab corresponding to a first SNS application, activity level information related to person information (e.g., first content) included in a gallery application screen displayed on a second display 4262 (e.g., a time during which a person represented by the person information stays in a first SNS), and/or intimacy level information between the person represented by the person information (e.g., the first content) and a user of an electronic device (e.g., the electronic device 101) (e.g., the number of replies, the number of likes, etc.), in the first SNS application, is displayed on the second display 4262, the processor 120 may receive a selection of the first SNS area 4271, and sense sliding of the second display 4262 in a second direction 4212.

According to various embodiments, if the processor 120 receives the selection of the first SNS area 4271, and senses the sliding of the second display 4262 in the second direction 4212, the processor 120 may execute the first SNS application, and update activity level information and intimacy level information corresponding to person information included in the gallery application screen 4270 displayed on the second display 4262.

According to various embodiments, if the processor 120 receives the selection of the first SNS area 4271, and senses the sliding of the second display 4262 in the second direction 4212, the processor 120 may execute the first SNS application. If the processor 120 updates the activity level information and intimacy level information corresponding to the person information included in the gallery application screen 4270 displayed on the second display 4262, the processor 120 may display, on the second display 4262, contacts information 4275 related to the person information corresponding to the updated activity level information and/or intimacy level information, and a first SNS application preview 4276 corresponding to the person information.

According to various embodiments of the invention, an electronic device may include a first display displaying first content; a second display sliding on the first display, and displaying second content; and a processor configured to display at least one piece of content related to at least one of the first content and the second content on at least one of the first display and the second display, according to overlap between the first display and the second display, incurred by the sliding.

According to various embodiments, the second display may include a transparent display.

According to various embodiments, the processor may be configured to execute an application related to the second content, and display an execution screen of the application on at least one of the first display and the second display.

According to various embodiments, the second content may include person information, and the application may include at least one of a contacts application for requesting dialing to the person information, a message application for transmitting a message to the person information, a social network service (SNS) application for uploading an image including the person information, and a message transmission application for transmitting an image including the person information to the person information.

According to various embodiments, the second content may include place information, and the application may include at least one of a navigation application for performing navigation to the place information, a call application for requesting dialing to a contact number corresponding to the place information, a map application for displaying location information related to the place information, a sound source play application for playing sound source information corresponding to the place information, and an SNS application for uploading an image including the place information.

According to various embodiments, the second content may include sound source information, and the application may include an SNS application for uploading the sound source information.

According to various embodiments, the second content may include SNS state information, and the application may include a sound source play application for playing or downloading a sound source corresponding to the SNS state information.

According to various embodiments, the processor may be configured to display the at least one piece of content according to first sliding incurring overlap between the second display and the first display over at least a partial area, and second sliding incurring a change in the at least partial area after the first sliding.

According to various embodiments, the processor may be configured to display guide information for the at least one piece of content related to the at least one of the first content and the second content in the at least partial area of the second display.

According to various embodiments, the processor may be configured to select a display for displaying the at least one piece of content related to the at least one of the first content and the second content, between the first display and the second display, and display the at least one piece of content related to the at least one of the first content and the second content on the selected display.

According to various embodiments of the invention, a method of controlling an electronic device may include displaying first content; displaying second content; and displaying at least one piece of content related to at least one of the first content and the second content on at least one of the first display and the second display, according to overlap between the first display and the second display, incurred by the sliding.

According to various embodiments, the displaying may include displaying the at least one of content related to the at least one of the first content and the second content on the second display including a transparent display.

According to various embodiments, the method may further include executing an application related to the second content, and displaying an execution screen of the application on at least one of the first display and the second display.

According to various embodiments, the displaying of the second content may include displaying person information, and the displaying of an execution screen of the application on at least one of the first display and the second display may include displaying, on at least one of the first display and the second display, an execution screen of the application including at least one of a contacts application for requesting dialing to the person information, a message application for transmitting a message to the person information, a social network service (SNS) application for uploading an image including the person information, and a message transmission application for transmitting an image including the person information to the person information.

According to various embodiments, the displaying of the second content may include displaying place information, and the displaying of an execution screen of the application on at least one of the first display and the second display may include displaying, on at least one of the first display and the second display, an execution screen of the application including at least one of a navigation application for performing navigation to the place information, a call application for requesting dialing to a contact number corresponding to the place information, a map application for displaying location information related to the place information, a sound source play application for playing sound source information corresponding to the place information, and an SNS application for uploading an image including the place information.

According to various embodiments, the displaying of the second content may include displaying sound source information, and the displaying of an execution screen of the application on at least one of the first display and the second display may include displaying, on at least one of the first display and the second display, an execution screen of the application including an SNS application for uploading the sound source information.

According to various embodiments, the displaying of the second content may include displaying SNS state information, and the displaying of an execution screen of the application on at least one of the first display and the second display may include displaying, on at least one of the first display and the second display, an execution screen of the application including a sound source play application for playing or downloading a sound source corresponding to the SNS state information.

According to various embodiments, the displaying of at least one piece of content may include sensing first sliding incurring overlap between the second display and the first display over at least a partial area; sensing second sliding incurring a change in the at least partial area after the first sliding; and displaying the at least one piece of content according to the first sliding and the second sliding.

According to various embodiments, the method may further comprising display guide information for the at least one piece of content related to the at least one of the first content and the second content in the at least partial area of the second display.

According to various embodiments, the method may further include selecting a display for displaying the at least one piece of content related to the at least one of the first content and the second content, between the first display and the second display, and displaying the at least one piece of content related to the at least one of the first content and the second content on the selected display.

The term "module" as used herein may include its ordinary meaning including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate arrays (FPGAs), or programmable logic devices that perform certain operations.

At least a part of apparatuses (e.g., modules or their functions) or methods (e.g., operations) according to various embodiments may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (e.g., magnetic tape), optical media (e.g., compact disc read-only memory (CD-ROM)), digital versatile disc (DVD), magneto-optical media (for example, floptical disk), hardware devices (for example, read only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

The invention claimed is:

1. An electronic device comprising:
   a first display displaying first content;
   a second display sliding on the first display, and displaying second content; and
   at least one processor configured to display at least one piece of content related to at least one of the first content or the second content on at least one of the first display or the second display, according to an overlap between the first display and the second display, incurred by the sliding,
   wherein, based on the second display being slid so as to overlap with the first display over a partial area, the at least one processor is further configured to:
      display, in the partial area on the second display, guide information indicating a first direction and a second direction, and
   wherein, based on the second display being slid in the first direction so as to either overlap wholly with the first display or based on the second display being slid in the second direction so as to decrease at least the partial area, the at least one processor is further configured to:
      execute an application related to the second content being displayed on the second display, and
      display an execution screen of the application on at least one of the first display or the second display.

2. The electronic device of claim 1, wherein the second display includes a transparent display.

3. The electronic device of claim 1,
   wherein the second content includes person information, and
   wherein the application includes at least one of a contacts application for requesting dialing to the person information, a message application for transmitting a message to the person information, a social network service (SNS) application for uploading an image including the person information, or a message transmission application for transmitting an image including the person information to the person information.

4. The electronic device of claim 1,
   wherein the second content includes place information, and
   wherein the application includes at least one of a navigation application for performing navigation to the place information, a call application for requesting dialing to a contact number corresponding to the place information, a map application for displaying location information related to the place information, a sound source play application for playing sound source information corresponding to the place information, or a social network service (SNS) application for uploading an image including the place information.

5. The electronic device of claim 1, wherein the second content includes sound source information, and the application includes a social network service (SNS) application for uploading the sound source information.

6. The electronic device of claim 1, wherein the second content includes social network service (SNS) state information, and the application includes a sound source play application for playing or downloading a sound source corresponding to the SNS state information.

7. The electronic device of claim 1, wherein the at least one processor is further configured to display the at least one piece of content according to a first sliding incurring the overlap between the second display and the first display over the at least the partial area, and a second sliding incurring a change in the at least the partial area after the first sliding.

8. The electronic device of claim 1, wherein the at least one processor is further configured to:
   select a display for displaying the at least one piece of content related to the at least one of the first content or the second content, between the first display and the second display, and
   display the at least one piece of content related to the at least one of the first content or the second content on the selected display.

9. A method of controlling an electronic device, the method comprising:
   displaying first content;
   displaying second content;
   displaying at least one piece of content related to at least one of the first content or the second content on at least one of a first display or a second display, according to an overlap between the first display and the second display, incurred by sliding;
   based on the second display being slid so as to overlap with the first display over a partial area, displaying, in the partial area on the second display, guide information indicating a first direction and a second direction; and
   based on the second display being slid in the first direction so as to either overlap wholly with the first display or based on the second display being slid in the second direction so as to decrease at least the partial area:
      executing an application related to the second content being displayed on the second display, and
      displaying an execution screen of the application on at least one of the first display or the second display.

10. The method of claim 9, wherein the displaying of the at least one piece of content related to the at least one of the first content or the second content on at least one of the first display or the second display comprises displaying the at least one piece of content related to the at least one of the first content and the second content on the second display including a transparent display.

11. The method of claim 9,
   wherein the displaying of the second content comprises displaying person information, and
   wherein the displaying of the execution screen of the application on the at least one of the first display or the second display comprises displaying, on the at least one of the first display or the second display, the execution screen of the application including at least one of a contacts application for requesting dialing to the person information, a message application for transmitting a message to the person information, a social network service (SNS) application for uploading an image including the person information, or a message transmission application for transmitting the image including the person information to the person information.

12. The method of claim 9,
wherein the displaying of the second content comprises displaying place information, and
wherein the displaying of the execution screen of the application on the at least one of the first display or the second display comprises displaying, on the at least one of the first display or the second display, the execution screen of the application including at least one of a navigation application for performing navigation to the place information, a call application for requesting dialing to a contact number corresponding to the place information, a map application for displaying location information related to the place information, a sound source play application for playing sound source information corresponding to the place information, and a social network service (SNS) application for uploading an image including the place information.

* * * * *